(12) United States Patent
Fontes et al.

(10) Patent No.: US 9,323,503 B1
(45) Date of Patent: Apr. 26, 2016

(54) SYSTEM AND METHOD FOR ACCESSING SETTINGS IN A MULTIPHYSICS MODELING SYSTEM USING A MODEL TREE

(75) Inventors: Eduardo Fontes, Valentuna (SE); Lars Langemyr, Stockholm (SE); Jean-Francois Hiller, Westford, MA (US); Svante Littmarck, Dedham, MA (US); Nils Malm, Stockholm (SE); Tomas Normark, Bromma (SE); Björn Sjödin, Lexington, MA (US); Daniel Smith, Cambridge, MA (US)

(73) Assignee: Comsol AB, Stockholm (SE)

( * ) Notice: Subject to any disclaimer, the term of this patent is extended or adjusted under 35 U.S.C. 154(b) by 680 days.

(21) Appl. No.: 13/184,207

(22) Filed: Jul. 15, 2011

Related U.S. Application Data

(63) Continuation-in-part of application No. 12/981,404, filed on Dec. 29, 2010, now Pat. No. 9,208,270.

(60) Provisional application No. 61/290,839, filed on Dec. 29, 2009, provisional application No. 61/360,038, filed on Jun. 30, 2010, provisional application No. 61/377,841, filed on Aug. 27, 2010.

(51) Int. Cl.
G06F 17/50 (2006.01)
G06F 9/44 (2006.01)
G06F 17/13 (2006.01)
G06F 17/30 (2006.01)

(52) U.S. Cl.
CPC . *G06F 8/34* (2013.01); *G06F 17/13* (2013.01); *G06F 17/30126* (2013.01)

(58) Field of Classification Search
None
See application file for complete search history.

(56) References Cited

U.S. PATENT DOCUMENTS

| | | | | |
|---|---|---|---|---|
| 5,289,567 | A | * | 2/1994 | Roth .............................. 345/420 |
| 5,408,638 | A | * | 4/1995 | Sagawa ............... G06F 17/5018 703/2 |
| 5,970,490 | A | | 10/1999 | Morgenstern |
| 6,349,272 | B1 | | 2/2002 | Phillips |
| 6,704,743 | B1 | | 3/2004 | Martin |
| 6,810,370 | B1 | * | 10/2004 | Watts, III ........................ 703/10 |

(Continued)

OTHER PUBLICATIONS

COMSOL Multiphysics User's Guides, version 3.5a, pp. 1-638, Nov. 2008.*

(Continued)

*Primary Examiner* — Kibrom K Gebresilassie
(74) *Attorney, Agent, or Firm* — Nixon Peabody LLP

(57) ABSTRACT

Systems and methods for generating a model tree structure for a multiphysics modeling system include the acts of transmitting a plurality of selectable physics options for association with at least one of combined systems. An input associated with a selection of at least one of the plurality of selectable physics options is received. One or more selectable study options are transmitted for association with the combined systems. An input associated with a selection of at least one of the one or more selectable study options is received. In response to receiving the input associated with the selection at least one of the one or more selectable study options, a model tree structure is generated using the one or more processing units. The model tree structure includes a plurality of selectable nodes including one or more parent nodes and one or more child nodes. The selectable nodes include fields storing physical quantities and operations for modeling the combined systems.

22 Claims, 37 Drawing Sheets

(56) References Cited

U.S. PATENT DOCUMENTS

| | | | |
|---|---|---|---|
| 7,519,518 B2* | 4/2009 | Langemyr et al. | 703/2 |
| 7,539,688 B2 | 5/2009 | Sezgin et al. | |
| 7,596,474 B2 | 9/2009 | Langemyr et al. | |
| 7,623,991 B1 | 11/2009 | Langemyr et al. | |
| 7,818,730 B1 | 10/2010 | Ryan et al. | |
| 7,945,344 B2 | 5/2011 | Wang | |
| 8,301,286 B2 | 10/2012 | Babu et al. | |
| 8,341,270 B2 | 12/2012 | Mazzaferri et al. | |
| 8,355,407 B2 | 1/2013 | Wookey et al. | |
| 8,457,932 B2* | 6/2013 | Langemyr | G06F 17/12 703/2 |
| 8,548,620 B2 | 10/2013 | Pettibone | |
| 8,626,475 B1* | 1/2014 | Fontes et al. | 703/2 |
| 2004/0034514 A1* | 2/2004 | Langemyr et al. | 703/2 |
| 2006/0146057 A1 | 7/2006 | Blythe | |
| 2006/0236268 A1 | 10/2006 | Feigenbaum | |
| 2007/0043546 A1 | 2/2007 | Fontes et al. | |
| 2007/0075450 A1 | 4/2007 | Belegundu et al. | |
| 2007/0112842 A1* | 5/2007 | Gould et al. | 707/102 |
| 2007/0244676 A1 | 10/2007 | Shang | |
| 2008/0177518 A1* | 7/2008 | Krishnamoorthy et al. | 703/9 |
| 2008/0249756 A1 | 10/2008 | Chaisuparasmikul | |
| 2008/0294778 A1 | 11/2008 | Wang | |
| 2009/0141658 A1* | 6/2009 | Day et al. | 370/256 |
| 2010/0042380 A1 | 2/2010 | Suh | |
| 2010/0076738 A1* | 3/2010 | Dean et al. | 703/7 |
| 2010/0121472 A1* | 5/2010 | Babu | B23K 31/02 700/104 |
| 2010/0274535 A1 | 10/2010 | McDaniel | |
| 2010/0332355 A1* | 12/2010 | Lopez et al. | 705/27.1 |
| 2011/0202159 A1 | 8/2011 | Wang | |
| 2012/0179426 A1* | 7/2012 | Fontes et al. | 703/1 |

OTHER PUBLICATIONS

Comsol Ab "Comsol Multiphysics User's Guide" Version 3.5a, Nov. 2008.*
COMSOL Multiphysics, CAD Import Module, User's Guide, Version 4.0, dated Oct. 2009, 56 pages.
COMSOL, Introduction to LiveLink™ for SolidWorks®, Version 4.2, dated May 2011, 26 pages.
COMSOL, LiveLink™ for SolidWorks®, User's Guide, Version 4.2, dated May 2011, 69 pages.
COMSOL Multiphysics, LiveLink™ for Inventor®, User's Guide, Version 4.0, dated Apr. 2010, 62 pages.
COMSOL Multiphysics, LiveLink™ for MATLAB®, User's Guide, Version 4.0, dated Apr. 2010, 102 pages.
COMSOL Multiphysics, LiveLink™ for Pro/ENGINEER®, User's Guide, Version 4.0, dated Apr. 2010, 62 pages.
COMSOL Multiphysics, LiveLink™ for SolidWorks®, User's Guide, Version 4.0, dated Apr. 2010, 62 pages.
COMSOL Multiphysics®, Comsol API Reference Guide, Version 4.0 Beta 1, dated Oct. 2009, 440 pages.
COMSOL Multiphysics®, Reference Guide, Version 4.0, dated Apr. 2010, 426 pages.
COMSOL Multiphysics®, User's Guide, Version 4.0 Beta 1, dated Oct. 2009, 492 pages.
E. Fontes & L. Langemyr, COMSOL V4 presentation, Sep. 2009, 18 pages.
COMSOL Java API, Reference Guide, Version 4.2, dated May 2011, 651 pages.
COMSOL Multiphysics®, Physics Interface Builder User's Guide, Version 4.2 Beta, dated May 2011, 144 pages.
"FEMLAB 2.2: New Features. © 2001"; Printed from http://www.technician.ac.il/-leonidb/BurteinSite/Femib22About.htm.
"FEMLAB® Installation and New Features Guide"; Version 2.3 Nov. 2002.
Anderson, D.G.; "Iterative Procedures for Nonlinear Integral Equations"; *Journal of the ACM*; vol. 12; issue 4; Oct. 1965.
Brenner et al.; "The Mathematical Theory of Finite Element Methods"; *Springer-Verlag* 1-12 (1994), The Finite Element Method: 1-12.
Canova et al.; "Integral Solution of Nonlinear Magnetostatic Filed Problems"; IEEE Transactions on Magnetics; May 2001; vol. 37; No. 3; pp. 1070-1077.
Dahlquist, et al.; "Numerical Methods"; *Prentice Hall*; 284-355 (1974); Interpolation: 284-285; Linear Solver: 146-172; Time-Dependent Solver: 347-355; and Eigenvalue Solver: 208-211; Damped Newton Method: 248-253.
Davenport et al.; "Computer Algebra Systems and Algorithms for Algebraic; Computation"; *Academic Press* 28-32; (1993) Symbolic Differentiation: 28-32.
Eyheramendy et al.; "Object-orientated Finite Elements II. A Symbolic Environment for Automatic Programming"; *Computer Methods in Applied Mechanics and Engineering*; 132; pp. 277-304; (1996).
Felippa et al.; "Partitioned Anaylsis of Coupled Mechanical Systems"; *Department of Aerospace Engineering Sciences and Center for Aerospace Structures*, University of Colorado at Boulder, Report No. CU-CAS-99-06; 31 pages; (1999).
FEMLAB; "Chemical Engineering *MODULE*"; For Use With Matlab Windows, Unix, Linux, MacIntosh; Version 2.2; Copyright 1994-2001 by COMSOL AB.
FEMLAB; "Electromagnetics Module"; For Use With Matlab Windows, Unix, Linux, MacIntosh; Version 2.2; Copyright 1994-2001 by COMSOL AB.
FEMLAB; "Installation Guide";For Use With Matlab Windows, Unix, Linux, MacIntosh; Version 2.2; Copyright 1994-2001 by COMSOL AB.
FEMLAB; "Model Library," For Use With MATLAB V5, Windows 95/98, Windows NT; Unix; Version 1.0 (Copyright 1994-1998 by COMSOL AB).
FEMLAB; "Model Library"; For Use With Matlab Windows, Unix, Linux, MacIntosh; Version 2.2; Copyright 1994-2001 by COMSOL AB.
FEMLAB; "Reference Manual, "For User With MATLAB V5, Windows 95/98, Windows NT, Unix, Version 1.0"" (Copyright 1994-1998 by COMSOL AB).
FEMLAB; "Structural Mechanics Engineering Module"; For Use With FEMLAB (Copyright 1994-1998).
FEMLAB; "User's Guide and Instruction"; For Use With Matlab Windows, Unix, Linux, MacIntosh; Version 2.2; Copyright 1994-2001 by COMSOL AB.
FEMLAB; "User's Guide and Introduction"; For Use With MATLAB V5, Windows 95/98, Windows NT; Unix, Version 1.0 (Copyright 1994-1998 by COMSOL AB).
FEMLAB; Referenced Manual; For Use With Matlab Windows, Unix, Linux, MacIntosh; Version 2.2; Copyright 1994-2001 by COMSOL AB.
Frey et al.; "Mesh Generation, Application to Finite Elements"; *Hermes*; Paris 88-90; (2000) Mesh Search: 88-90.
George et al.; "Delaunay Triangulation and Meshing"; *Herme*;, Paris 33-238 (1998) Delaunay triangulation: 33-46, 50-59; Constrained triangulation: 73-99; and Parametric surface meshing: 161-173; Optimizations: 215-238.
Jentsch et al.; "Non-local Approach in Mathematical Problems of Fluid-Structure Interaction"; *Mathematical Methods in the Applied Sciences*; 22; pp. 13-42; (1999).
Jerome; "Numerical Approximation of PDE System Fixed Point Maps via Newton's Method"; Department of Mathematics Northwestern University; pp. 1-21; (1991).
Johnson, C.; "Numerical Solution of Partial Differential Equations by the Finite Element Method"; *Studentlitteratur*; 14-18 (1987) Test Function 14-18.
Mathworks, Inc.; "Partial Differential Equation Toolbox: User's Guide"; For Use with MATLAB © (Copyright 1984-1997 The Mathworks, Inc.).
Persson, P.; "Implementation of Finite Element-Based Navier-Stokes Solver 2.094-Project"; Apr. 25, 2002; http://www.mit.edu/-persson/nsfem_report.pdf.
Rao, P.; "An Efficient Scalable Finite Element Model for Simulating large Scale Hydrodynamic Flows"; $16^{th}$ ASCE Engineering Mechanics Conf.; Jul. 16-18; 2003 Printed Jan. 10, 2007.htp://www.ce.washington.edu/em03/proceedings/authorindex.htm.

(56) References Cited

OTHER PUBLICATIONS

Ribeiro, P.; "Non-linear Forced Vibrations of Thin/Thick Beams and Plates by the Finite Element and Shooting Method"; Computers and Structures; May 2004; vol. 82; pp. 1413-1423.
Saitz, J.; "Newton-Raphson Method and Fixed-Point Technique in Finite Element Computation of Magnetic Field Problems in Media with Hysteresis"; IEEE Transactions on Magnetics; May 1999; vol. 35; No. 3; pp. 1398-1401.
Stroustrup: "The C++ Programming Language"; *Addison-Wesley Publishing Company*; pp. 133-134, p. 152, pp. 169-170, pp. 191-193; (1986).
Von Estorff et al.; "On Fem-Bem Coupling for Fluid-Structure Interaction Analyses in the Time Domain"; *International Journal for Numerical Methods in Engineering*; vol. 31; pp. 1151-1168; (1991).
Wilks; "Primer on Object-Oriented Programming,"; http:/www.eimc.brad.ac.uk/java/tutorial/Project1/ooprim.htm(1996).
Zienkiewicz et al.; "The Coupling of the Finite Elements Method and Boundary Solution Procedures"; *International Journal for Numerical Methods in Engineering*; vol. 11; pp. 355-375; (1977).
Zienkiewicz et al.; "*The Finite Element Method, Third Edition*"; McGraw-Hill book Company (UK) Limited; pp. 42-51 and pp. 178-195; (1977).
Zienkiewicz et al.; "The Finite Element Method"; *McGraw-Hill* 1:23-177; Basis Function: 23-26; Quadrature Formulas, Gauss Points, Weights: 175-177.
Rao, P. "An Efficient Scalable Finite Element Model for Simulating large Scale Hydrodynamic Flows", 16$^{th}$ ASCE Engineering Mechanics Conf., Jul. 16-18, 2003, Printed Jan. 10, 2007, retrieved from http://www.ce.washington.edu/em03/proceedings/authorindex.htm, 8 pages total, pp. 1-8.
Persson, P. "Implementation of Finite Element-Based Navier-Stokes Solver 2.094-Project", Apr. 25, 2002, retrieved from http://www.mit.edu/-persson/nsfem_report.pdf, 26 pages total, pp. 1-25.
Mathworks, Inc., "Partial Differential Equation Toolbox: User's Guide," For Use with MATLAB, Computer Solutions Europe AB, © 1984-1997, first printing Aug. 1995, 288 pages total, pp. 1-2 to 5-97.
Wilks, M., "Primer on Object-Oriented Programming," retrieved from http:/www.eimc.brad.ac.uk/java/tutorial/Project1/ooprim.htm, written in 1996, printed May 29, 2004, 5 pages total, p. 1 of 3 to 3 of 3 and 1 of 2 to 2 of 2.
FEMLAB, "Reference Guide," For Use With MATLAB V5, Windows 95/98, Windows NT, Unix, Version 1.0, © 1994-1998, COMSOL AB, first printing Jul. 1998, 105 pages total, pp. 3-2 to 3-103.
FEMLAB, "User's Guide and Introduction," For Use With MATLAB V5, Windows 95/98, Windows NT, Unix, Version 1.0, © 1994-1998, COMSOL AB, first printing Jul. 1998, 134 pages total, pp. 1-2 to 1-123.
FEMLAB, "Model Library," For Use With MATLAB V5, Windows 95/98, Windows NT, Unix, Version 1.0, © 1994-1998, COMSOL AB, first printing Jul. 1998, 170 pages total, pp. 2-2 to 2-168.
FEMLAB, "Structural Mechanics Engineering Module," For Use With FEMLAB, © 1994-1998, COMSOL AB, first printing Jul. 1998, 382 pages total, pp. 1-2 to 6-141.
FEMLAB, "Installation Guide," For Use With Matlab, Windows, Unix, Linux, MacIntosh; Version 2.2; © 1994-2001, third printing Nov. 2001, COMSOL AB, 42 pages total, pp. 6-2 to 6-30.
FEMLAB, "Reference Manual," For Use With Matlab, Windows, Unix, Linux, Macintosh; Version 2.2; © 1994-2001, second printing Nov. 2001, COMSOL AB, 192 pages total, pp. 3-2 to 3-180.
FEMLAB, "Chemical Engineering Module," For Use With Matlab, Windows, Unix, Linux, Macintosh; Version 2.2; © 1994-2001, third printing Nov. 2001, COMSOL AB, 240 pages total, pp. 1-2 to 3-29.
FEMLAB, "Model Library," For Use With Matlab, Windows, Unix, Linux, Macintosh; Version 2.2; © 1994-2001, COMSOL AB, second printing Nov. 2001, 420 pages total, pp. 2-2 to 2-406.
FEMLAB, "User's Guide and Introduction," For Use With Matlab, Windows, Unix, Linux, Macintosh; Version 2.2; © 1994-2001, second printing Nov. 2001, COMSOL AB, 410 pages total, pp. 1-2 to 1-388.
FEMLAB, "Electromagnetics Module," For Use With Matlab, Windows, Unix, Linux, Macintosh; Version 2.2; © 1994-2001, COMSOL AB, second printing Nov. 2001, 366 pages total, pp. 1-2 to 4-6.
FEMLAB, "Installation and New Features Guide," Version 2.3, © 1994-2002, COMSOL AB, fourth printing Jun. 2002, 67 pages total, pp. 6-2 to 6-50.
FEMLAB 2.2: New Features, retrieved from http://www.technician.ac.il/-leonidb/BurteinSite/Femib22About.htm, © 2001, printed on Jul. 20, 2005, 4 pages total, pp. 1 of 4 to 4 of 4.
Anderson, D.G. "Iterative Procedures for Nonlinear Integral Equations." Journal of the ACM. vol. 12, issue 4, Oct. 1965, 17 pages total, pp. 1 of 3 to 3 of 3 and pp. 547 to 560.
File History: Langemyr et al., U.S. Appl. No. 90/009,728, which is a reexamination of U.S. Pat. No. 7,596,474, which is a parent to U.S. Appl. No. 12/487,762; on-line documents through Feb. 7, 2012, retrieved from http://portal.uspto.gov/external/portal/pair; 732 pages.
Nilsson, Bernt "Beta Edition of COMSOL Multiphysics Version 4.0 Released at Fifth Annual COMSOL Conference," Oct. 16, 2009, 5 pages.
COMSOL AB "Introduction to Comsol Multiphysics," Version 4.0, 1998-2010, Apr. 2010, 53 pages.
COMSOL AB "Introduction to Comsol Multiphysics," Version 4.0a, 1998-2010, Jun. 2010, 97 pages.
COMSOL AB "COMSOL Quick Start," Version 4.0 Beta 2, 1998-2010, Feb. 2010, 36 pages.
COMSOL AB "COMSOL Quick Start, " Version 4.0, 1998-2009, Oct. 2009, 36 pages.
E. Fontes & L. Langemyr, "COMSOL V4 presentation," Sep. 2009, 18 pages.
Bunus, "Debugging and Structural Analysis of Declarative Equation-Based Languages," Department of Computer and Information Science, 2002, 178 pages.
COMSOL AB, "COMSOL Multiphysics User's Guide," Version 3.5a, 1998-2008, Nov. 2008, 638 pages total (see, *inter alia*, pp. 151 of 638; 159 of 638; 218 of 638; and 236-241 of 638).
COMSOL AB, "COMSOL Multiphysics Quick Start and Quick Reference," Version 3.5a, 1998-2008, Nov. 2008, 122 pages total (see, *inter alia*, pp. 31-33 of 122; 64 of 122; and 69 of 122).

\* cited by examiner

SYSTEM AND METHOD FOR ACCESSING SETTINGS IN A MULTIPHYSICS MODELING SYSTEM USING A MODEL TREE

CROSS-REFERENCE TO RELATED APPLICATIONS

This application is a continuation-in-part of U.S. application Ser. No. 12/981,404, filed Dec. 29, 2010, which claims priority to and the benefits of U.S. Provisional Application No. 61/290,839, filed on Dec. 29, 2009, U.S. Provisional Application No. 61/360,038, filed Jun. 30, 2010, and U.S. Provisional Application No. 61/377,841, filed on Aug. 27, 2010, the disclosures of each of the foregoing applications being hereby incorporated by reference herein in their entireties.

FIELD OF THE INVENTION

The present invention relates generally to systems and methods for modeling and simulation, and more particularly, to model tree structures for a multiphysics modeling system.

BACKGROUND

Computer design systems are used to develop product designs and include graphical user interfaces. Computer design systems may be complemented with packages analyzing a single aspect of a design, such as, structural analysis in conjunction with computer-aided design systems. It would be desirable to have design systems that can operate in more complex environments.

SUMMARY OF THE INVENTION

According to one aspect of the present disclosure, a method for generating a model tree structure for a multiphysics modeling system configured to model combined systems having physical quantities represented in terms of partial differential equations is executable on one or more processors associated with the multiphysics modeling system. The method comprises the acts of transmitting a plurality of selectable physics options for association with at least one of the combined systems. An input associated with a selection of at least one of the plurality of selectable physics options is received via the one or more processors. One or more selectable study options is transmitted for association with the combined systems. An input associated with a selection of at least one of the one or more selectable study options is received via the one or more processors. In response to receiving the input associated with the selection at least one of the one or more selectable study options, a model tree structure is generated using the one or more processors. The model tree structure includes a plurality of selectable nodes including parent nodes and child nodes, wherein the selectable nodes include fields storing physical quantities and operations for modeling the combined systems.

According to another aspect of the present disclosure, a method for solving a multiphysics model in a multiphysics modeling system includes the multiphysics model having combined systems with physical quantities represented in terms of partial differential equations. The multiphysics modeling system is configured to receive model inputs via a model tree. The method is executable on one or more processors associated with the multiphysics modeling system, and comprises the acts of generating a geometric representation of the combined systems. The geometric representation are at least partially based on data received via a geometry node. Physical properties for the geometric representation of the combined systems are assembled. The physical properties are at least partially based on data received via a materials node. Physics quantities and boundary conditions are assembled for one or both of the geometric representation and the physical properties of the combined systems. The assembling of the physics quantities and boundary conditions are at least partially based on selected physics options received via a physics node. A solution for the multiphysics model of the combined systems is generated. The solution is based on partial differential equations for one or more study steps associated with the assembled physics quantities and boundary conditions. The study steps are received via a study node. The geometry node, materials node, physics node, and study node are logically associated branches of a model tree for the multiphysics model.

According to yet another aspect of the present disclosure, a method for generating model constituents associated with a multiphysics model in a multiphysics modeling system is executed on one or more processors. The method comprises representing, via one or more user interfaces, a plurality of model constituents as one or more selectable primary nodes of a model tree. Operations are represented that generate the model constituents as one or more selectable secondary nodes to the primary nodes. Physical quantities associated with said model constituents are represented via at least one of the selectable primary nodes of the model tree. Contributions to partial differential equations in the multiphysics modeling system are generated via the one or more processors, via operations represented as at least one of the selectable secondary nodes to the at least one of the selectable primary nodes.

According to further aspects of the present disclosure, one or more non-transitory computer readable media are encoded with instructions, which when executed by at least one processor associated with a design system or a multiphysics modeling system, causes the at least one processor to perform the above methods.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

Features and advantages of the present disclosure will become more apparent from the following detailed description of exemplary embodiments thereof taken in conjunction with the accompanying drawings in which.

Figure 1:
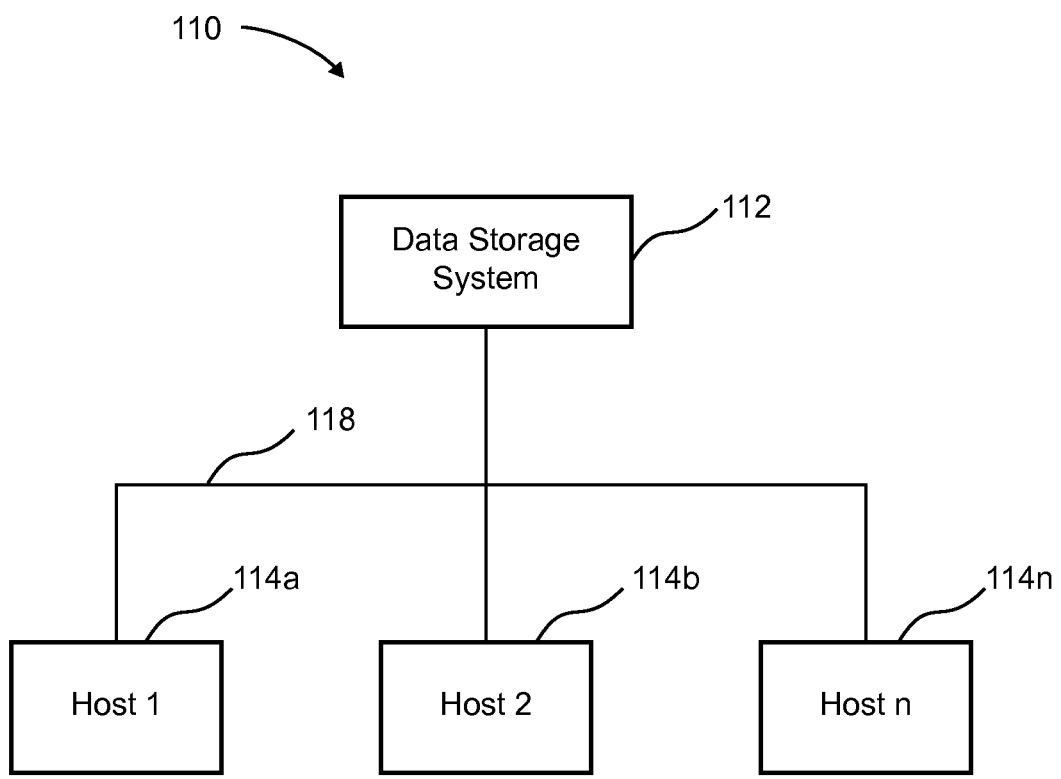
FIG. 1 illustrates an exemplary aspect of a computer system.

While the present disclosure is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While the present disclosure is susceptible of embodiment in many different forms, there is shown in the drawings and will herein be described in detail various aspects of the invention with the understanding that the present disclosure is to be considered as an exemplification of the principles of the invention and is not intended to limit the broad aspects of the invention to the aspects illustrated.

Computer systems may be used for performing a variety of different tasks. One aspect for using a computer system includes executing one or more computer programs stored on computer readable media (e.g., temporary or fixed memory, magnetic storage, optical storage, electronic storage, flash memory, other storage media). A computer program may include instructions which, when executed by a processor, perform one or more tasks. In certain embodiments, a computer system executes machine instructions, as may be generated, for example, in connection with translation of source code to machine executable code, to perform modeling and simulation, and/or problem solving tasks. One technique, which may be used to model and simulate physical phenomena or physical processes, is to represent various physical properties and quantities, of the physical phenomena or physical processes being modeled and simulated, in terms of variables and equations or in other quantifiable forms that may be processed by a computer system. In turn, these equations or other quantifiable forms may be solved by a computer system configured to solve for one or more variables associated with the equation, or the computer may be configured to solve a problem using other received input parameters.

It is contemplated that computer programs for modeling and simulating physical phenomena or physical processes may provide many advantages particularly as the complexity of the physical phenomena or physical processes being modeled and simulated increases. For example, in certain embodiments a user can combine one or more physical phenomena into a multiphysics model. To further illustrate this example, a user may combine phenomena described by chemical kinetics and fluid mechanics, electromagnetic phenomena and structural mechanics, or other physics phenomena. Such multiphysics models may also involve multiple physical processes. For example, a process may be combined that includes an amplifier powering an actuator, where both the amplifier and the actuator are a part of one multiphysics model. Multiphysics modeling can also include solving coupled systems of partial differential equations (PDEs). Exemplary multiphysics modeling systems include the COMSOL® 4.1 or COMSOL Multiphysics® simulation software operating on a computer system, as such software is available from COMSOL, Inc. of Burlington, Mass. Additional exemplary aspects of multiphysics modeling systems are described in U.S. patent application Ser. No. 10/042,936, filed on Jan. 9, 2002, now issued as U.S. Pat. No. 7,596,474, U.S. patent application Ser. No. 09/995,222, filed on Nov. 27, 2001, now issued as U.S. Pat. No. 7,519,518, and U.S. patent application Ser. No. 09/675,778, filed on Sep. 29, 2000, now issued as U.S. Pat. No. 7,623,991, the disclosures of which are each hereby incorporated by reference herein in their entireties.

An automatic technique for combining the one or more physical phenomena may be desirable such that the combination of the phenomena together may be modeled and accordingly represented in terms of coupled physical properties and quantities described by variables in systems of PDEs. It may also be desirable for the automatic technique to provide for selectively solving for one or more variables associated with the system of PDEs and/or for solving the variables associated with one or more of the individual PDEs. This can allow for different techniques to be utilized for solving a system of PDEs associated with a singular or coupled physical quantit(ies) and/or physical propert(ies).

It may be desirable in certain embodiments to model the physical quantities of coupled multiple processes using different sets of PDEs, defined for different geometries and/or in different coordinate systems, to represent the different coupled multiple processes. It is contemplated that in certain embodiments, systems of PDEs defined for multiple geometries can be desirable. PDEs can provide an efficient and flexible arrangement for defining various couplings between the PDEs within a single geometry, as well as, between different geometries.

It is contemplated that computer systems on which multiphysics modeling systems operate, such as the modeling systems described herein, can include networked computers or processors. In certain embodiments, processors may be operating directly on the multiphysics modeling system user's computer, and in other embodiments, a processor may be operating remotely. For example, a user may provide various input parameters at one computer or terminal located at a certain location. Those parameters may be processed locally on the one computer or they may be transferred over a local area network or a wide area network, to another processor, located elsewhere (e.g., another room, another building, another city) that is configured to process the input parameters. The second processor may be associated with a server connected to the Internet (or other network) or the second processor can be several processors connected to the Internet (or other network), each handling select function(s) for developing and solving a problem on the multiphysics modeling system. It is further contemplated that the results of the processing by the one or more processors can then be assembled at yet another server or processor. It is also contemplated that the results may be assembled back at the terminal or computer where the user is situated. The terminal or computer where the user is situated can then display the solution of the multiphysics modeling system to the user via a display (e.g., a transient display) or in hard copy form (e.g., via a printer). Alternatively or in addition, the solution may be stored in a memory associated with the terminal or computer, or the solution may be stored on another server that the user may access to obtain the solution from the multiphysics modeling system.

It is contemplated that in certain embodiments a product or process may be in the development or feasibility stage where it is being designed or analyzed. The product or process being developed or analyzed may need to be assessed for use in complex environment(s) involving several physical properties and quantities. It can be desirable to solve complex multiphysics problems by systematically varying parametric and geometric features in a computer-based design system. Other desirable features may include, for example, having a computer-based system for solving complex multiphysics problems in which the settings for the physical properties and boundary conditions, located in a memory and used to form multiphysics models and/or solve multiphysics problems, can be accessed directly from the design system. For example, access can occur through an interface between the design system and the multiphysics modeling system or an interface within one of the design system or the multiphysics modeling system. It is contemplated that the interface may be virtual or reside in a permanent memory. It is also contemplated the interface may at least partially include physical hardware components that may or may not also include computer program components for allowing useful interactions between the design system and the multiphysics modeling system.

Referring now to FIG. 1, an exemplary aspect of a computer system is illustrated that may be used with the methods described elsewhere herein. The computer system 110 includes a data storage system 112 connected to host systems 114a-114n through communication medium 118. In this embodiment of the computer system 110, the "n" hosts 114a-114n may access the data storage system 112, for example, in performing input/output (I/O) operations. The communication medium 118 may be any one of a variety of networks or other type of communication connections as known to those skilled in the art. For example, the communication medium 118 may be the Internet, an intranet, or other network connection by which the host systems 114a-114n may access and communicate with the data storage system 112, and may also communicate with others included in the computer system 110.

Each of the host systems 114a-114n and the data storage system 112 included in the computer system 110 may be connected to the communication medium 118 by any one of a variety of connections as may be provided and supported in accordance with the type of communication medium 118. The processors included in the host computer systems 114a-114n and the data manager system 116 may be any one of a variety of commercially available single or multi-processor system, such as an Intel-based processor, IBM mainframe, server, or other type of commercially available processor able to support incoming traffic in accordance with each particular embodiment and application.

It should be noted that the particulars of the hardware and software included in each of the host systems 114a-114n, as well as those components that may be included in the data storage system 112 are described herein in more detail, and may vary with each particular embodiment. Each of the host computers 114a-114n, as well as the data storage system 112, may all be located at the same physical site, or, alternatively, may also be located in different physical locations. Examples of the communication medium that may be used to provide the different types of connections between the host computer systems, the data manager system, and the data storage system of the computer system 110 may use a variety of different communication protocols such as SCSI, ESCON, Fiber Channel, or functional equivalents that are known to those skilled in the art. Some or all of the connections by which the hosts, data manager system 116 and data storage system 112 may be connected to the communication medium 18 may pass through other communication devices, such as a Connectrix or other switching equipment that may exist, both physical and virtual, such as a phone line, a repeater, a multiplexer or even a satellite.

Each of the host computer systems may perform different types of data operations, such as storing and retrieving data files used in connection with an application executing on one or more of the host computer systems. For example, a computer program may be executing on the host computer 114a and store and retrieve data from the data storage system 112. The data storage system 112 may include any number of a variety of different data storage devices, such as disks, tapes, and the like in accordance with each implementation. As will be described in following paragraphs, software may reside and be executing on any one of the host computer systems 114a-114n. Data may be stored locally on the host system executing software, as well as remotely in the data storage system 112 or on another host computer system. Similarly, depending on the configuration of each computer system 110, software as described herein may be stored and executed on one of the host computer systems and accessed remotely by a user on another computer system using local data. A variety of different system configurations and variations are possible then as will be described in connection with the embodiment of the computer system 110 of FIG. 1 and should not be construed as a limitation of the techniques described elsewhere herein.

Figure 2:
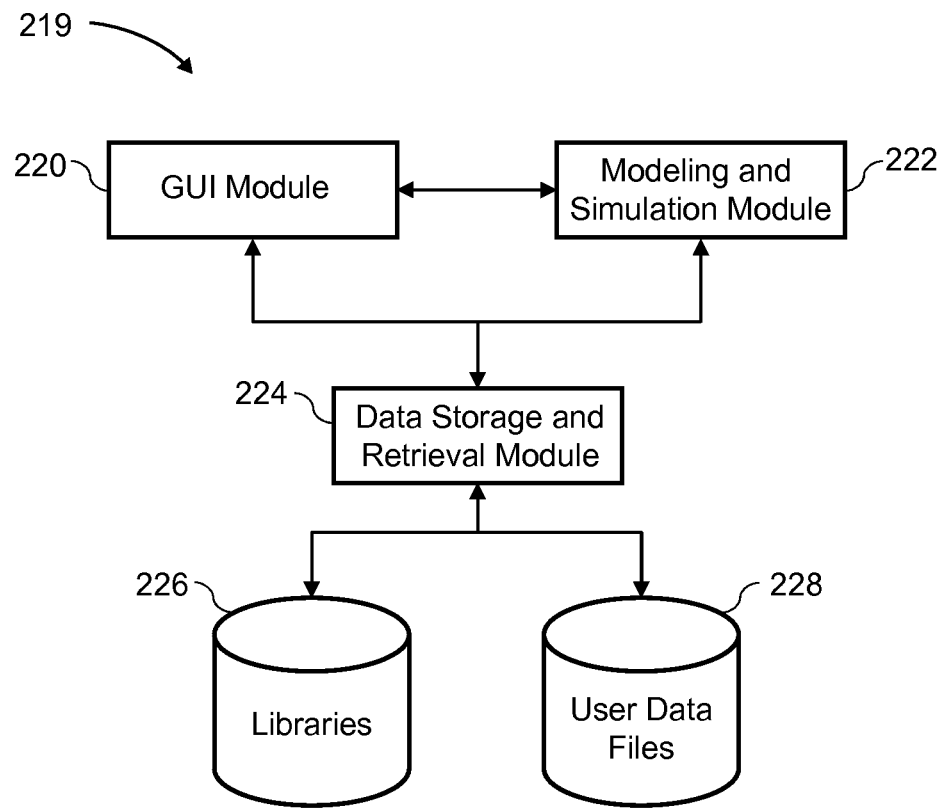
FIG. 2 illustrates an exemplary aspect of software that may reside and be executed in one of the hosts of FIG. 1.

Referring now to FIG. 2, an exemplary aspect of a modeling system 219 is illustrated that may reside, for example, in software form on a single computer or in one of a plurality of host computer systems (e.g., host computers 114a-114n). The modeling system may be divided into several software components. One exemplary aspect of the system may include a GUI module 220, a Modeling and Simulation module 222, and a Data Storage and Retrieval module 224. The GUI module 220 can provide for interactions with system users. The Modeling and Simulation module 222 can provide an ability to manage and perform a multiphysics simulation. The Data Storage and Retrieval module 224 can provide an ability to load and save the model in a file, and to load and store other types of files which may be used during the simulation or may be used as input or output to the simulation.

The GUI module 220 may communicate with the Modeling and Simulation module 222 by sending and receiving commands. The act of sending and receiving commands may be performed through an application programming interface ("API") or other similar components. In one aspect of the system, the API may be object oriented and mix data and function calls within the same structure. In another aspect of the system, the API may use a data structure that is separate from function calls.

It is contemplated that in certain aspects of the present disclosure components of the multiphysics modeling system may reside on different host computer systems. For example, the GUI module 220 may reside on a personal computer host and the Modeling and Simulation module 222 may reside on a server computer host. It is further contemplated that the Data Storage and Retrieval module 224 may reside on either the personal computer host or the server computer host, or yet another separate computer host. If the computer hosts are not identical, the API can be configured to use a computer network to communicate between hosts. In one embodiment, an object oriented API may be configured to send data and method calls over the computer network or in another embodiment send data and function calls between the software components over a computer network. The API may also be able to handle a Data Storage and Retrieval module 224 which may be located either on the host of the GUI module 220 or the Modeling and Simulation module 222, or on a separate host. In each of those cases, the Data Storage and Retrieval module 224 may be configured to load and store files on each of those hosts.

It is contemplated that in certain aspects, the system 219 may include, or be configured with, software components other than what is described and represented in the modeling system 219 illustrated in FIG. 2. In the exemplary aspect illustrated in FIG. 2, Libraries 226 and the User Data Files 228 can be stored locally within the host computer system. It is further contemplated that in certain aspects, the Libraries 226 and/or User Data Files 228, as well as copies of these, may be stored in another host computer system and/or in the Data Storage System 112 of the computer system 110. However, for simplicity and explanation in paragraphs that follow, it may be assumed in a non-limiting manner that the system 219 may reside on a single host computer system such as 114a with additional backups, for example, of the User Data Files and Libraries, in the Data Storage System 112.

In certain aspects of the present disclosure, portions of the modeling system 219, such as the GUI module 220, the Modeling and Simulation module 222, the Data Storage and Retrieval module 224, and/or the Libraries 226 may be included or executed in combination with commercially available software package(s). These components may operate on one of the host systems 114a-114n, and may include one or more operating systems, such as, Windows XP®, Windows 7, Windows HPC Server 2008 R2, Unix®, or Linux®. It is further contemplated that the modules of the modeling system 219 may written in any one of a variety of computer programming languages, such as, C, C++, C#, Java®, or any combination(s) thereof, or other commercially available programming languages.

It is contemplated that the GUI module 220 may display GUI windows in connection with obtaining data for use in performing modeling, simulation, and/or other problem solving for one or more processes and/or physics phenomena under consideration by a system user. The one or more processes and/or phenomena may be assembled and solved by the Modeling and Simulation module 222. That is, user data may be gathered or received by the system using modules, such as the GUI module 220, and subsequently used by the Modeling and Simulation module 222. Thereafter, the data may be transferred or forwarded to the Data Storage and Retrieval module 224 where the user-entered data may be stored in a separate data structure (e.g., User Data Files 228). It is contemplated that other data and information may also be stored and retrieved from a separate data structure, such as Libraries 226, which may be used by the Modeling and Simulation module 222 or in connection with the GUI module 220.

The various data files that may be associated with a modeling system, such as User Data Files 228 and the Libraries 226, may be stored in any one of a variety of data file formats in connection with a file system used in the host computer system or in the Data Storage System 112. In certain aspects, the system 219 may use any one of a variety of database packages in connection with the storage and retrieval of data. The User Data files 228 may also be used in connection with other software simulation and modeling packages. For example, the User Data files 228 may be stored in a format that may also be used directly or indirectly as an input to any one of a variety of other modeling packages, such as SolidWorks®, Autodesk Inventor®, Creo Elements/Pro, MATLAB®, or Microsoft Excel®. In certain aspects, data may be imported and/or exported between the multiphysics modeling system and another system, such as MATLAB® or Microsoft Excel®, for example. The format of the data may be varied or customized in accordance with each of the system(s) as well as in accordance with additional functionalities that each of the system(s) may include.

It is contemplated that the systems and methods described herein may be used for combining physics interfaces that model different physical phenomena or processes. The combination of a plurality of physics interfaces can be referred to as a multiphysics model. Properties of the physics interfaces can be represented by PDEs that may be automatically combined to form PDEs describing physical quantities in a coupled system or representation. The coupled PDEs may be displayed, for example, in an "Equation view" that allows for the coupled PDEs to be modified and used as input into a solver. It is also contemplated that the PDEs may be provided to the solver either independently as one PDE or a system of PDEs, describing a single phenomenon or process, or as one or several systems of PDEs describing several phenomena or processes.

In certain aspects of the present disclosure, a multiphysics modeling system can provide an ability to combine physics interfaces that model physical properties through one or more GUIs that allow a user to select one or more physics interfaces from a list. In addition to displaying physics interfaces names, it is further contemplated that variable names for physical quantities may be selected through a GUI. It is contemplated that the physics interfaces may have different formulations that depend on a "Study" settings feature, which is described in more detail elsewhere herein.

It is further contemplated that it may be desirable for a multiphysics modeling system to provide the ability to access predefined combinations of several physics phenomena for defining multiphysics model(s). The predefined combinations may be referred to as multiphysics interfaces, which similar to the physics interfaces, may also have different formulations that depend on a study settings feature.

It is contemplated that in certain aspects of the present disclosure physical properties can be used to model physical quantities for component(s) and/or process(es) being examined using the modeling system, and the physical properties can be defined using a GUI that allow the physical properties to be described as numerical values. In certain aspects, physical properties can also be defined as mathematical expressions that include one or more numerical values, space coordinates, time coordinates, and/or the actual physical quantities. In certain aspects, the physical properties may apply to some parts of a geometrical domain, and the physical quantity itself may be undefined in the other parts of the geometrical domain. A geometrical domain or "domain" may be partitioned into disjoint subdomains. The mathematical union of these subdomains forms the geometrical domain or "domain". The complete boundary of a domain may also be divided into sections referred to as "boundaries". Adjacent subdomains may have common boundaries referred to as "borders". The complete boundary is the mathematical union of all the boundaries including, for example, subdomain borders. For example, in certain aspects, a geometrical domain may be one-dimensional, two-dimensional, or three-dimensional in a GUI. However, as described in more detail elsewhere herein, the solvers may be able to handle any space dimension. It is contemplated that through the use of GUIs in one implementation, physical properties on a boundary of a domain may be specified and used to derive the boundary conditions of the PDEs.

Additional features of a modeling system, such as feature that may be found in the Modeling and Simulation module 222, may provide for automatically deriving a system of PDE's and boundary conditions for a multiphysics model. This technique can include merging the PDEs of the plurality of phenomena or processes, and may produce a single system of coupled PDEs, also using coupling variables or operators to couple processes in different coordinate systems, and may perform symbolic differentiation of the system of PDEs with respect to all the dependent variables for later use by the solver.

It is contemplated that in certain aspects, a coupled system of PDEs may be modified before being differentiated and sent to the solver. The modification may be performed using a settings window included in a GUI displaying the combined PDEs in an "Equation view". When the system of PDEs is modified in this way, the settings for the corresponding physical properties can become "locked". The properties may subsequently be unlocked by a user taking certain action(s).

It is contemplated that certain aspects of the present disclosure may include features for modeling one or more of a plurality of engineering and scientific disciplines, including, for example, acoustics, chemical reactions, diffusion, electromagnetism, fluid dynamics, geophysics, heat transfer, porous media flow, quantum mechanics, semiconductor devices, structural mechanics, wave propagation, and the like. Certain aspects of a modeling system may involve more than one of the foregoing disciplines and can also include representing or modeling a combination of the foregoing disciplines. Furthermore, the techniques that are described herein may be used in connection with one or more systems of PDEs.

It is contemplated that in certain aspects of the present disclosure, system(s) of PDEs may be represented in general, coefficient, and/or weak form. The coefficient form may be more suitable in connection with linear or almost linear problems, while the general and weak forms may be better suited for use in connection with non-linear problems. The system(s) being modeled may have one or more associated studies, for example, such as stationary, time dependent, eigenvalue, or eigenfrequency. In the aspects described herein, a finite element method (FEM) may be used to solve for the PDEs together with, for example, adaptive meshing, adaptive time stepping, and/or a choice of a one or more different numerical solvers.

It is contemplated that in certain aspects of the present disclosure, a finite element mesh may include simplices forming a representation of a geometrical domain. Each simplex can belong to a unique subdomain, and a union of the simplices can form an approximation of the geometrical domain. The boundary of the domain may also be represented by simplices of the dimensions 0, 1, and 2, for geometrical dimensions 1, 2, and 3, respectively.

It is further contemplated that a mesh representing a geometry may also be created by an outside or external application and may subsequently be imported for use into the modeling system(s) described in the present disclosure.

The initial value of the solution process may be given as numerical values, or expressions that may include numerical values, space coordinates, time coordinates and the actual physical quantities. The initial value(s) may also include physical quantities previously determined.

The solution of the PDEs may be determined for any subset of the physical properties and their related quantities. Further, any subset not solved for may be treated as initial values to the system of PDEs.

It is contemplated that it may be desirable for a user to select a space dimension, combinations of physics, and a type of study in a multiphysics modeling system using a model wizard. The model wizard may take the user through these selection steps and it may also allow for the combination of several space dimensions, several physics, and several studies or study steps in a multiphysics model.

Figure 3:
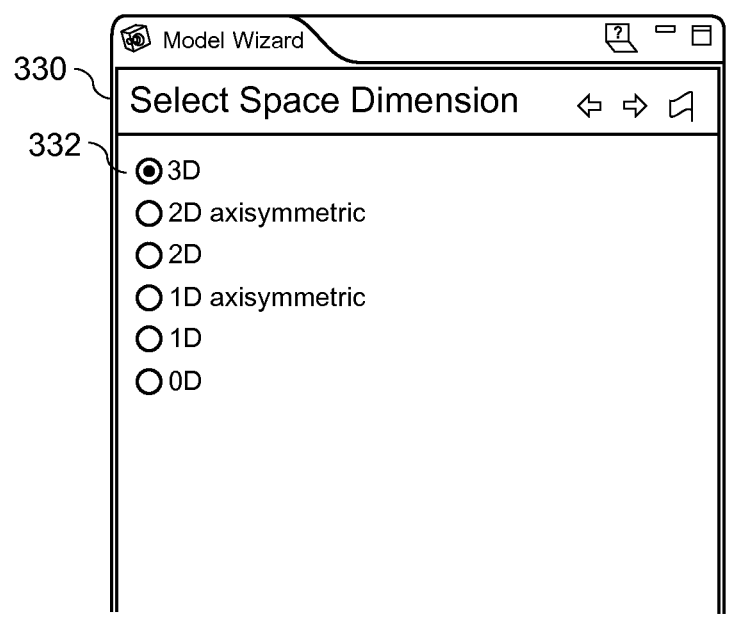
FIG. 3 illustrates an exemplary aspect of a graphical user interface for specifying space dimensions.

Referring now to FIG. 3, an exemplary aspect of a user interface or GUI 330 is illustrated that may be used to specify a space dimension 332 of a multiphysics model. The model may be specified in coordinate systems of the space dimensions including 0 dimensional (space independent, only time dependent), 1-dimensional, 1-dimensional axisymmetric, 2-dimensional, 2-dimensional axisymmetric, and 3-dimensional. It is further contemplated that a user may also combine models involving several of the above mentioned coordinate systems in order to describe phenomena or processes comprising multiple parts or scales.

Figure 4:
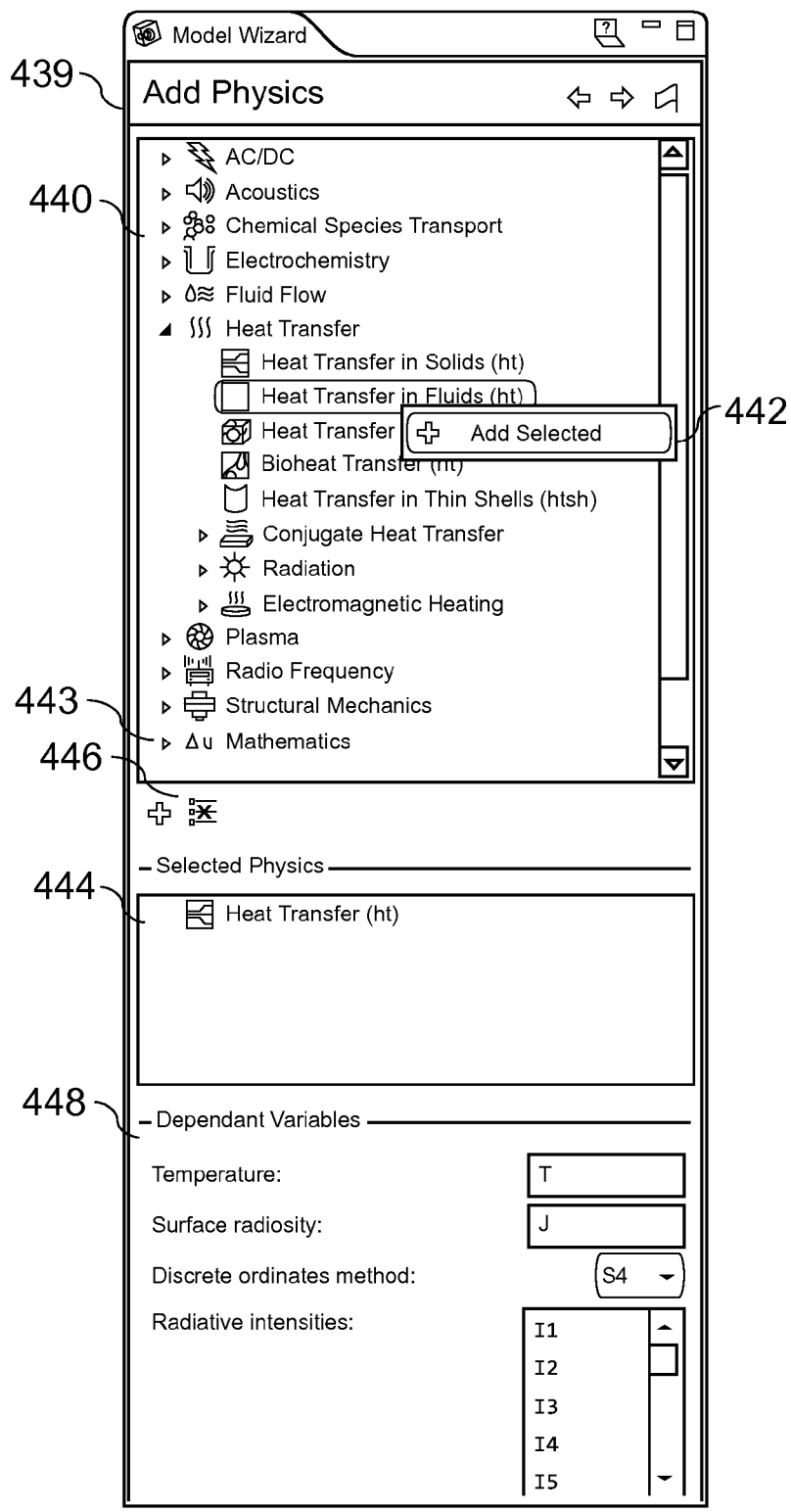
FIG. 4 illustrates an exemplary aspect of a graphical user interface for specifying physics interface(s).

Referring now to FIG. 4, an exemplary aspect of a user interface or GUI 439 is illustrated that may be used to specify a multiphysics model having a combination of more than one phenomena or process(es) (e.g., acoustics, heat transfer, structural mechanics). It is contemplated that each phenomenon or process to be combined may correspond to a physics interface. Through the use of the GUI 439, the physics interfaces that are to be used in this combined multiphysics model may be specified. Each physics interface can be configured to model physical quantities in terms of PDEs. The physical quantities may be represented either directly as dependent variable(s) in the PDE, or by a relation between the dependent variable and a variable representing the physical quantity. The PDEs in this exemplary aspect may be generally "hidden" (e.g., not made directly visible) from the user through the use of GUIs. As discussed previously, once several physics interfaces are combined into one single model or a system of models, the model or models may be referred to as a multiphysics model.

The GUI 439 also includes an exemplary list of physics interfaces 440 (e.g., AC/DC, Electrochemistry, Radio Frequency, Structural Mechanics) from which a user may select in accordance with a user's choice of space dimensions. To add physics interfaces to a multiphysics model, the user selects physics interfaces from the list and may specify that these physics interfaces are to be included in a multiphysics model. For example, the user may right-click and then select context menu item "Add selected" 442 to add a physics interface (e.g., Heat Transfer in Fluids) to a multiphysics model. After selection, this physics interface is added to the list of "Selected physics" 444 below the physics list in the GUI 439. Physics interfaces may also be removed from the list by selecting a "Remove selected" button 446.

Each physics interface in a multiphysics model is given a unique name that may be used to identify the origin of the variables in the multiphysics model. After adding a physics interface to the "Selected physics" list 446, a user may edit the names of the dependent variables representing the physical quantities being solved for. For example, edits by a user may result in a new name for a variable, such as, for "Temperature" in the "Dependent variables" section 448 of GUI 439.

It is contemplated that the selectable interfaces can also include a mathematics interface 443 that is configured to directly correspond to PDEs. In mathematics interface(s), quantities can be represented by the dependent variables for the multiphysics model. It is contemplated that in certain aspects each mathematics interface may have more than one dependent variable. It is further contemplated that the number of dependent variables and the dimension of the system of PDEs may be entered in the "Dependent variables" section 448 in the GUI 439.

Figure 5:
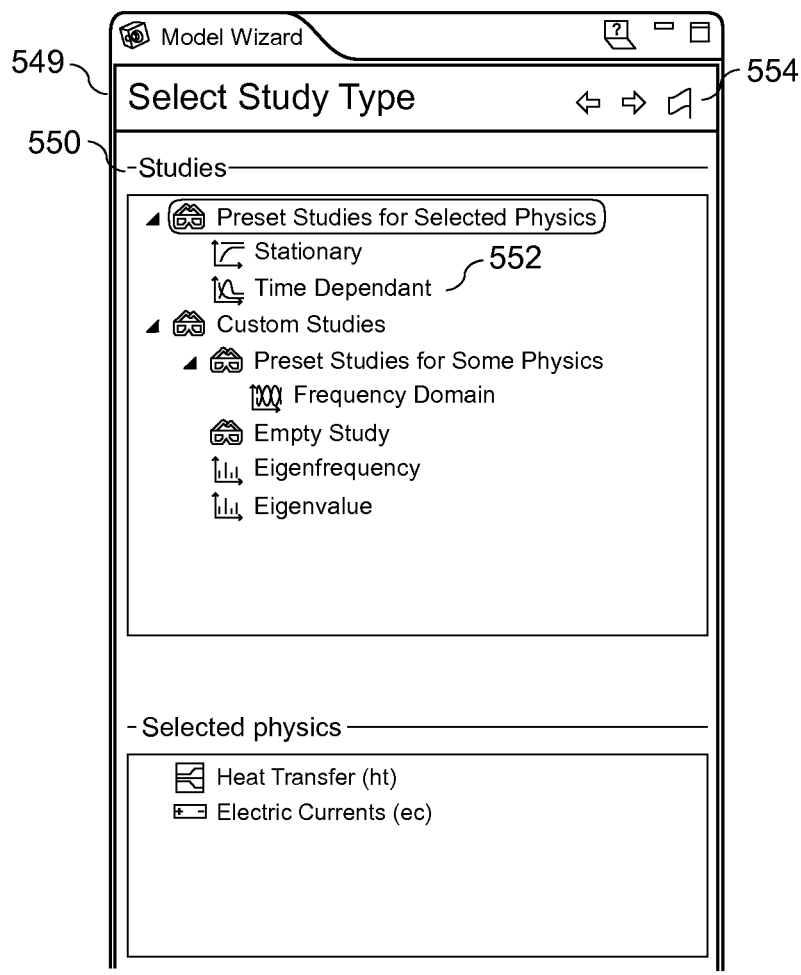
FIG. 5 illustrates an exemplary aspect of a graphical user interface for specifying study type(s).

Referring now to FIG. 5, an exemplary aspect of a user interface or GUI 549 is illustrated for specifying one or more study types for a multiphysics model. In certain aspects of the modeling system, an interface may include preset studies that are associated with selected physics interfaces. The interface may allow for customization of study steps where, for example, the studies for each of the physics interfaces are customized or some of the studies are preset (e.g., stationary, time dependent) and others are customized (e.g., eigenfrequency). It is further contemplated that a study may combine several study steps relevant for a simulation study of a multiphysics model.

It is contemplated that in certain aspect of the present disclosure, a study can determine the type of analysis that may be done on a multiphysics model, such as stationary, time-dependent, eigenvalue, and eigenfrequency. The study may control the type of equation formulation used in a multiphysics model, the type of mesh (e.g., selected from a list of possible meshes), and/or the type of solvers that may be used to solve the different studies or study steps in a multiphysics model. In one exemplary aspect, a study may comprise a stationary study step followed by a transient study step. The study then formulates the equations, meshes, and solvers for the stationary and time-dependent study steps. A user may select a study from the studies list 550 and then finish the model wizard steps by clicking the "Finish" button 554.

It is contemplated that in certain aspects of the present disclosure, multiphysics model data (e.g., selections made in GUIs 330, 439, 549) may be communicated from the GUI (e.g., 220) to the Data Storage and Retrieval Module (e.g., 224) for storage in the User Data Files (e.g., 228). For example, a multiphysics model, such as one generated via model wizard steps previously described in FIGS. 3-5, including geometry, materials, physics interfaces, mesh, studies, and results, may be represented as a model tree in a GUI. Selecting (e.g., left clicking on) a node in a model tree may give a user access to the settings for the corresponding operation represented by the node. Further selection (e.g., right-clicking) of a node may also give a user access to a menu where a user may add properties and operations to the corresponding node. These added properties and operations may be represented as child nodes to the selected node.

It is contemplated that in certain aspects of the present disclosure, the foregoing screen display(s) (e.g., GUI 330) may be displayed by and/or included as part of the software component for the GUI module (e.g., 220) of a modeling system (e.g., 219). It is further contemplated that a modeling system is configured to include different types of physics interfaces, including some that may be predefined and/or some that may be user-defined. A predefined physics interface may be one for which the interface properties are included in Libraries (e.g., 226), and that may, for example, be available from a software vendor (e.g., a software vendor may supply libraries including defined systems of PDEs, analysis types, GUIs and the like for a particular type of system, such as heat transfer). A user-defined physics interface is configured to allow for user-defined models or physics interfaces for which a user may specify the PDEs, the quantities being modeled, and the like. The user-defined model may be saved in a user-defined library, such as a library included in the User Data files (e.g., 228). Definitions and other data files associated with a user-defined model may be stored in any one of a variety of data formats, for example, similar to those of the Libraries (e.g., 226) that may be included in an implementation by a software vendor. It is contemplated that the format and operation may vary for the stored models and model parameters.

Figure 6:
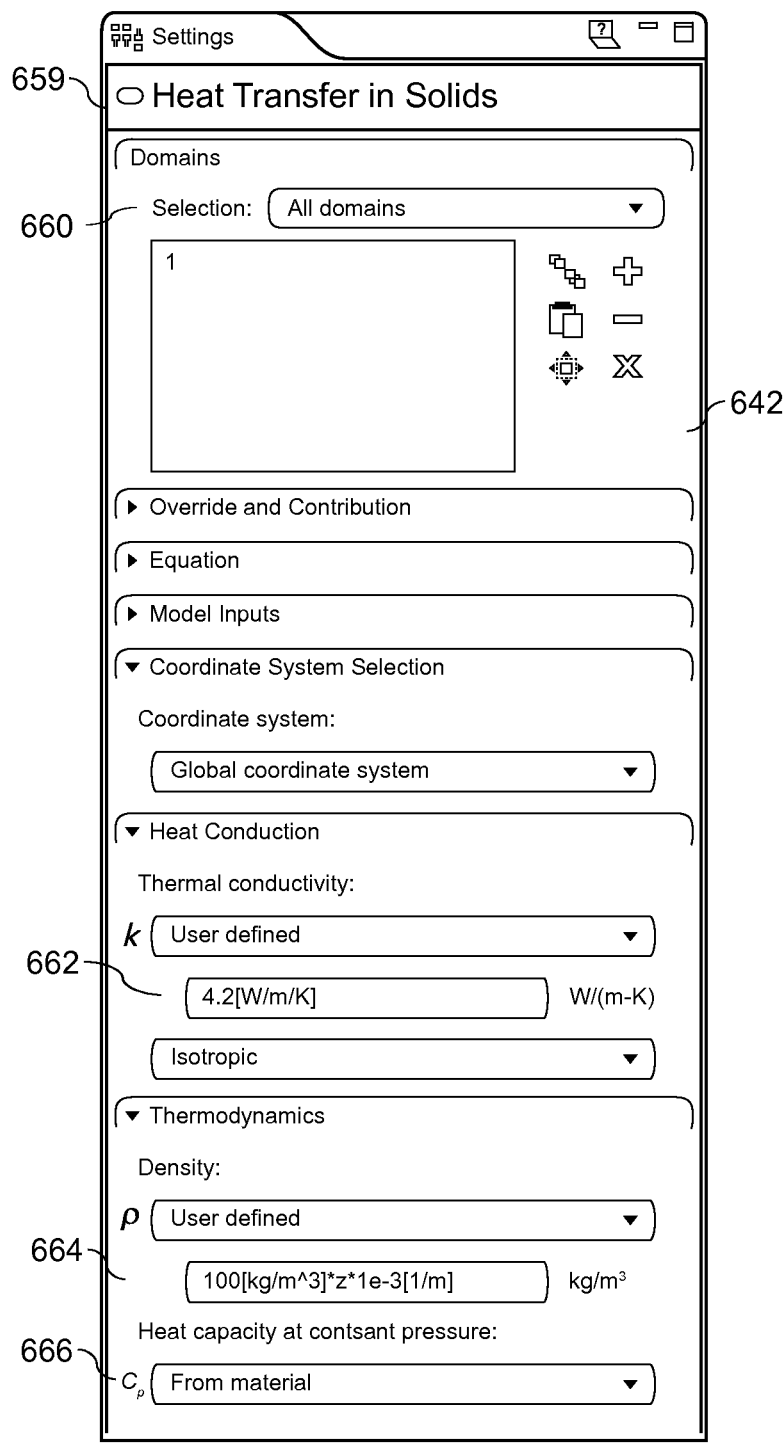
FIG. 6 illustrates an exemplary aspect of a graphical user interface for specifying physical properties for an exemplary physics interface.

Referring now to FIG. 6, an exemplary aspect of a settings window 659 is illustrated for physical property specification of an exemplary physics interface (e.g., heat transfer in solids). It is contemplated that each physics interface may have one or several GUI settings windows customized to the physics phenomena or process for which the physical properties associated with that physics interface may be specified. The physics interface and the settings for a physics interface may be represented as nodes in a model tree. For example, selecting (e.g., right-clicking on) a physics interface node can open a form where a user can do one or more tasks, such as adding domain properties to a physics interface or a setting, renaming the node, or displaying properties about the selected node.

Settings window 659 includes a domain list 660 that may have one or more geometrical domains to which the physical properties may apply. The domains may also be referred to as subdomains. It is contemplated that a user may select (e.g., via a mouse, keyboard, or other selection feature) one or several subdomains by selecting directly from a graphical representation of the geometrical domain in a graphics window. It is also contemplated that in certain aspects, the user may select domains from a predefined selection of domains that represent a specific part of a component being modeled in a multiphysics model.

The physical properties of the domains (or subdomains) are specified in the settings window. As previously described, the physical properties may be expressed in different forms including being specified as numerical values 662, as symbolic expressions in terms of space coordinate(s) 664, physical quantities and their space derivatives, and/or time. It is also contemplated that physical quantities may also be obtained from a materials setting 666 that may be defined elsewhere in the model and as described elsewhere herein. It is further contemplated that a physical property may be specified via a procedure or routine that computes a value of the property. The name or the procedure or routine may be entered in the setting window 659 along with parameters, if any, to be included. In one exemplary aspect, the procedure or routine may be written using C, Fortran, MATLAB®, or Microsoft Excel®. The particular programming language for an implementation may vary in accordance with each particular aspect and the calling standards and conventions included therein.

Figure 7:
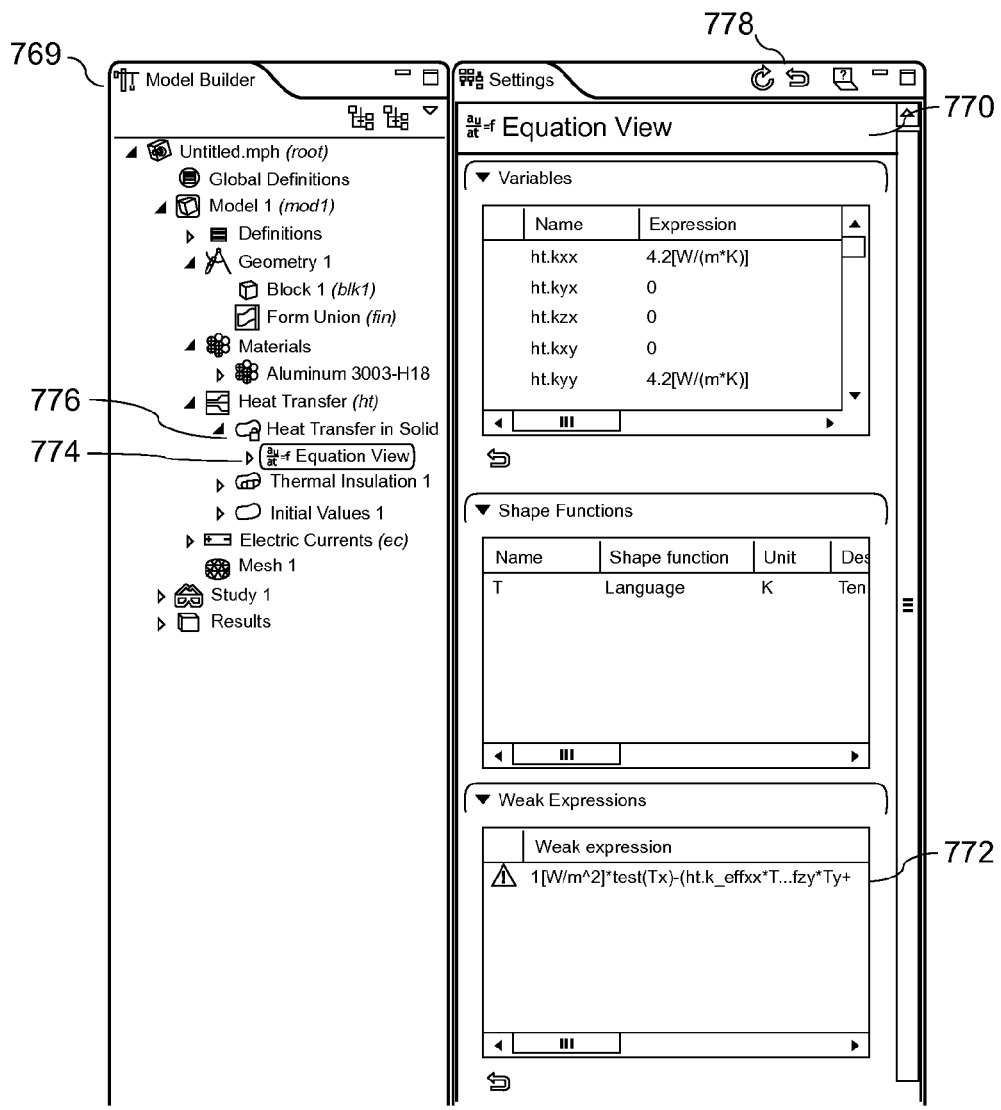
FIG. 7 illustrates an exemplary aspect of a graphical user interface for modifying partial differential equation(s).

Referring now to FIG. 7, an exemplary aspect of a GUI 769 is illustrated that may be used to modify the PDEs via an "Equation view" window. For example, PDEs, such as the exemplary equation 772, may be defined by a physics interface and further displayed and modified by a user in order to introduce description(s) that may not be defined in the settings windows for the corresponding property. In one exemplary aspect, the PDEs may be displayed in response to a user selecting a "Show equation view" element from a menu. It is contemplated that in certain aspects, each property of the model then displays a corresponding "Equation view" with a corresponding settings window 770 where changes to the equations may be made by a user. The "Equation view" may be represented as a child node (e.g., element 774) to a physics interface property node (e.g., element 776). It is contemplated that in certain aspects following a change to the settings window 770 for an "Equation view" node (e.g., element 774), the corresponding settings for the physics interface property may be locked. In one aspect, a lock indicia may be placed on the physics interface icon (e.g., element 776) to indicate that one or more properties for that interface of the model tree are locked. The property may also be unlocked by the user by, for example, selecting a "Reset all" feature 778, or other unlocking element, in the settings window for the corresponding a corresponding "Equation view" node 774.

Figure 8:
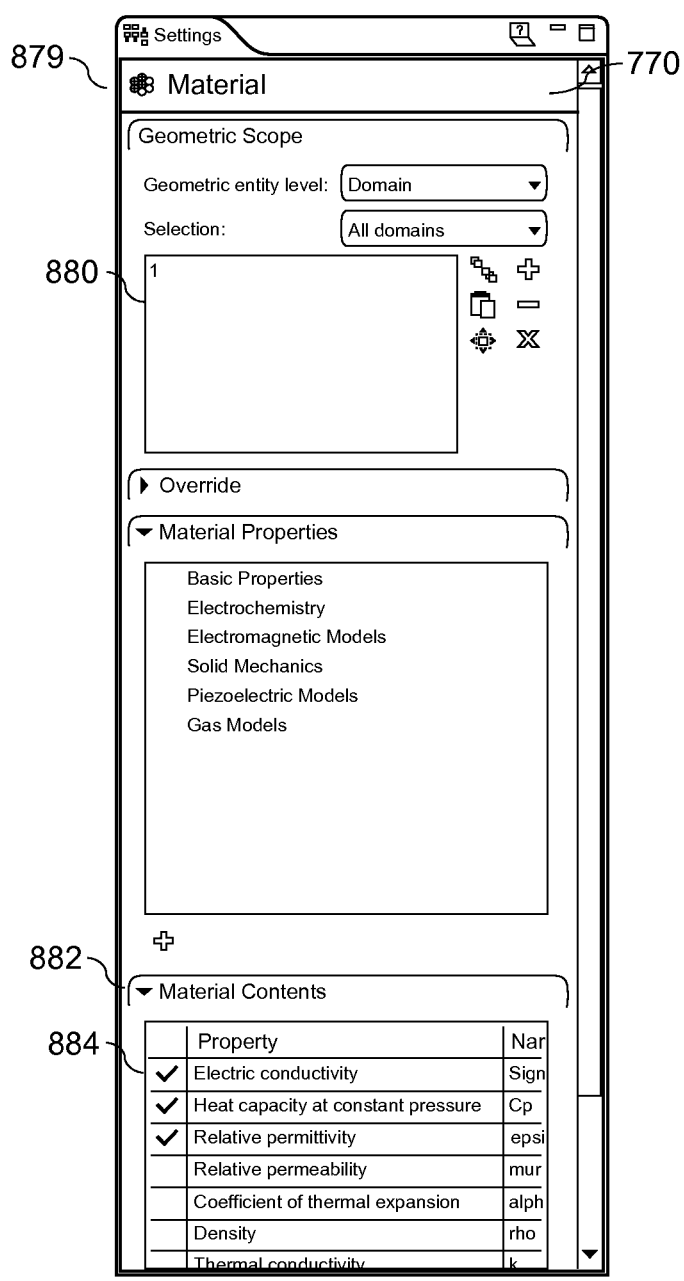
FIG. 8 illustrates an exemplary aspect of a graphical user interface for setting material propert(ies) for a domain in a multiphysics model.

Referring now to FIG. 8, an exemplary aspect a material settings window 879 is illustrated for setting material properties of a domain. Material settings can include material properties for some or all of the physics interfaces included in a multiphysics model. It is contemplated that a model can include different materials that are selected for the different domains identified in the domain list 880. The material properties may be defined by a user or they may be obtained from a predefined materials library. In one aspect of a material settings window, a material contents 882 list may display a status of the material properties for a selected material, in a selected domain, considering the physics interfaces in the multiphysics model. For example, in the context of an exemplary Joule heating process, the material contents list may label, using an icon, the properties associated with a multiphysics process involving Joule heating and the properties described in a multiphysics interface. The exemplary material properties may include, for example, heat capacity, thermal conductivity, electric conductivity, relative permittivity, and density. The material properties for describing Joule heating may be defined via the material settings window 879. Any required material properties may be labeled or otherwise identified with an icon 84 or other indicia (e.g., check mark). If a required material property is not defined, the material contents 882 list can identify the condition by highlighting the corresponding material property row (e.g., using a red stop sign icon).

It is contemplated that materials and material properties defined by a user can be saved and later accessed from user-defined material libraries for use in separate or different models. This aspect provides versatility by allowing users to create material libraries for specific applications and further can allow software developers and vendors to create material libraries for use with a multiphysics modeling system.

It is contemplated that materials and materials properties in a modeling system may be represented via nodes in a model tree. This can allow for materials and material properties to be displayed, renamed, and/or added to a node in a form accessible by a user (e.g., by right-clicking or otherwise selecting the corresponding node in the model tree).

Figure 9:
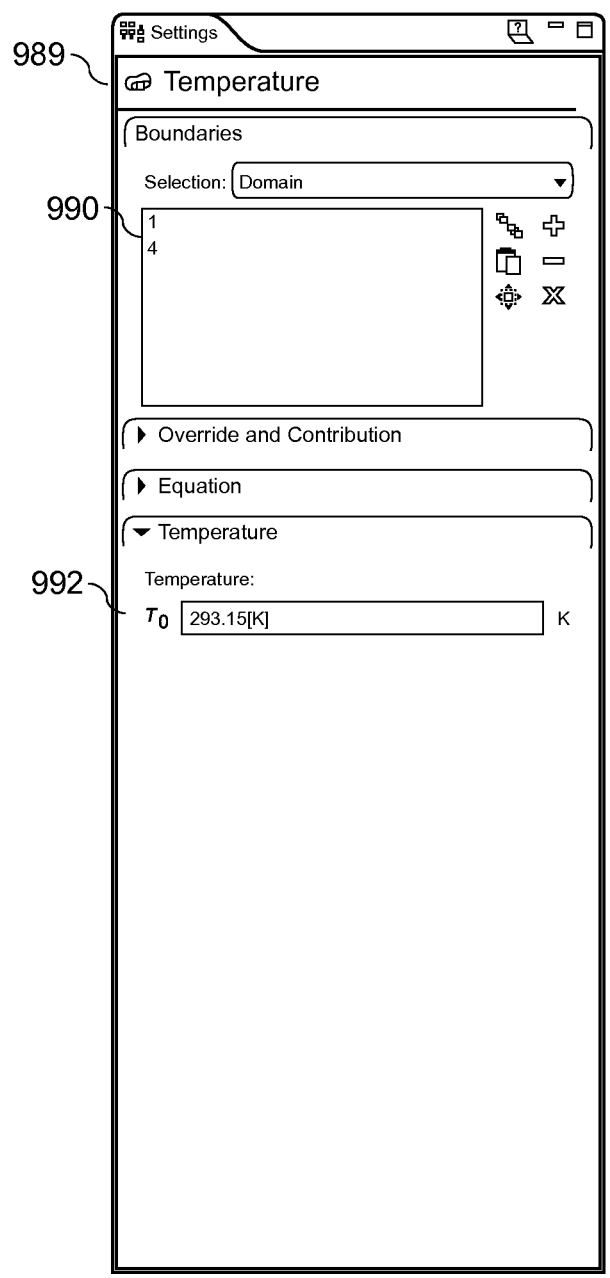
FIG. 9 illustrates an exemplary aspect of a graphical user interface for setting physical boundary condition(s) for an exemplary physics interface.

Referring now to FIG. 9, an exemplary aspect of a boundary condition settings window 989 is illustrated for a physical property boundary condition (e.g., temperature) for a physics interface (e.g. heat transfer interface). The settings window 989 may include a boundary list 990 to identify the geometric boundaries on which physical propert(ies) may apply. It is contemplated that a user can include one or more boundaries in the boundary list by selecting a boundary from graphical representations of the geometrical domain in one or more graphics windows. Selection of the boundary can occur via a selection-type device typically used for a computing system (e.g., mouse, keyboard, other selection device). It is further contemplated that a user may also select boundaries from a predefined selection of boundaries representing a specific portion of the boundary of a component being modeled in a multiphysics model. The specific portion may include the entire, or something less than the entire, boundary of the component.

The physical properties of geometrical boundaries can be specified in the boundary condition settings window 989 for a corresponding boundary. The properties can be expressed as values 992 specified in terms of numerical values, as symbolic expressions in terms of the space coordinates, or based on time. It is also contemplated that the properties can be expressed as the physical quantities and the corresponding space derivatives from a physics interface added using systems described elsewhere herein. It is further contemplated that a procedure or routine to determine the value of a property may also be specified and/or named in a manner similar to as described elsewhere herein.

It is contemplated that boundary condition settings in a modeling system may be represented via nodes in a model tree. This can allow a user to add boundary properties to a physics interface boundary condition, to rename a node, or to display properties about a node (e.g., by right-clicking or otherwise selecting the corresponding node in the model tree).

Figure 10:
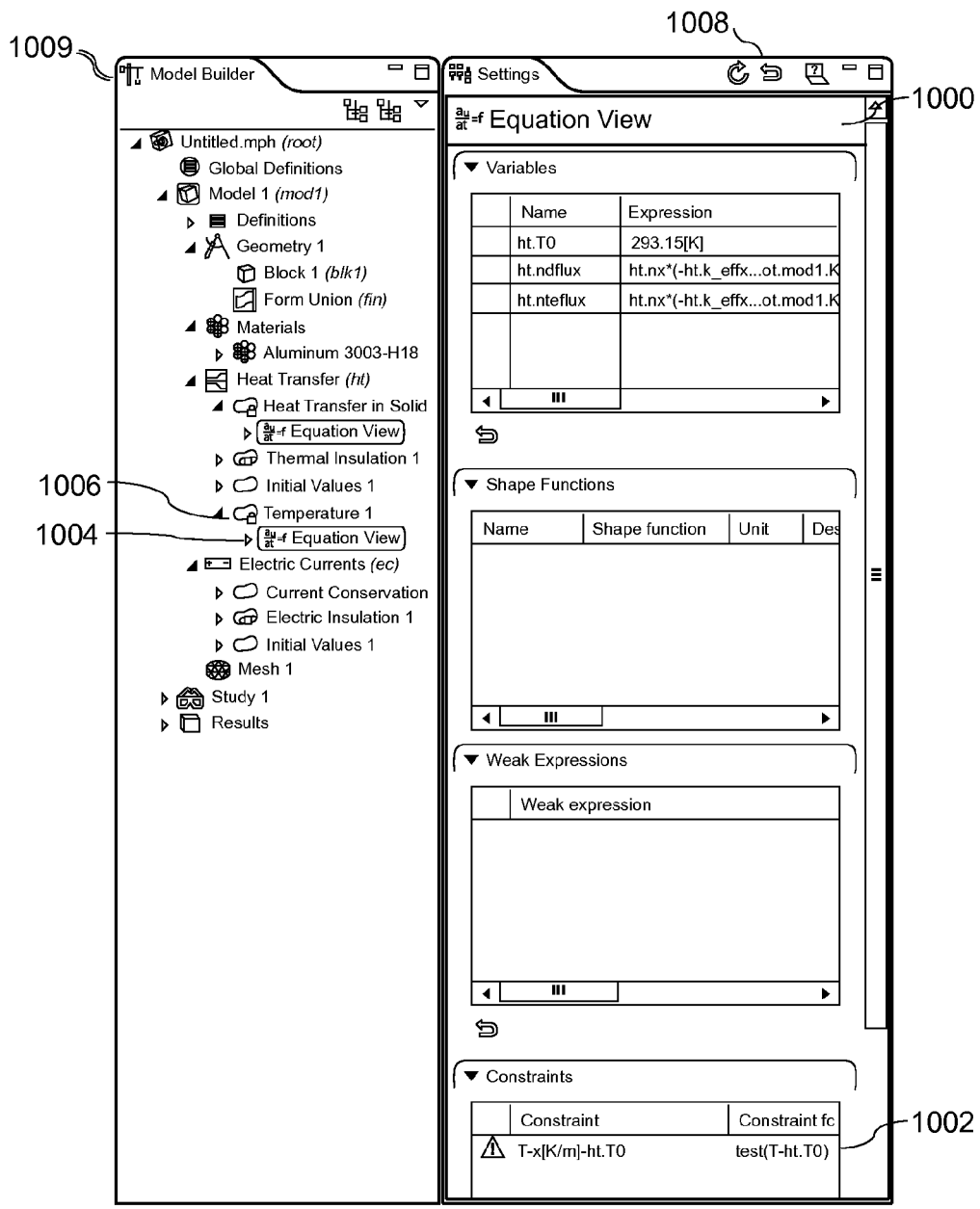
FIG. 10 illustrates an exemplary aspect of a graphical user interface for modifying partial differential equation boundary condition(s).

Referring now to FIG. 10, an exemplary aspect of a GUI 1009 is illustrated for modifying PDE boundary conditions via another "Equation view" feature 1000. Boundary conditions defined by a physics interface may be displayed 1002 and modified by a user in order to introduce description(s) that may not have been defined in the settings window(s) for the corresponding physics interface. In one embodiment, the boundary equations may be displayed by a user selecting, for example, a "Show equation view" item from a Preferences menu (not shown). It is contemplated that following a change to the PDE boundary equations using the "Equation view" feature (e.g., equation view node 1004), the corresponding settings for that boundary condition may be locked. To identify the locked nature of the boundary condition, the boundary condition node 1006 for the boundary condition property in a model tree may include an indicia that looks like a lock. The boundary condition may be unlocked by the user selecting "Reset all" 1008 in the settings window, or some other unlocking feature, for the corresponding property.

Figure 13:
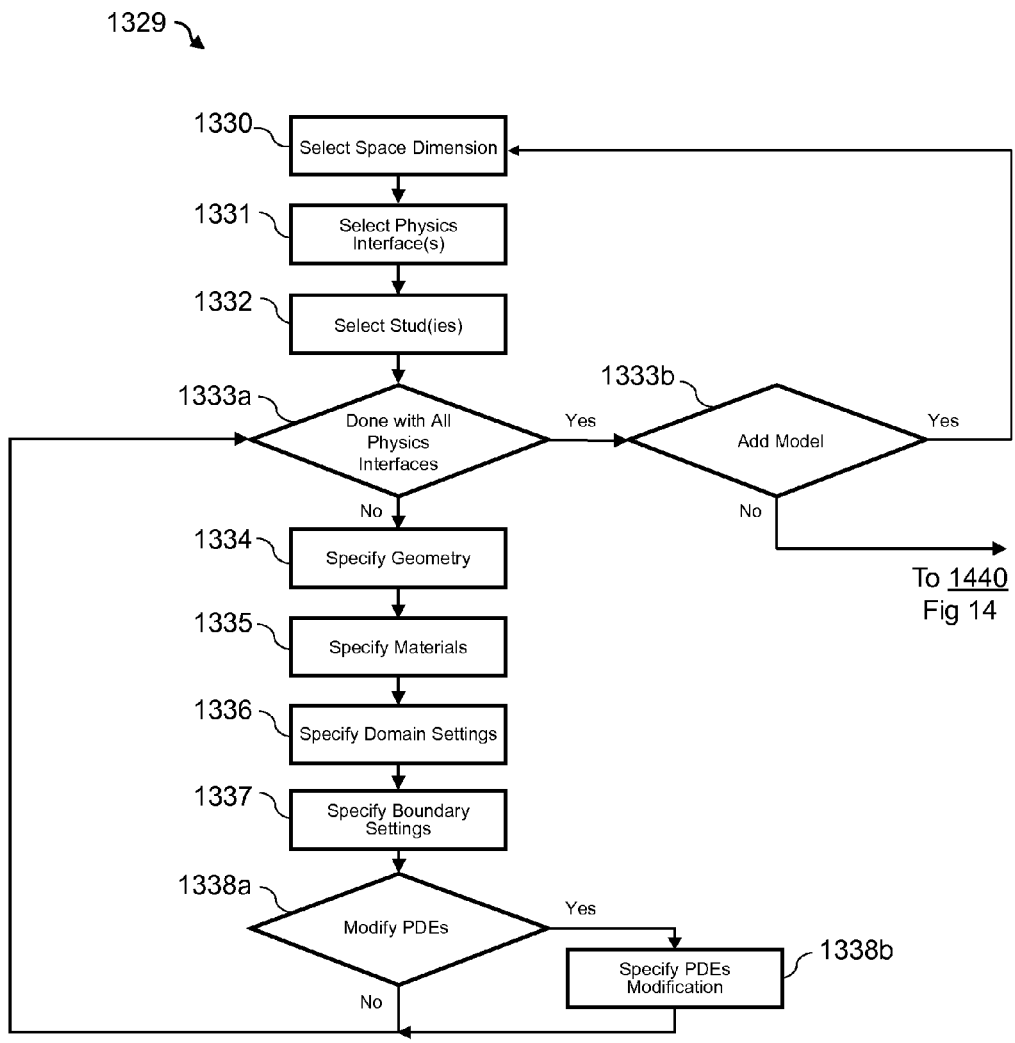
FIGS. 13-15 are flowcharts of steps for an exemplary aspect for specifying and solving systems of partial differential equations in a multiphysics modeling system.
Figure 14:
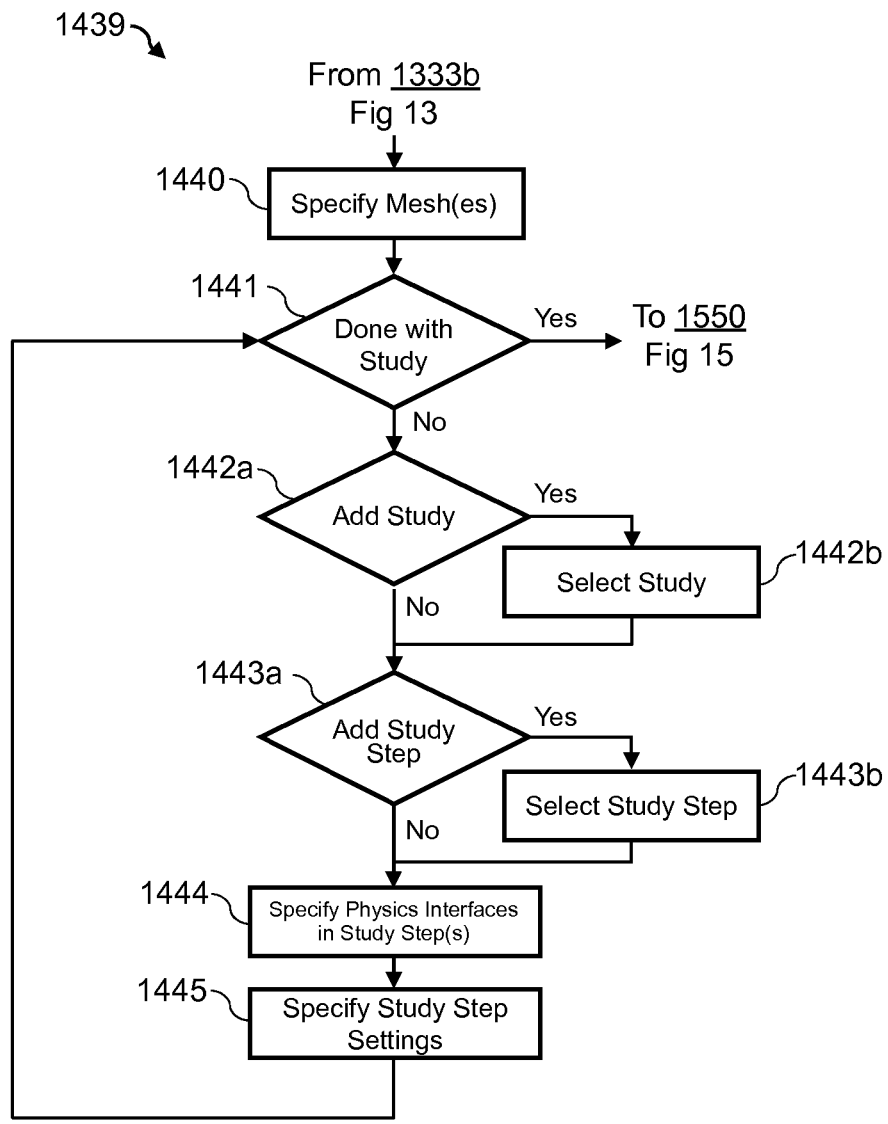
Figure 15:
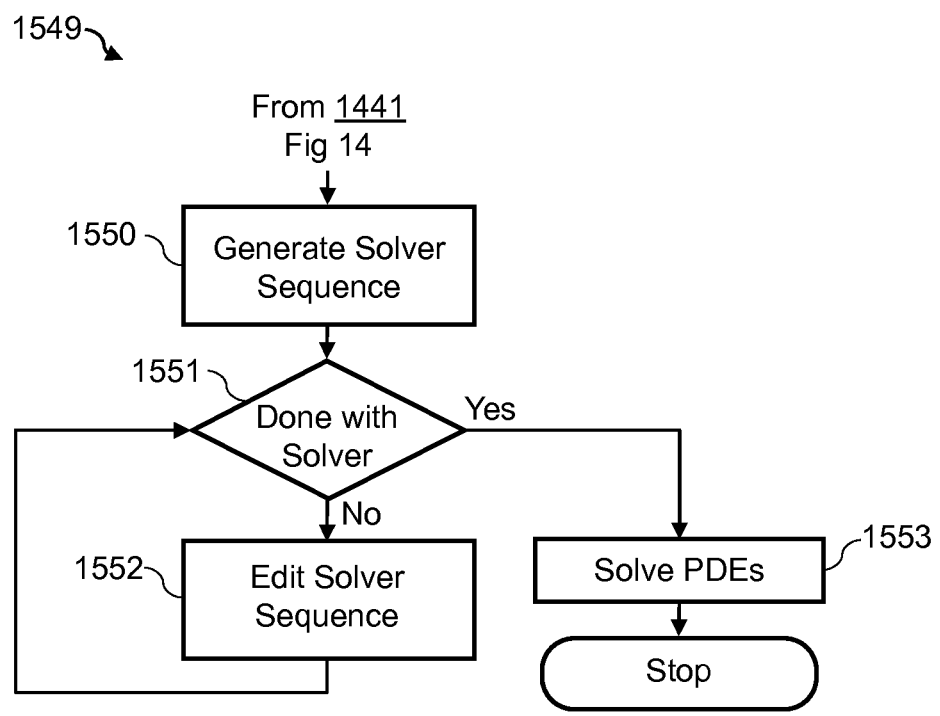

It is contemplated that in certain aspects of a modeling system it may be desirable for the PDEs and boundary conditions for the various selected physics interfaces associated with a coupled system of PDEs to be stored in a model object, which is described in more detail in the descriptions for FIGS. 13-15. A model object may be desirable because if the PDEs and boundary conditions are modified, for example, using the GUI 769 in FIG. 7, the corresponding model object may be updated accordingly. For example, through the use of the settings windows for domains and boundaries, respectively, the physical properties for the domains and boundaries along with possible modifications specified in "Equation view", the Modeling and Simulation Module 222 (see, e.g., FIG. 2) in one exemplary aspect may create, initialize, and modify a model object that includes data associated with a multiphysics model. It is furthermore contemplated that the coupled system of PDEs and associated boundary condition fields may be updated, as well.

Figure 11:
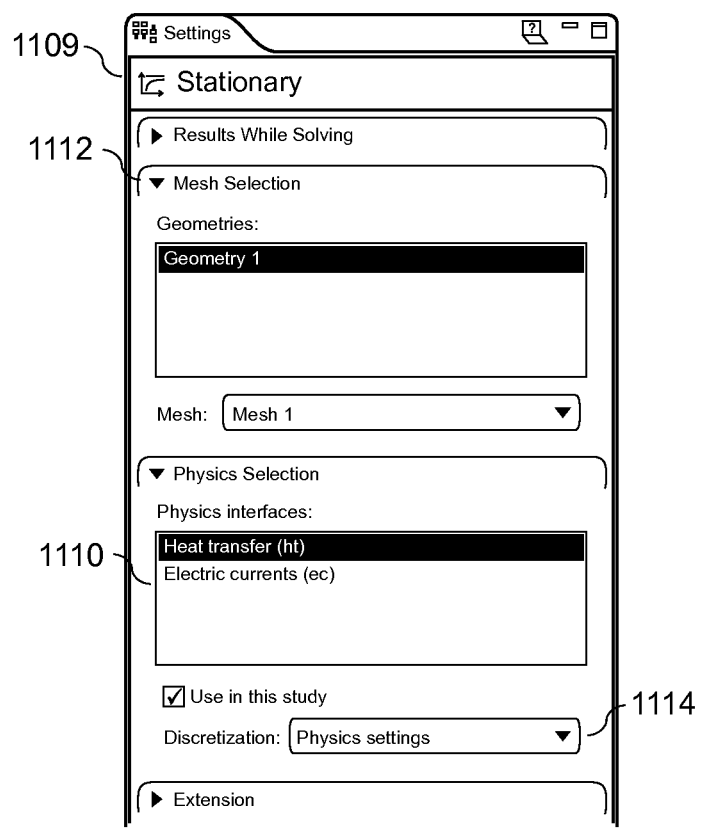
FIG. 11 illustrates an exemplary aspect of a graphical user interface for a setting window associated with a study step used to solve a study including partial differential equations.

Referring now to FIG. 11, an exemplary aspect of another type of settings window 1109 is illustrated for a study step (e.g., stationary, time dependent, frequency) that may be used in connection with solving for a study having one or more study steps. The settings window 1109 may be associated with solving PDEs for any subset of physical quantities from any one or more physics interfaces, or from a coupled PDE system. The GUI for the settings window 1109 includes a physics interfaces display area 1110 that lists the one or more physics interfaces selected for a multiphysics model. The settings window 1109 may also be configured to allow a selection of different meshes 1112 along with different discretization 1114 and tolerances for different study step. It is contemplated that the particular physics interfaces for a model may be selected along with corresponding study step settings. Then, the corresponding PDEs may be solved one at the time in different study steps or the corresponding PDEs may be solved for several physics interfaces as a coupled system of PDEs in each study step.

Figure 12:
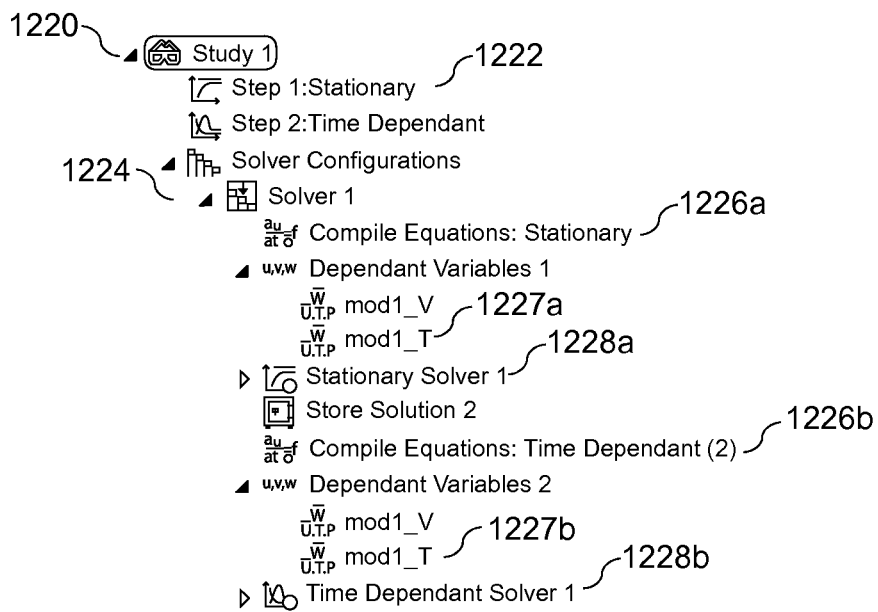
FIG. 12 illustrates an exemplary model tree including a primary node with secondary nodes.

Referring now to FIG. 12, an exemplary aspect of a model tree 1219 is illustrated that includes a study node (e.g., "Study 1" 1220) along with several child nodes (e.g., "Step 1: Stationary" 1222, "Solver Configurations"). The child nodes in this exemplary aspect include study steps (e.g., "Step 1: Stationary" 1222, "Step 2: Time Dependent") and solver node(s) (e.g., "Solver 1" 1224). A parent node (e.g., primary node) and its child nodes (e.g., secondary nodes, subnodes) may be referred to as branches in the model tree (e.g., the study branch 1219). The study branch may include, for example, PDE formulations (e.g., "Compile Equations: Stationary" 1226*a*, "Compile Equations: Time Dependent 2" 1226*b*) and solver settings (e.g., "Stationary Solver 1" 1228*a*, "Time-Dependent Solver 1" 1228*b*) for the different studies (e.g, a stationary and a time-dependent analysis, respectively). It is contemplated that a user may select a subset of the models physics interfaces to be solved in each of the study steps or select to solve for all physics interfaces in every study step. It is further contemplated that a user may also include several model nodes with corresponding physics interfaces, representing models described in different spatial dimensions, and solving a subset of the physics interfaces in each of the study steps or all physics interfaces in every study step. The selection of physics interfaces in each study step and the settings for a study step can also be included in a model object.

The solver branch (e.g., Solver Configurations) of exemplary model tree 1219 is a child node to the study branch (e.g., Study 1) and can also include its own child nodes, such as a solver (e.g., "Solver 1") and/or a dependent variable node (e.g., "Dependent Variables 1"). These child nodes may further have additional or their own child nodes, such as "mod1_V" 1227*a* and "mod1_T" 1227*b*. The dependent variable node may be configured to allow a user to make a finer selection of the solution in every study step, so that the solver may be set to solve or not solve for individual variables within a physics interface. It is contemplated that a selection of dependent variables in the solver step and the settings for a solver step are also reflected in the model object.

The exemplary aspects of the modeling system presented in FIGS. 3-12 are merely examples and are understood to apply to broader physics processes and physic phenomena, not just the processes or phenomena described herein or illustrated in the FIGS. For example, it would be understood that many different physics interfaces may be evaluated beyond the selected physics for heat transfer that is illustrated in FIG. 4. As another example, it is also understood that the multiple equation views can be viewed in FIG. 7 or that many different material properties may be selected in FIG. 8. The illustrated aspects are merely examples of the broader operations that may be performed by the multiphysics modeling system. Furthermore, the illustrated interfaces are representative of one type of interface that may be used in a multiphysics modeling system. Other types of graphical, user, or alternative input-type interfaces are contemplated.

Referring now to FIGS. 13-15, non-limiting exemplary flowcharts 1329, 1439, 1549 are illustrated for method(s) including acts for automatically specifying one or more systems of PDEs, representing the system of PDEs in a single coupled form, and solving for the system of PDEs. The various aspects described for the present disclosure can be implemented using object-oriented programming languages (e.g., Java®, C++, C#) where an object is a type of data structure that includes data fields and methods along with their interactions. For example, objects in a model can be created, modified, and accessed by method calls for a model object. A model object may include the algorithms and data structures for the model and may be further used to represent the model. The model object can further include methods for setting up and executing sequences of operations to create geometry, meshes, and solutions for the model.

It is further contemplated that the methods of the model object can be structured in a tree-like manner, such that methods calls can be associated with the operations represented by the nodes in a model tree. By operating with such a tree-like or model-tree type structure, top-level methods (e.g., represented as parent nodes) may return references that support further methods (e.g., represented by child nodes or otherwise). At certain levels within the model object, the method will perform certain acts, such as adding data to the model object, performing computations, or returning data. In the exemplary aspect of a geometry node (see, e.g., FIG. 29), a model object may have different operations associated with the geometry of a model that are represented by secondary nodes (e.g., child nodes) to a geometry node.

Referring now to FIG. 13, at step 1330, a space dimension is selected either directly (e.g., actual selection) or indirectly (e.g., through a step associated with a predefined feature) by a modeling system user. It may be desirable for the selection of a space dimension to occur using the wizard window previously described in FIG. 3 or through another type of interface. Selection of the space dimension can include an automatic update of a model object with a model item having the method call syntax, model.modelNode( ).create( ), and/or a geometry item that specifies the space dimension using the method call syntax, model.geom( ).create( ).

Next, at step 1331, the selection of physics interface(s) may be performed. The selection(s) can occur using, for example, the wizard window described for FIG. 4. Selection of the physics interface(s) can include updating the model object and adding corresponding physics item(s) in the model object, model.physics( ).create( ). Next, at step 1332, the type(s) of stud(ies) may be selected. For example, the selection of a study may be made using the wizard windows previously described in FIG. 5. It is contemplated that the selected stud(ies) can be later used to automatically generate equation formulations and solver settings. It is further contemplated that the model object can be updated with a corresponding study item, model.study( ).create( ). In certain aspects, some or all of the created model object items may be equipped with child items that may be represented by nodes in the model tree. The nodes may describe the operations specified in the model wizard and/or in the settings windows described above.

At step 1333a, a determination is made if the settings for the physics interfaces have been selected. If the logical determination is true, the method then proceeds to step 1333b, where another determination is made if a model is to be added. If another model is to be added (i.e., true) to the component(s) and/or process(es) already received by the modeling system, the method then returns to step 1330 to receive input associated with the additional model. A new model item, model.modelNode( ).create( ), may then be added including a model item with different or the same space dimensions than the already available model. This allows for the simulation of multiple processes in a multiphysics model. If no additional models are to be added (i.e., false), the method can proceed to step 1440. If the logical determination in step 1333a is false, the method then proceeds to step 1334, where for each physics interface a geometry is specified, except for zero-dimensional physics interfaces where the assigned geometry is a point. It is contemplated that geometric representation(s) may be created or otherwise imported from a geometry file (e.g., a file created using a CAD system). It is further contemplated that the model object for the geometry can be updated to include a geometric representation.

At step 1335, a specification of materials and corresponding material properties is made. It is contemplated that selection of materials and material properties may be performed, for example, using the settings windows previously described in FIG. 8. It is further contemplated that the model object may be updated with a corresponding material item, model.material( ).create( ). Next, at step 136, the specification of physical properties in the different domains and for the different physics interfaces may be performed. It is contemplated that the specification of domain settings may be performed, for example, using the settings windows previously described in FIG. 6. At step 1337, the physical properties and interactions at the boundaries may be specified for the different physics interfaces. It is contemplated that the specification of boundary conditions may be performed, for example, using the settings windows previously described in FIG. 9. It is further contemplated that the model object can be updated for both domain settings and boundary conditions using model object items of the type, model.physics( ).feature( ).

At step 1338a, a determination is made if any of the PDEs for the physics interfaces are to be modified. If the logical determination is true, the method proceeds to step 1338b, where predefined PDEs for some or all of the physics interface(s) can be changed, including domain equations and/or boundary conditions. It is contemplated that specification of the predefined physics interface equations in the PDEs modification step may be performed, for example, using the settings windows previously described in FIGS. 7 and/or 10. Step 1338b may also include updating the model object. If the logical determination is false, or after the PDE modification step is performed, the method may then proceed back to step 1333a.

Upon completion of the specification of all physics interfaces and upon no more models being added for the component(s) and/or process(es) being modeled, the method then proceeds to FIG. 14 and step 1440 where the mesh(es) may be specified (see, e.g., FIG. 11). It is contemplated that the specification of the mesh can include updating the model object with a mesh item, model.mesh( ).create( ). Next, at step 1441, a determination is made if all the desired study parameters have been included for the model. If the logical determination is true, then the method proceeds to step 1550. If the logical determination is false, the method proceeds to steps for adding a study and/or adding a study step. For example, at step 1442a, a determination is made if a new study is to be added. If the logical determination is true, then the method proceeds to step 1442b, which allows for the selection of the additional study. It is contemplated that the additional study may be added according to study item, model.study( ).create( ). Following the selection of the additional study or if the logical determination in step 1442a is false, the method can proceed to step 1443a, where a determination is made if study step(s) are to be added. If the logical determination is true, the method proceeds to allow study step(s) to be added for the model at step 1443b. Once the study step(s) are selected or if the logical determination at step 1443a is false, the method proceeds to steps 1444 and 1445 where the physics interfaces in the study steps are specified along with the study step settings. It is contemplated that the study settings may be specified, for example, using the settings window described for FIG. 11. It is further contemplated that study settings may update the model object according to one or several items of the type, model.study( ).feature( ).set( ). Following completion of the study settings, the method proceeds to step 1550.

Referring now to FIG. 15, at step 1550, a solver sequence is generated, and at step 1552, the solver sequence can be edited based on a decision at step 1551 depending on whether the solver is determined to be complete. It is contemplated that the solver sequence can update the model object by creating an item, model.sol( ).create( ), based on the stud(ies) associated with the model object. It is further contemplated that the solver sequence can be edited with items being added according to the model object item, model.sol( ).feature( ).create( ). Then, at step 153, the method solves the PDEs and can generate a solution for the model. It is contemplated that the solution step can be updated by the model item, model.sol( ).runAll( ).

What has just been described in FIGS. 13-15 are non-limiting exemplary aspects of method(s) for automatically forming one or more sets of PDEs associated with one or more physics interfaces and one or more geometric representations (e.g., models that represent components or processes) in different space dimensions. It is contemplated that in certain aspects of the method(s), the PDEs may be combined into a single, combined system of PDEs. A numerical solver, such as a finite element solver may be included, for example, in Modeling and Simulation Module (e.g., 222) and may be used to solve a system of PDEs. The finite element solver, for example, may solve a single system of PDE corresponding to a single physics interface or may solve for a coupled system of PDEs corresponding to several physics interfaces and several geometric representations (e.g., represented by model nodes).

Figure 16:
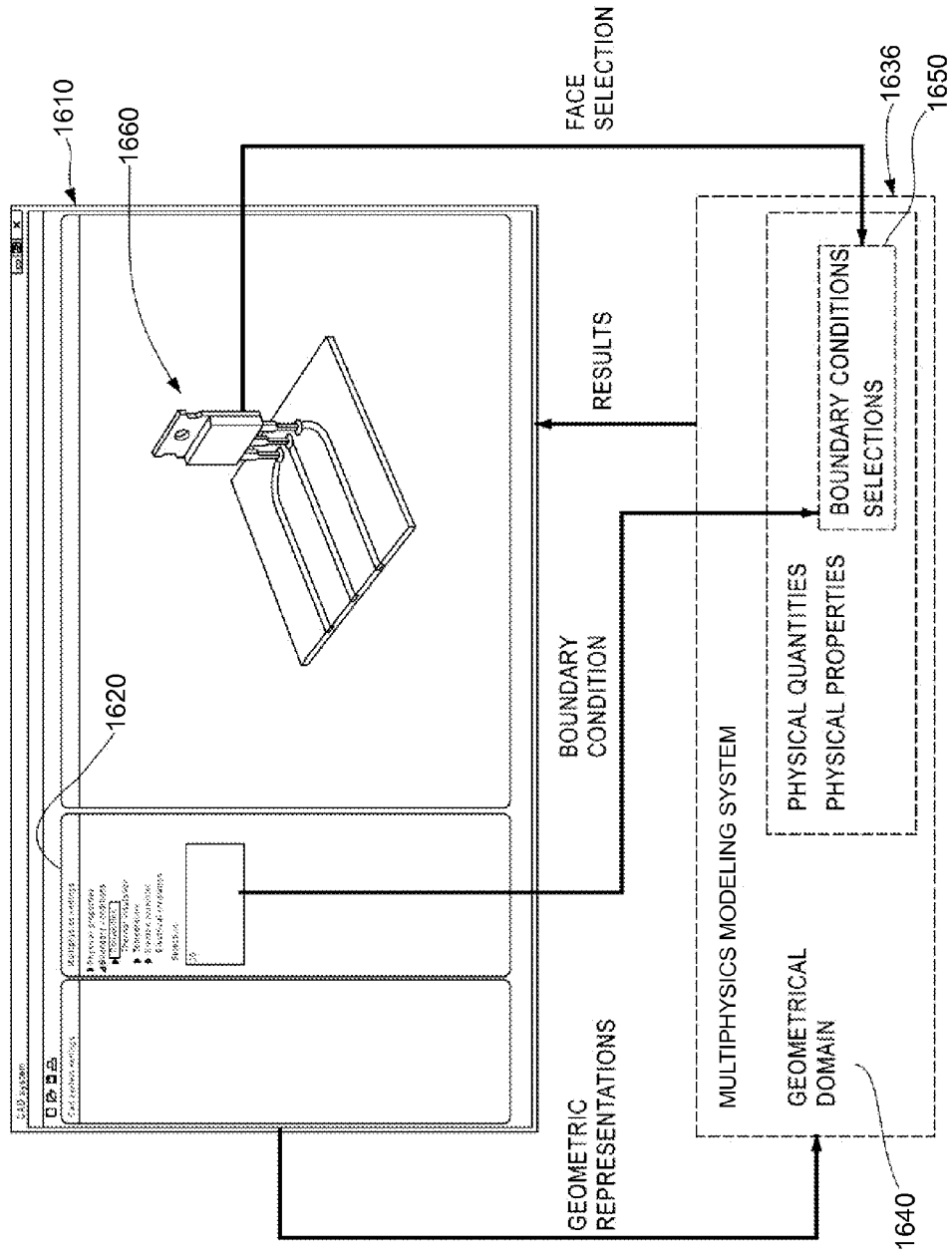
FIG. 16 illustrates an exemplary aspect of a design system interface for communicating with and accessing model settings of an associated multiphysics modeling system.

Turning now to FIG. 16, an exemplary aspect of a GUI 1610 for a design system is illustrated that includes a settings window 1620 displaying, for example, menu(s) for accessing multiphysics model settings associated with a linked multiphysics modeling system 1630. The design system is configured to interact with the multiphysics modeling system 1630 by accessing settings for forming and solving the multiphysics problems defined in the multiphysics modeling system 1630. For example, the GUI 1610 may allow the design system to access the multiphysics model setting including such items as the physical properties and boundary conditions of the system being modeled in the multiphysics modeling system 1630. The design system may be configured to access the boundary condition selection 1650 in the multiphysics modeling system 1630 from a face selection in the design system's user interface 1610. Similarly, the selection of a part in the geometric representation in the design system's user interface may access the physical quantities and/or physical properties associated with a geometrical domain 1640 modeled in the multiphysics modeling system 1630. It is contemplated that in certain aspects, access of the various physical quantities, physical properties, and/or boundary conditions settings may be initiated through user selections of domains (e.g., bodies or parts) and faces via the GUI 1610 of the design system.

As illustrated in FIG. 16, the GUI 1610 may also include a geometric representation 1660 of a geometrical domain of at least a portion of a system being modeled in the multiphysics modeling system 1630. The window 1620 in the GUI 1610 may be used for accessing the multiphysics model settings and can include a display of menus that describe settings for physical properties and boundary conditions in a multiphysics problem. The settings in the menu 1620 may be associated with entities in the geometrical domain, such as domains, faces, edges, or vertices associated with the system being modeled, and residing in the multiphysics modeling system. It is contemplated that selections of the multiphysics settings via the window 1620 on the GUI 1610 may implement routine(s) that describe the geometric entities and settings for the model attributable to a particular selection. In certain embodiments, the design system may be configured for developing or assigning various geometric properties and physical properties of a system. The design system may then interface with and/or send the different geometric representations, the selection of entities (e.g., domains, faces, edges, or vertices), and other setting to the multiphysics modeling system for subsequent multiphysics modeling, which may include processing of the data sent from the design system. It is also contemplated that it may be desirable for the multiphysics modeling system 1630 to send a solution or modeling result configurable for display on the GUI 1610 of the design system.

In certain embodiments, the design system and the multiphysics modeling system may reside in one or more memories, one or more processors, and/or one or more computer readable media associated with the same computer system. In other embodiments, the design system and multiphysics modeling system may reside in different computer systems connected over a local area network or a wide area network.

Figure 17:
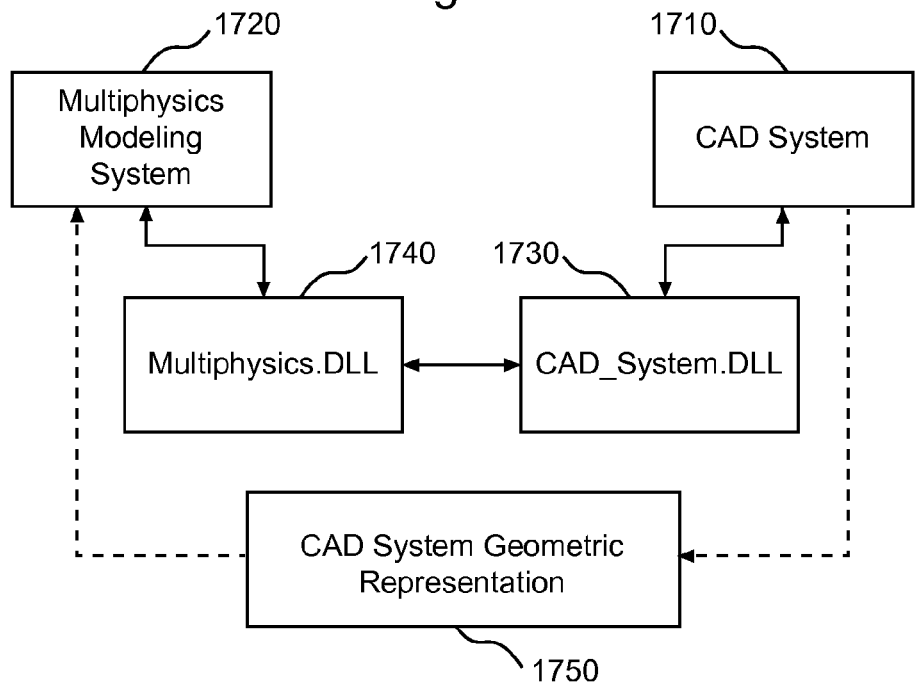
FIG. 17 illustrates an exemplary aspect of communications in a bidirectional link between a design system and a multiphysics modeling system.

Referring now to FIG. 17, an exemplary aspect is illustrated of communications via a bidirectional link between a design system and a multiphysics modeling system. The communications are described in the context of non-limiting exemplary dynamic link communications that may be included in a bidirectional link between a design system (e.g., a computer-aided design system or CAD system) and a multiphysics modeling system. The bidirectional link may be in the form of computer code embedded in a memory or another computer readable medium. In certain exemplary embodiments, a CAD system user interface may be used to describe a multiphysics problem or design in the multiphysics modeling system. The multiphysics modeling system may seek a geometric representation from the CAD system to generate a geometrical domain for the multiphysics problem.

In certain methods of communication between a design system and a multiphysics modeling system, a design system 1710 may detect the installation of a multiphysics modeling system 1720, and in response, implement design system dynamic link library file(s) 1730 to facilitate communication with the multiphysics modeling system 1720. In addition, the multiphysics modeling system can implement multiphysics-related dynamic link library file(s) 1740 to facilitate communication with the design system 1710. In one exemplary embodiment, the dynamic link library files 1730, 1740 may be used to implement various commands related to geometric features between the design system 1710 and the multiphysics modeling system 1720. For example, the design system 1710 may be instructed to transfer geometric representations 1750 to the multiphysics modeling system 1720. In certain embodiments, the design system 1710 may also transfer material properties, which may be stored in the geometric representations of the design system 1710. It is also contemplated that in certain embodiments, the design system 1710 may mesh the geometry and send the resulting mesh to the multiphysics modeling system 1720 as the geometric representations. It is also contemplated that in certain embodiments, the multiphysics modeling system 1720 may be configured to search, detect, and load the multiphysics dynamic link library files 1740 to allow communication with the design system. In addition, the design system's dynamic link library files 1730 may return the name corresponding to an installed design system 1710. The loaded dynamic link library files 1730, 1740 may include instructions for communicating commands between the multiphysics modeling system 1720 and the design system 1710.

It is contemplated that the multiphysics modeling system 1720, design system 1710, and the bidirectional link may be executed in computer system having a memory associated with a single processor or in a computer system having multiple memories associated with multiple processors. In certain embodiments, the multiphysics modeling system(s) may operate on one computer system, the design system routine(s) may operate on a second computer system, and the bidirectional link may operate on one or both of the computer systems. It is also contemplated that the bidirectional link may operate on a third computer system and that the multiphysics modeling system 1720 and the design system 1710 communicate through the third computer system via the bidirectional link. It is contemplated that communications between all the computer systems may occur asynchronously or synchronously. For configurations having multiple computer systems and/or multiple memories, communications between the various computers may occur over local connections or a local area network. It is also contemplated that communications between the various systems may occur over a wide area network. It is further contemplated that communications between the various systems may occur wirelessly. In certain embodiments, the bidirectional link includes a series of instructions stored in a memory and executed by a processor. It is also contemplated that the bidirectional link may comprise dedicated computer hardware having the instructions permanently stored in a memory and communications ports for receiving connections from the multiphysics modeling system and the design system computer(s) that allow communications of geometry and parameter data between the multiphysics modeling system and the design system.

Figure 18:
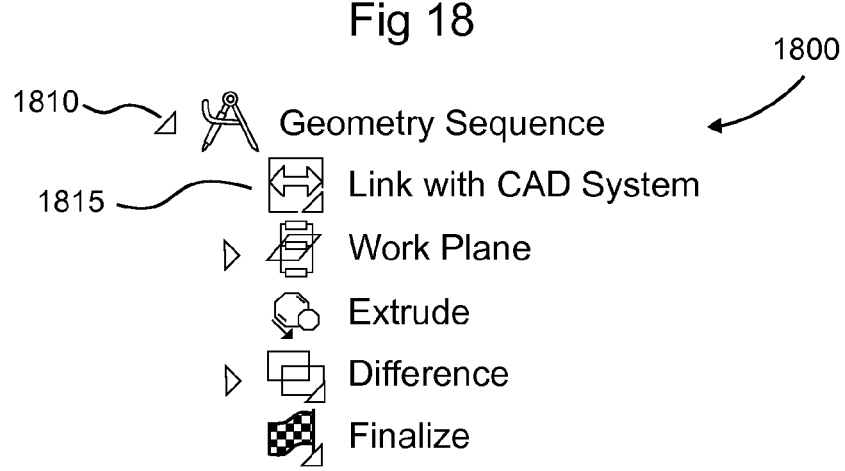
FIG. 18 illustrates an exemplary graphical user interface in a multiphysics modeling system for establishing a link to a design system.

FIG. 18 illustrates an exemplary aspect of a GUI 1800 that may be used to establish a bidirectional link, such as the link described in FIG. 17. The GUI may be displayed on a display associated with a multiphysics modeling system and can include various selectable icons that, when selected, implement different operations for the multiphysics modeling system. For example, the selection of the "LINK WITH CAD SYSTEM" icon 1815 may be configured to implement a series of instructions that establish a bidirectional link between the multiphysics modeling system and a computer-aided design system. For example, the "LINK WITH CAD SYSTEM" icon 1815 can be associated with and form a link between the geometric operations of the multiphysics modeling system and a design system, similar to the relationship illustrated in FIG. 17. While the icon(s) illustrated in FIG. 18 may be displayed or associated with other operations of the multiphysics modeling system, the relationships of geometry sequence(s) 1810 and geometric operations of a design system can often be logically associated with the geometric aspects of a physical system that may be the subject of multiphysics modeling. The geometry sequence icon 1810 illustrated in FIG. 18 can be configured to include the geometric objects and geometric operations that define the geometrical domain of the multiphysics modeling system, and can further allow these geometric aspects to be communicated to or from the design system once the link between the two systems is established. In one exemplary aspect, some parts of the geometrical domain may be entirely generated in the multiphysics modeling system, such that selection of icon 1815 is associated with and forms a link with geometric operations for other parts generated in the design system. For example, a screw part may be generated in a CAD system, but a nut associated with the screw may be generated in a geometry tool of the multiphysics modeling system. Then, by selecting icon 1815, the link between the design system and modeling system is established and geometric aspects of the screw may be transmitted to the multiphysics modeling system, and the geometric aspects of the nut may be transmitted to the CAD system.

Figure 19:
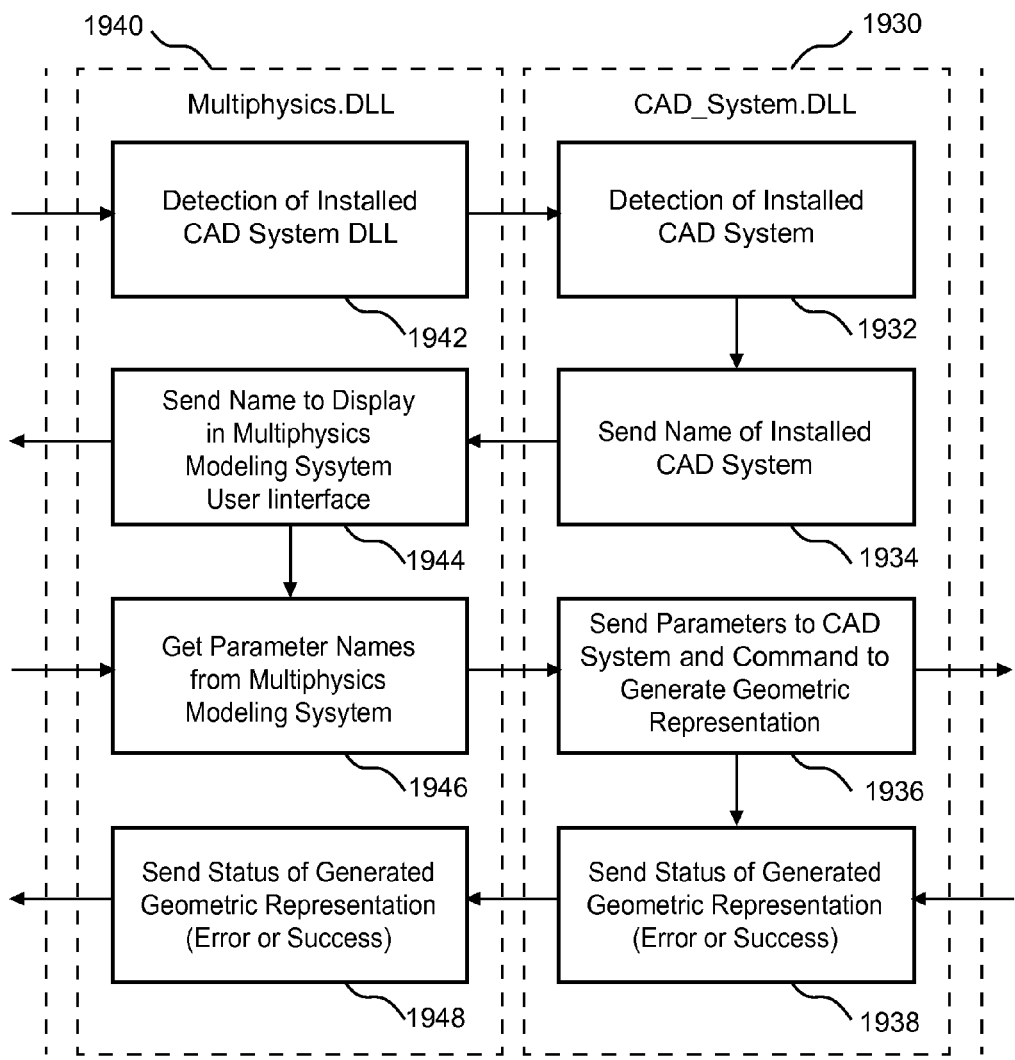
FIG. 19 illustrates exemplary dynamic link library operations for a bidirectional link between a multiphysics modeling system and a design system.

Referring now to FIG. 19, a flowchart of an exemplary aspect of a bidirectional link using dynamic link library (".dll") files is described. The flowchart includes a multiphysics modeling system .dll 1940 and a design system .dll 1930, similar to the multiphysics system .dll 1740 and design system .dll 1730 discussed above for FIG. 17. As discussed previously, the dynamic links may be used to send commands from a multiphysics modeling system via the multiphysics modeling system's .dll to the design system. For example, a command may ask for the name and status of installed design systems. This is illustrated in step 1942 where the multiphysics .dll 1940 may send a request to a detected design system .dll to return the name and status of the design system. Upon the detection of the installed design system at step 1932, the design system .dll 1930 may at step 1934 send the name and status of the installed design system back to the multiphysics .dll 1940. At step 1944, the multiphysics .dll 1940 may send the status message from step 1934 to the multiphysics modeling system and then proceed to step 1946 where the multiphysics modeling system may send a command to the multiphysics .dll 1940 that includes, for example, a list of parameters describing geometric features of a physical system being modeled by the multiphysics modeling system. Proceeding from step 1946 to 1936, the multiphysics .dll 1940 in turn relays the command to the design system's .dll 1930 and then further to the design system where the command may be executed. At step 1938, a confirmation may be received by the design system .dll 1930 from the design system. Proceeding from steps 1938 to 1948, the design system .dll 1930 may send a confirmation back to the multiphysics .dll 1940 regarding the status of the executed command, which in turn may be communicated to the multiphysics modeling system. As illustrated in the example of FIG. 16, when steps in the bidirectional link are executed, a command involving a change, for example, in a geometric feature in the design system can automatically cause the design system to regenerate the geometric representation, which may be generated as a file containing the geometric representation (e.g., a Parasolid® file, a CAD file, a SolidWorks® file). The file containing the geometric representation may be automatically loaded by the multiphysics modeling system and the geometric operation in the geometry sequence and the geometrical domain may then be updated. In certain aspects, the geometric representation may also be updated in a design system user interface linked to the multiphysics modeling system.

It is contemplated that the bidirectional link between the multiphysics system and the design system may be directly connected such that the detection step may not be necessary or may be simplified. For example, the name or identification of an installed design system may be known or directly stored in the bidirectional link, such that, for example, step 1934 can be removed from the exemplary aspect described in FIG. 19. It is also contemplated that it may be desirable to modify the configuration of the detection steps. For example, a setting may be entered by a user defining the name and version of the installed design system in the multiphysics modeling system before connection of the bidirectional link.

Figure 20:
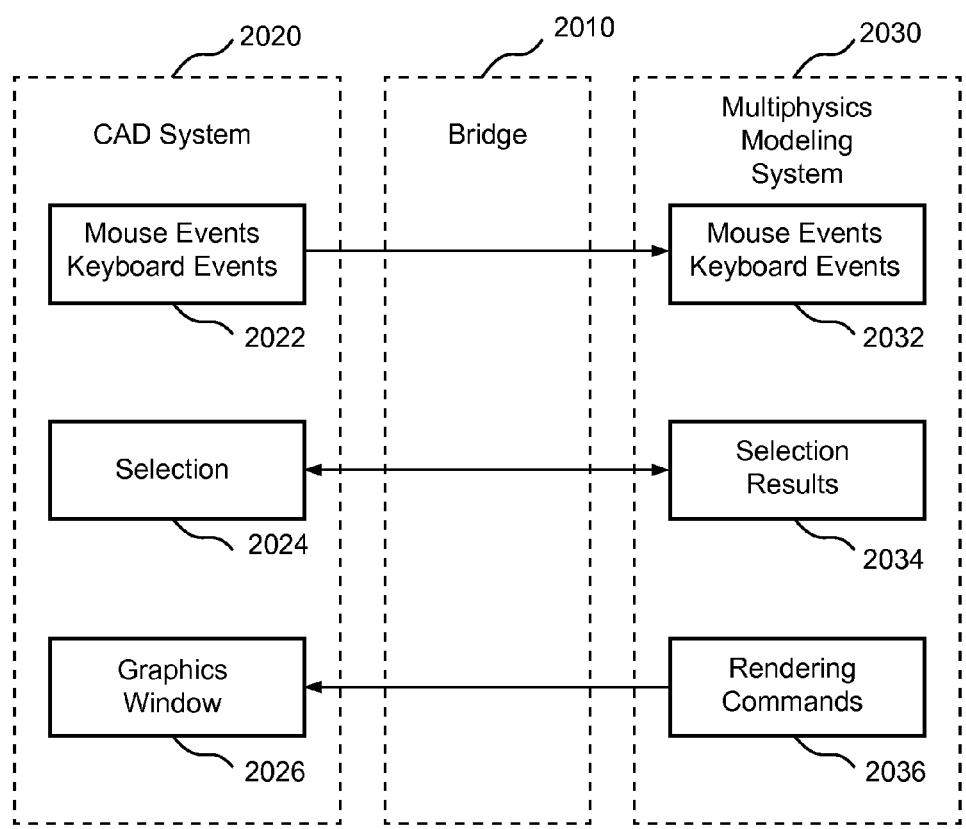
FIG. 20 illustrates an exemplary aspect of a bridge connection for communications between a design system and a multiphysics modeling system.

Referring now to FIG. 20, an exemplary aspect of a bridge connection 2010 is illustrated between a design system 2020 and a multiphysics modeling system 2030. A bridge connection, such as the one illustrated in FIG. 20, can communicate inputs and outputs between two systems in conjunction with operations associated with, for example, a window having selectable items in a GUI. In one embodiment, the bridge connection may be associated with the display of a settings window in a design system GUI for a multiphysics modeling system that is connected via the bridge connection to the design system. Operations performed in the settings window of the GUI, such as selections from a pointer and/or keyboard events, can be sent via the bridge connection to the multiphysics model system. In certain embodiments, a bridge connection can also send information to the multiphysics modeling system for selections in a display window in the design system GUI associated with geometric representations of the system being modeled. In certain aspects, the multiphysics modeling system can send information associated with the selected geometric entity back to the settings window for the multiphysics modeling system that is displayed in the design system user interface.

The bridge connection 2010 in FIG. 20 is configured to communicate commands associated with settings of a multiphysics model. The bridge connection 2010 may be activated via a user selection from a window in the design system's user interface (e.g., see FIG. 19). In certain embodiments, the bridge connection 2010 may be automatically activated upon the implementation or execution of the computer-implemented instructions of the design system 2020. It is contemplated that in certain embodiments, the design system 2020 may detect the installation or execution of the computer-implemented instructions for the multiphysics modeling system and based on that detection activate the bridge connection 2010. It is also contemplated that the design system 2020 may be configured to start a process that executes the computer-implemented multiphysics modeling system 2030.

The bridge connection 2010 can be configured so that a GUI in the multiphysics modeling system 2030 communicates or interacts with a design system user interface. The design system's user interface may include a window that displays, for example, the multiphysics modeling system's model tree (see, e.g., FIGS. 21 and 28-38) and/or a window corresponding to the settings of a node for the model tree. Exemplary model tree aspects are presented in more detail in FIGS. 21 and 28-38. In certain embodiments, a model tree associated with the multiphysics modeling system that is displayed in a GUI can include the display of nodes that represent modeling operations and the display of branches that represent the logical relationships between the nodes.

It is contemplated that in certain embodiments the bridge connection may allow certain user input events 2022, 2032 such as mouse events, keyboard events, or other user input, to be sent from the design system's user interface to the multiphysics modeling system's model tree and/or a settings window displayed in the design system's user interface. The multiphysics modeling system 2030 may also send commands through the bridge connection 2010 to the design system 2020 using the design system's API. For example, the bridge connection 2010 may allow the multiphysics modeling system 2030 to render its graphics inside a graphics window in the design system's user interface. The design system's user interface may then display a view of a model geometry associated with the setup of a multiphysics problem. Selections 2024, such as those of geometric entities (e.g., domains, boundaries, edges, vertices) can also be requested from the design system's geometry by the multiphysics modeling system via the bridge connection 2010. User selections and/or selection results 2034 of geometric entities can be sent back and forth, through the bridge connection 2010, between the multiphysics modeling system 2030 and the design system 2020.

In certain embodiments, the multiphysics modeling system's settings window(s) are configured to receive selection settings from the design system 2020 through the bridge connection 2010. As discussed above, the multiphysics modeling system 2030 may receive user inputs 2032, such as mouse events and keyboard events, through the design system's user interface. In certain embodiments, the multiphysics modeling system 2030 may be configured via rendering command(s) 2036 to render graphics directly in a graphics window 2026 of the GUI of the design system 2020. This rendering of graphics may occur in response to a request from a user to show the results from the solution to a multiphysics problem or model. In certain embodiments, the multiphysics modeling system 2030 may receive the rendering request from the earlier described user inputs 2032 (e.g., mouse events or keyboard events).

Figure 21:
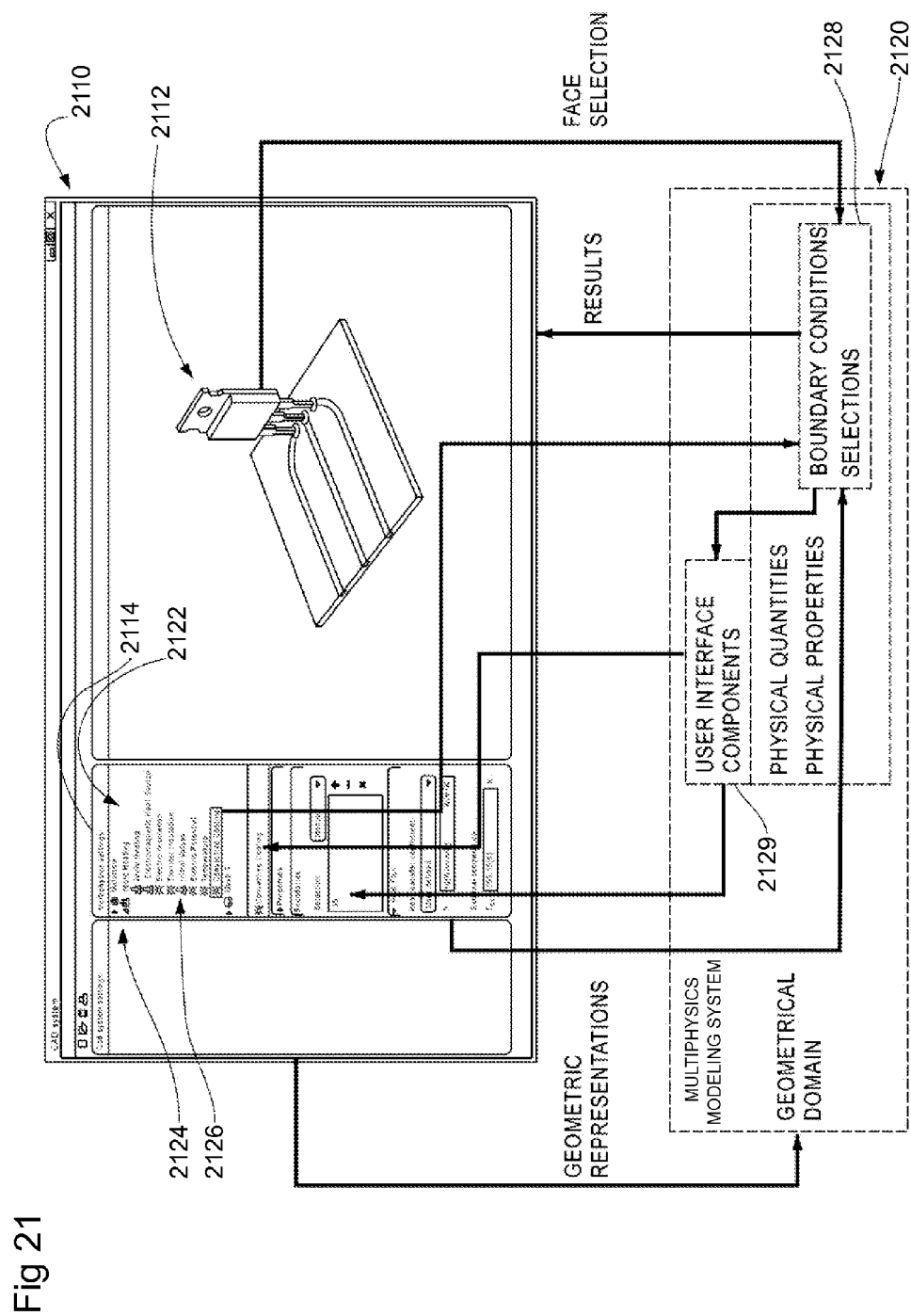
FIG. 21 illustrates an exemplary aspect of a bridge connection for communicating between a multiphysics modeling system and a design system user interface.

FIG. 21 illustrates an exemplary aspect of a bridge connection for executing portions of a multiphysics modeling system GUI within a design system user interface. The bridge connection may be established between the design system and the multiphysics modeling system in response to a request for such a connection being sent from the design system to the multiphysics modeling system. Once a bridge connection is established, a design system user interface 2110 may also display a settings window 2114 having a model tree 2122 associated with a model from a multiphysics model system 2120. In certain embodiments, the model tree 2122, in association with the bridge connection, can directly allow for user inputs into the multiphysics model system 2120 via the design system user interface 2110.

The model tree 2122 can include nodes 2124 (e.g., Materials, Mesh 1) containing references 2126 to settings (e.g., Joule Heating, Electromagnetic Heat Source, Electric Insulation, Thermal Insulation, Initial Values, Electric Potential, Temperature, Convective Cooling) of a multiphysics model and branches displaying relations between nodes. For example, a setting can include a description for a physical quantity, a physical property, or a boundary condition associated with the model. Model tree 2122 illustrates an exemplary setting of a boundary condition for convective cooling at a face of a multiphysics model. The model settings for the face include an external temperature and a heat transfer coefficient. In certain embodiments, a user of the design system can enter or select a node or face of the system being modeled from a geometrical display window 2112 in the design system user interface 2110. The entering or selection of a node or face can then send an instruction, via the bridge connection, from the design system to the multiphysics model system to display in the settings window 2114 for the selected node. The multiphysics modeling system 2120 can then send, again, via the bridge connection, a representation of the settings window for display in the design system user interface 2110.

Certain settings may be associated with geometric entities of the model, such as a face for a boundary condition, and the multiphysics modeling system may prompt or send an instruction to the design system requesting the selection of the geometric entity associated with the setting. The prompt or request may occur using similar operations described previously in FIGS. 16-20. In response to the entity selection, the design system user interface 2110 can then generate a corresponding geometric entity in the multiphysics modeling system 2120. The representation of the geometric entity can be displayed in the design system user interface 2110, such as in the geometrical display window 2112 or in a window associated with a selected node or face. The settings of an entity can be entered as instructions using the settings window 2114. The instructions can include one or more selections of default or custom items from the settings window 2114. The selections may occur via user input received through a mouse, keyboard, or other user input device. In certain embodiments, the settings may be expressions entered using a keyboard or the setting may be predefined and selected from a window listing one or more of the predefined expressions. The input instructions can then be sent or transferred to the multiphysics modeling system 2120. Based on the instructions received from the design system, the multiphysics modeling system may then interpret the instructions and execute commands for forming the components of the multiphysics model described by the settings. The multiphysics modeling system 2120 can then transmit the status of the executed setting(s) back to the design system, including, for example, any updates to geometrical display window 2112.

The bridge connection can facilitate any of several exemplary associations and/or communications between the multiphysics modeling system 2120 and the design system, such as those illustrated in FIG. 21. For example, boundary condition selections 2128, including physical quantities and properties, may be received by the multiphysics modeling system 2120 from the design system. FIG. 21 illustrates the receipt by the multiphysics modeling system 2120 of boundary condition selections 2128 including, for example, face selections, convection cooling settings, and heat flux quantities for a model, via the design system user interface 2110. Furthermore, user interface 2129 (e.g., GUI) associated with the multiphysics modeling system 2120 may receive selection data from the boundary conditions selection(s) routine 2128 and in turn communicate the boundary condition data via the bridge connection back to the design system, which then displays updated information on the design system user interface 2110. The multiphysics modeling system 2120 may also determine various results based on the boundary condition selection(s) and also communicate those results for the multiphysics model to the design system, which can display the results on the design system user interface 2110. The communicated results can also be based on any geometric entit(ies) or physical quantit(ies) associated with the phenomena or process being modeled. FIG. 21 illustrates an exemplary aspect of the interactive nature and/or exchange of information between a design system (e.g., 1610, 1710, 2020, 2110) and a multiphysics modeling system (e.g., 1620, 1720, 2030, 2120) and how information may be displayed to a user on a GUI (e.g., 1610, 2110) associated with a design system that is bridged to a multiphysics modeling system (e.g., 1620, 2120).

Other boundary condition selections are contemplated in addition to those described above. For example, in a model having electromagnetic properties and quantities, boundary condition selections can include ground, current density, electric potential, distributed impedance, reflecting, absorbing, port, perfect electric conductor, etc. In a model having structural mechanics properties and quantities, boundary condition selections can include fixed constraint, roller, load, contact, displacement, free, etc. In a model having fluid properties and quantities, the boundary condition selections can include inlet, outlet, wall, free surface, pressure, etc. The foregoing selections are non-limiting examples of domain settings and boundary conditions that can be selected and for which information can be exchanged between a design system and a multiphysics modeling system. It is contemplated that these and other types of information would be understood to be exchangeable between the systems depending on the scientific and engineering principles desired to be modeled.

Figure 22:
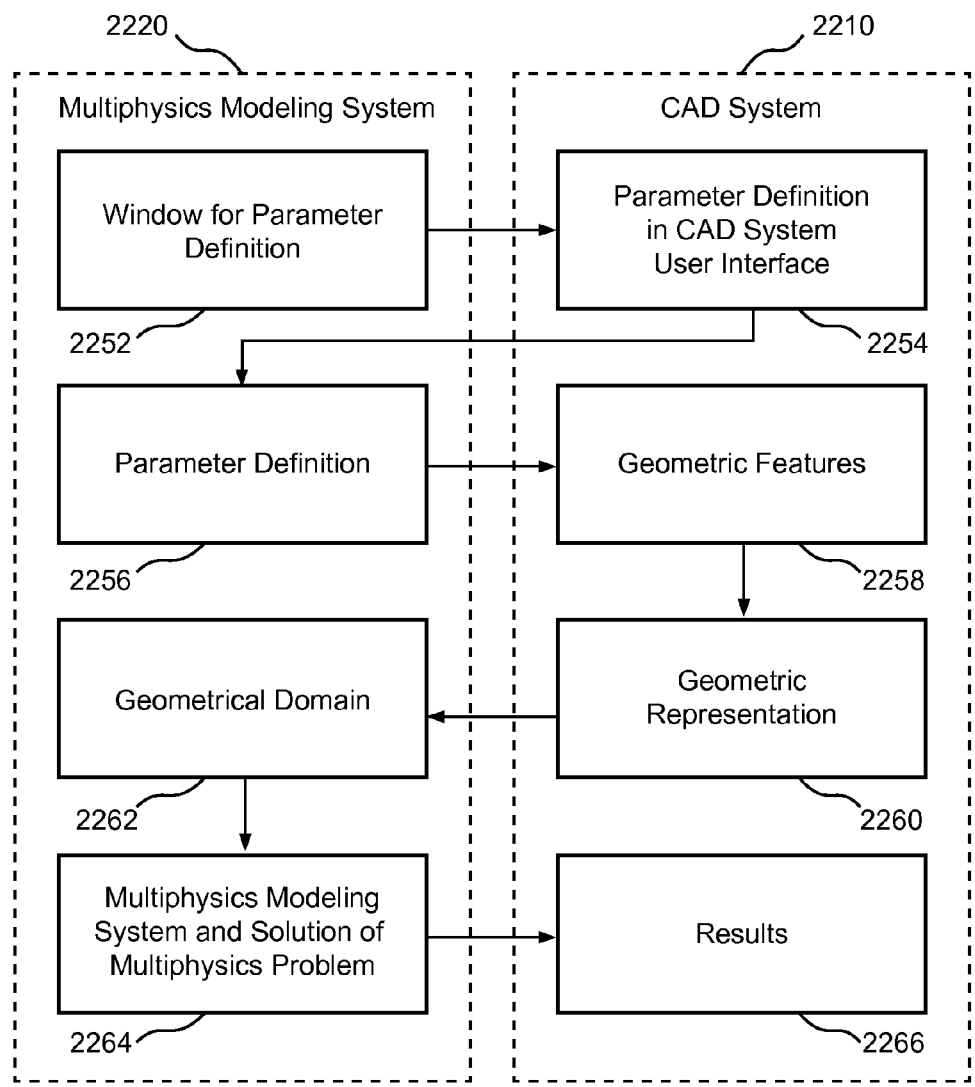
FIG. 22 illustrates an exemplary aspect for dynamically controlling, via a bidirectional link, parametric and geometric features between a design system and a multiphysics modeling system.

Referring now to FIG. 22, an exemplary aspect of the present disclosure is illustrated for dynamically controlling, via a bidirectional link and a bridge connection, parametric and geometric features in a design system. The steps shown in FIG. 22 can be implemented via a multiphysics modeling system GUI that is executed or displayed in a design system user interface, similar to the user interface illustrated in FIG. 21. The steps shown in FIG. 22 include a series of steps between the design system 2210 and the multiphysics modeling system 2220 occurring over a communications path, such as the bidirectional link and bridge connection described elsewhere herein.

Turning now to step 2252, a window or list of parameter definitions may be generated by the multiphysics modeling system 2220 and transferred to the design system 2210. These communications may be facilitated via dynamic link library files described elsewhere herein. At step 2254, the parameter definitions are received and may be displayed and/or accessed via the design system user interface. In certain embodiments, the display of the parameter definitions may occur as a multiphysics modeling system GUI displayed inside the design system's user interface. At step 2256, the list of parameters or parameter definitions may be received as instructions, sent via the bridge connection from the design system 2210 to the multiphysics modeling system 2220. At step 2256, the multiphysics modeling system 2220 may interpret the list or definitions before sending them to the design system. For example, the multiphysics modeling system may interpret the parameter definition to be associated with geometric features. It is also contemplated that in certain embodiments material properties may be obtained from the design system. At step 2258, the design system 2210 may receive parameters that are identified as parameters controlling geometric features. The geometric features can then be updated in the design system according to the parameter definitions or values received from the multiphysics modeling system. At step 2260, the design system may update a geometric representation of the model based on the updated geometric features. Furthermore, the design system may also generate a file containing the geometric representation based on the updated geometric features. At step 2262, the generated file in step 2260 may be received or loaded into the multiphysics modeling system and a representation of the geometrical domain of the model can be updated. At step 2264, the multiphysics modeling system 2220 may then solve a multiphysics problem using the updated geometrical domain for the system being modeled. At step 2256, the design system can receive results or solutions associated with the geometrical domain, where the results or solution are determined from the file received at step 2262. The results or solution can then be displayed in the design system's user interface.

Figure 23:
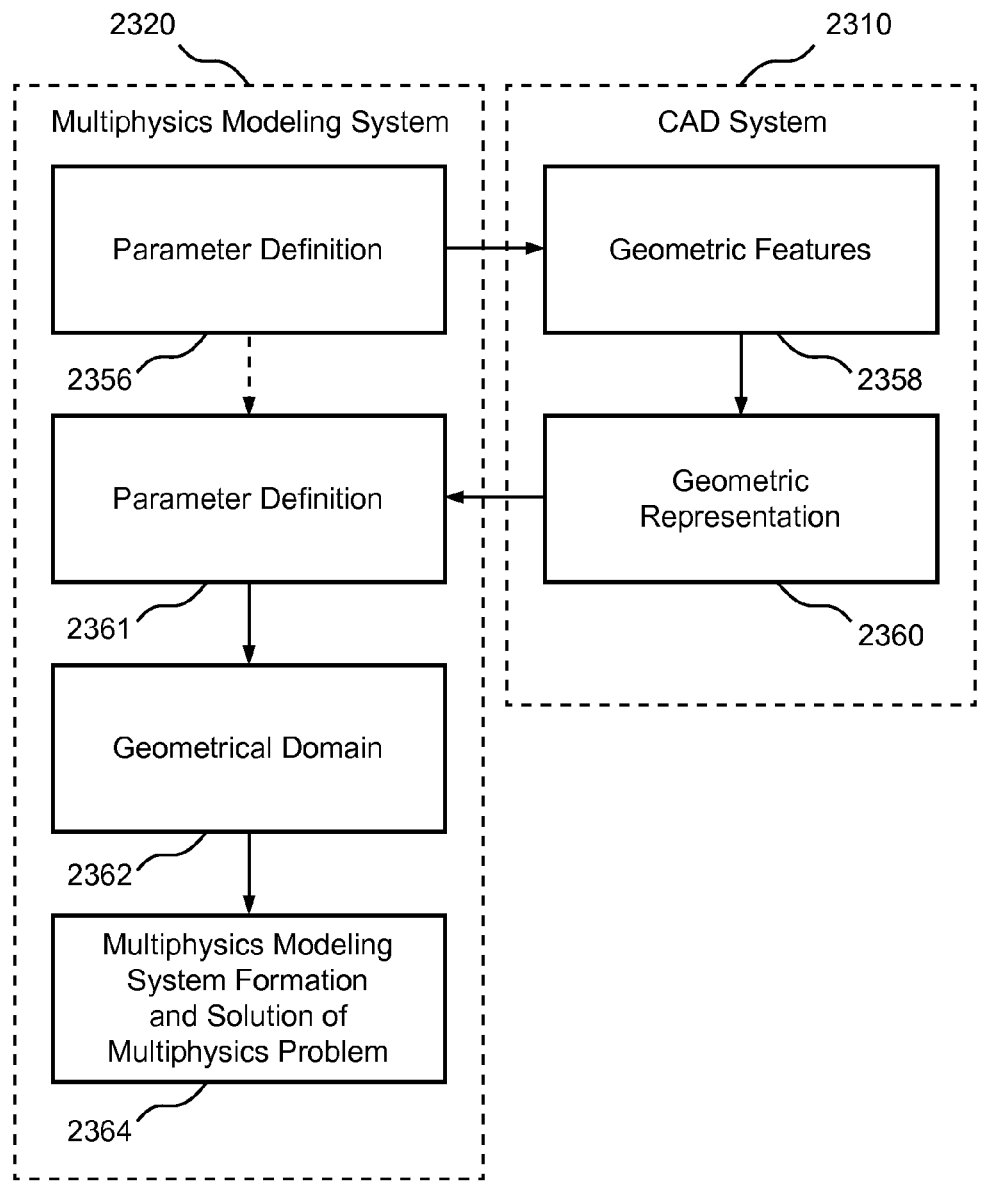
FIG. 23 illustrates another exemplary aspect for dynamically controlling, via a bidirectional link, parametric and geometric features between a design system and a multiphysics modeling system.

Referring now to FIG. 23, another exemplary method is illustrated for dynamically controlling, via a bidirectional link, parametric and geometric features between a design system and a multiphysics modeling system. At step 2356, a list of parameters or parameter definitions as defined by the multiphysics modeling system may be sent from the multiphysics modeling system 2320 to the design system 2310 through a bidirectional link, as illustrated and discussed, for example, in the context of FIGS. 17-20. At step 2358, these parameters are received by the design system 2310 and may be identified by the design system as parameters controlling geometric features of the model. The geometric features can then be updated in the design system according to the parameter definitions or values received from the multiphysics modeling system. For example, the value of a radius of a fillet associated with the face of a model may be controlled or altered. At step 2360, the design system may update a geometric representation of the model based on the updated geometric features. Furthermore, the design system may also generate a file containing the geometric representation based on the updated or altered geometric features. At steps 2361 and 2362, the generated file in step 2360 may be automatically received or loaded into the multiphysics modeling system and the representation of the geometry sequence and geometrical domain of the model can be updated. In certain embodiments, selected aspects of the parameter definitions from step 2356 may be directly sent to steps 2361 and 2362, such as parameter definitions that are unchanged (e.g., parts of the geometry that are not changed) and thus do not necessarily need to be sent to the design system. At step 2364, the multiphysics modeling system 2320 may then solve the multiphysics problem using the updated geometrical domain for the model.

Figure 24:
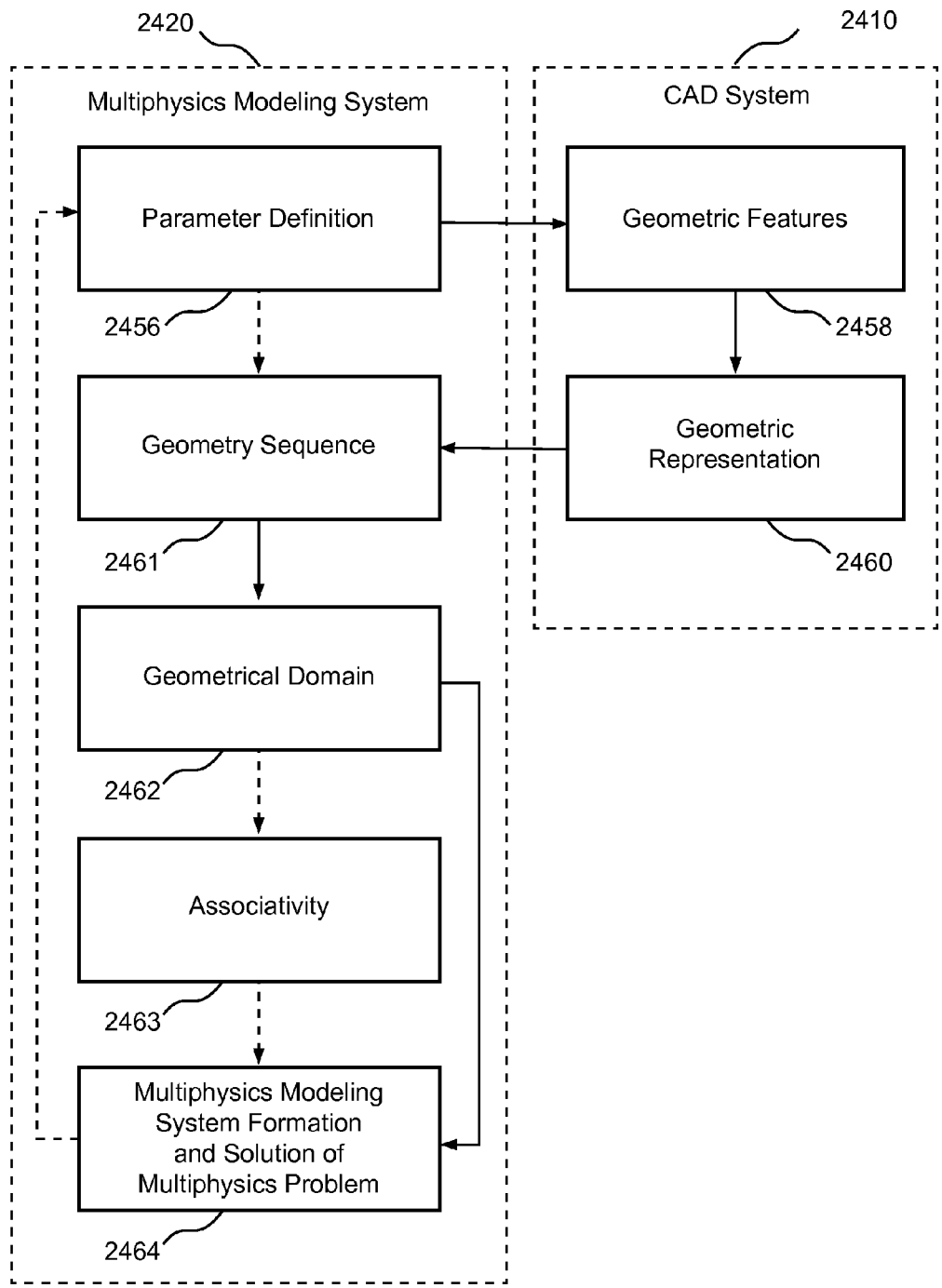
FIG. 24 illustrates another exemplary aspect for dynamically controlling, via a bidirectional link, parametric and geometric features and associativity operations to set physical properties and boundary conditions in a multiphysics modeling system.

FIG. 24 illustrates a non-limiting exemplary aspect of the present disclosure for dynamically controlling, via a bidirectional link, parametric and geometric features and associativity operations to set physical properties and boundary conditions in a multiphysics modeling system. The associativity operation at step 2463 is used to set the physical properties and boundary conditions in the multiphysics modeling system 2420. Beginning at step 2456, a list of parameters or parameter definitions as defined by the multiphysics modeling system may be sent from the multiphysics modeling system 2420 to the design system 2410 through a bidirectional link, as illustrated and discussed, for example, in the context of FIGS. 17-20. At step 2458, these parameters are received by the design system 2410 and may be identified by the design system as parameters controlling geometric features of the model. In certain embodiments, the received parameters may control already existing geometric features. The geometric features can then be updated in the design system according to the parameter definitions or values received from the multiphysics modeling system. At step 2460, the design system may update a geometric representation of the model based on the updated geometric features. Furthermore, the design system may also generate a file containing the geometric representation based on the updated or altered geometric features. At steps 2461 and 2462, the generated file in step 2460 may be automatically received or loaded into the multiphysics modeling system and the representation of the geometry sequence and geometrical domain of the model can be updated. In certain embodiments, selected aspects of the parameter definitions from step 2456 may be directly sent to steps 2461 and 2462, such as parameter definitions that are unchanged and thus do not necessarily need to be sent to the design system.

In certain embodiments, the method of FIG. 24 may proceed directly to step 2464, where the multiphysics modeling system 2420 solves the multiphysics problem using the updated geometrical domain for the model. However, the multiphysics modeling system 2420 may instead proceed from step 2462 to step 2463 where the multiphysics modeling system may use associativity to reuse settings for the physical properties and boundary conditions from a previous formation of a multiphysics problem and apply those reused settings for the formation and solution of the multiphysics problem using the updated geometrical domain. The associativity operation at step 2463 may include mapping geometric entities (e.g., domains, faces, edges, vertices) between the old or previous geometrical domain and the new geometrical domain. The geometrical domain may be defined by a geometry sequence containing geometric objects and geometric operations. For example, a new geometric object (e.g., parent object) may be constructed from a number of child geometric objects (e.g., a number of other geometric objects). For each such parent, there may be a mapping between geometric entities in the parent object and in the child object. In particular, when a new geometric representation is loaded into a multiphysics modeling system through a bidirectional link, the bidirectional link may provide such a mapping between the geometric entities of the old object and the new object. This mapping may be constructed by asking the design system for the mapping between the geometric entities. It is contemplated that during the updating of the geometrical domain, some or all selections of geometric entities may be updated by applying the mapping between geometric entities of the old and the new geometrical domain. This mapping may be used to set physical properties and boundary conditions for the multiphysics problem.

A preliminary step in the associativity mapping process may include finding a minimal set of common ancestors of the old and the new finalized geometrical object. A next step may be to compute mappings of geometric entities from the common ancestors to the geometric objects, for example, by composing the mappings for the chain of parents or ancestors relating the objects. The mappings may then be composed to get a mapping from the new finalized geometrical domain to the old geometrical domain. The mapping may then be improved by applying some experience-based techniques that are based on adjacencies between entities of different dimensions. An example of the associativity mapping process may include having an object that is the result of a change that is done on an original object. The resulting object would have the original object as an ancestor such that the resulting object inherits the settings of the original object or ancestor. For example, if the original object were a rectangle, the change could be rounding one of the corners of the rectangle. In the associative mapping process, the multiphysics modeling system can map the exemplary boundary conditions from the original rectangle to the rectangle with the rounded corner. Next, another change can be made to the object, such as rounding another corner of the rectangle. Further applying the associative mapping process, the multiphysics modeling system can then map or track from the first rectangle with one rounded corner up to the ancestor without rounded corners and then down to the rectangle with the two rounded corners. Thus, by this process of associativity mapping, the multiphysics modeling system can track objects up and down a geometry sequence in order to relate physical setting(s) to new object(s) that may reuse portions of the original geometry sequence.

It is contemplated that in certain embodiments the method of FIG. 24 may be used for a multiphysics problem to optimize a value of a parameter associated with a geometric feature. The value may be optimized using an objective function that accords with certain design criteria for the product being modeled or optimized. For example, the multiphysics modeling system may use an optimization algorithm to search for an optimal value based on the objective function. As the search for the optimal value progresses, the optimization algorithm may need to evaluate an objective function for updated parameter value(s). The updated value(s) can then be sent back to a design system, which may then update a geometric representation. The updated geometric representation may then be used by the multiphysics modeling system to update the geometrical domain. The multiphysics modeling system can then compute a new solution to the multiphysics problem along with new update(s) to the parameter value(s) based on the updated geometrical domain. The multiphysics modeling system can then determine whether to repeat the process based on the initial design criteria. That is, as illustrated between steps 2464 and 2456, the iterative process or loop can be repeated a single time or as many times as is necessary to meet the design criteria and that can be supported by the computing capabilities of the multiphysics modeling system processor(s).

Figure 25:
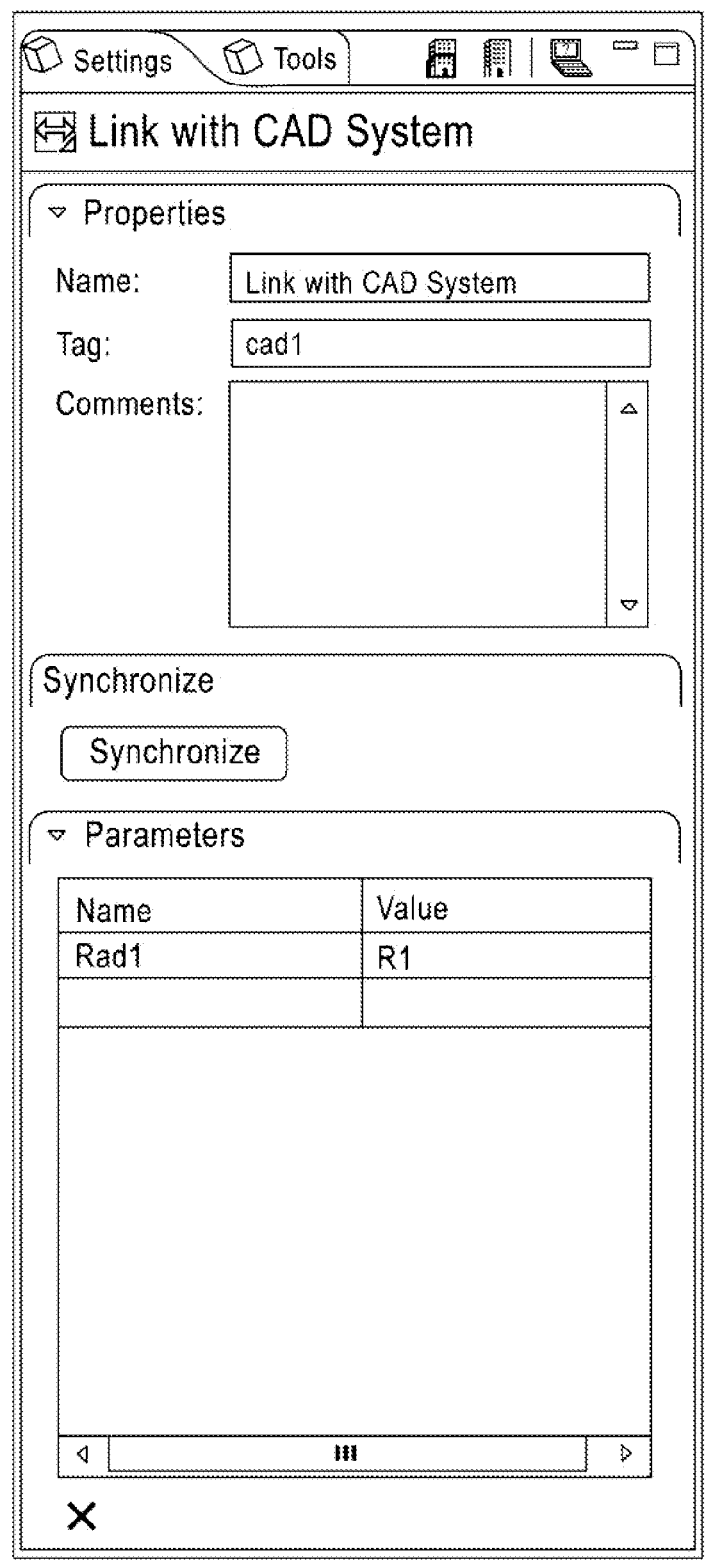
FIG. 25 illustrates an exemplary graphical user interface in a multiphysics modeling system for dynamically controlling features between the multiphysics modeling system and a design system.

Referring now to FIG. 25, an exemplary GUI is illustrated for the multiphysics modeling system that may be displayed for dynamically controlling features between the multiphysics modeling system and a design system via a bidirectional link. The GUI may include parameter names (e.g., Rad1) and their associated values (e.g., R1). The parameter names are shown to be defined in a settings window that may be accessed by selecting a feature or icon from the graphical representation of the bidirectional link in the multiphysics modeling system. The parameter names may refer to names of parameters that control geometric features in the design system. The geometric features in the design system may then be updated according to the parameter values in the multiphysics modeling system by selecting an icon associated with a synchronize feature between the multiphysics and the design systems.

Figure 26:
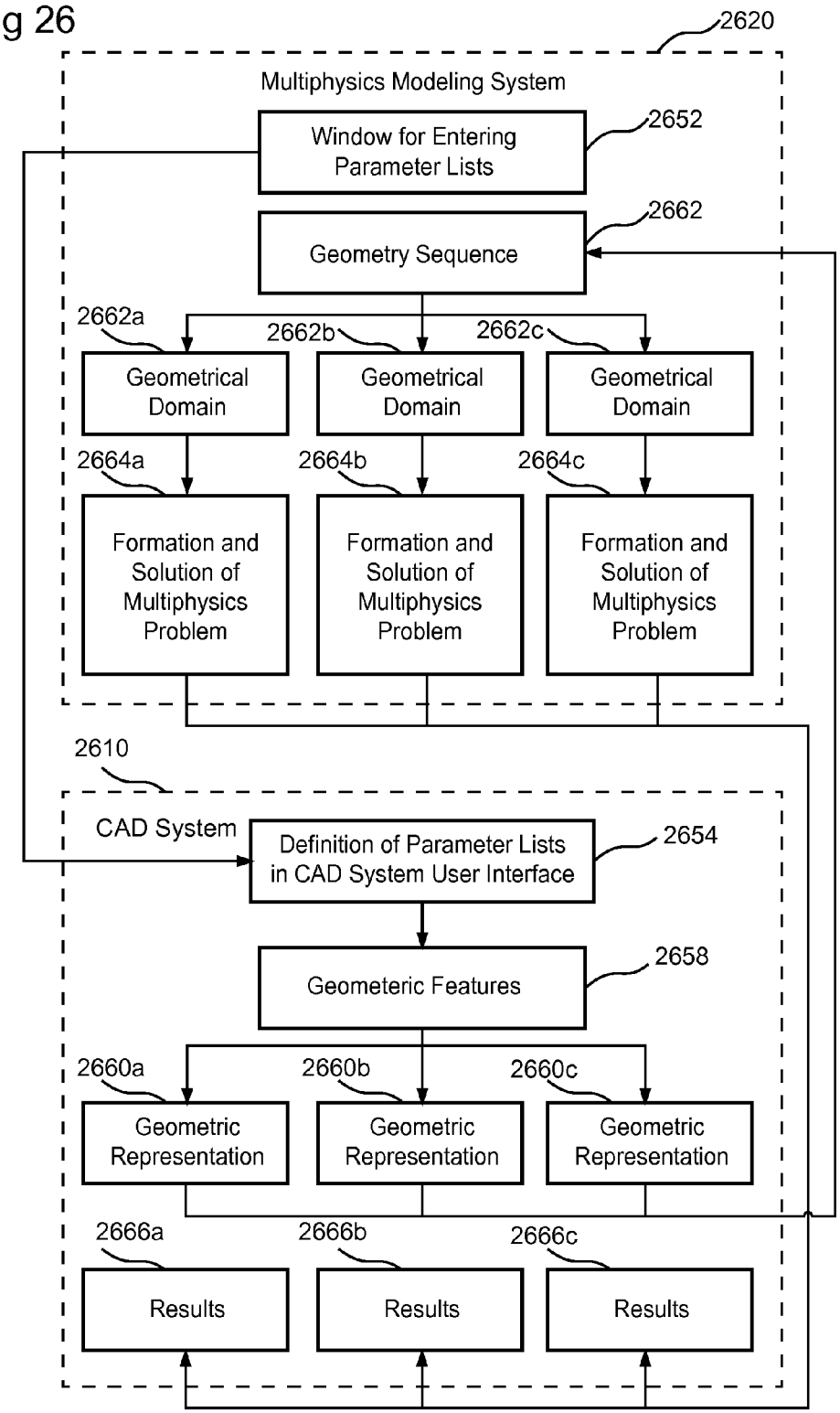
FIG. 26 illustrates an exemplary process for defining variations of parameters controlling geometric features in a design system.

It is contemplated that in certain embodiments it may be desirable to define variations for parameters that control, for example, the geometric features of a model. Referring now to FIG. 26, an exemplary embodiment is illustrated for defining variations for parameters that control geometric features in a design system. The variations are defined via a multiphysics modeling system 2620 that is in communication with the design system 2610 through a bidirectional link. In certain embodiments, a bidirectional link may be complemented by a bridge connection that allows a multiphysics modeling system to be accessed from a window in a design system GUI, as described elsewhere herein.

At step 2652, a window for entering parameter list(s) may be generated by the multiphysics modeling system 2620 and transferred to the design system 2610 through the bidirectional link. For example, parameters describing geometric features, such as a radius or length, or material properties, such as tensile strength or density, associated with a detail of a model may be generated and transferred through the bidirectional link. At step 2654, the parameter lists defined or entered are received and may be displayed in the design system user interface. In certain embodiments, the display of the parameter definitions may occur as a multiphysics modeling system GUI displayed inside the design system's user interface. The lists may be received as instructions, and in certain embodiments, these instructions may be sent via the bridge connection of a bidirectional link from the design system 2610 to the multiphysics modeling system 2620. The list or definitions may be interpreted before being sent to the design system. For example, the multiphysics modeling system may interpret the parameter definition to be associated with geometric features. In certain embodiments, the interpretation of the lists may be completed in the design system. Each list of parameters may represent a variation of parameter values to be used in solving a model. At step 2658, the parameters are identified as parameters controlling geometric features. The geometric features can then be updated in the design system according to the values of the parameters in each list. At steps 2660a, 2660b, 2660c, the design system updates geometric representations for each list of parameters for the model variations based on the updated geometric features. Furthermore, the design system may also generate a file for each list of parameters, where each file contains the corresponding geometric representation. At steps 2662a, 2662b, 2662c, each generated file in step 2660a, 2660b, 2660c may be received or loaded into the multiphysics modeling system and representations of the geometrical domains of the model variations can be updated. At step 2664a, 2664b, 2664c, the multiphysics modeling system 2620 may then solve the multiphysics problems using the updated geometrical domains for the system variations being modeled. At steps 2666a, 2666b, 2666c, the design system receives the results or solutions associated with each of the geometrical domains determined from the files received at steps 2662a, 2662b, and 2662c. The multiphysics modeling system can create one solution set for each variation of the geometrical domain. The solutions can then be displayed in the design system's user interface. On the lower end, it is contemplated that as few as two variations can be modeled and results be determined. On the upper end, while only three geometric representations and domains are illustrated, this is for example purposes only. That is, more than three lists of parameters and geometric representations and lists of parameters can be input into the systems described herein such that a user can determine the desired model variations.

It is contemplated that in certain embodiments, the multiphysics modeling systems described herein may use the concept of associativity to set the physical properties and boundary conditions specified for one geometrical domain and reuse these settings for each variations of the geometrical domain. Associativity may be achieved by mapping geometric entities (domains, faces, edges, vertices) between an old or previous geometrical domain and a new or to-be-varied geometrical domain. When the new or varied geometric representation is received or loaded into the multiphysics modeling system through a bidirectional link, the bidirectional link may provide the mapping between the geometric entities in the old object and the new or varied object. In certain embodiments, this mapping may occur by the multiphysics modeling system prompting or requesting the design system for the physical properties and boundary conditions from the old object. When updating the geometrical domain, all selections of geometric entities can be updated by applying the mapping between geometric entities in the old and the new geometrical domains. The mapping may then be used to set physical properties and boundary conditions for a multiphysics problem that is to be solved by the modeling system. The multiphysics modeling system can then solve the problem using each of the updated geometrical domains corresponding to the variations in geometric features. The multiphysics modeling system can then determine one solution dataset for each variation in geometrical domain. The solutions mapped on a corresponding geometrical domain can then be sent by the multiphysics modeling system to the design system, where the solutions are then displayed in the design system's user interface with each variation in geometrical domain.

Figure 27:
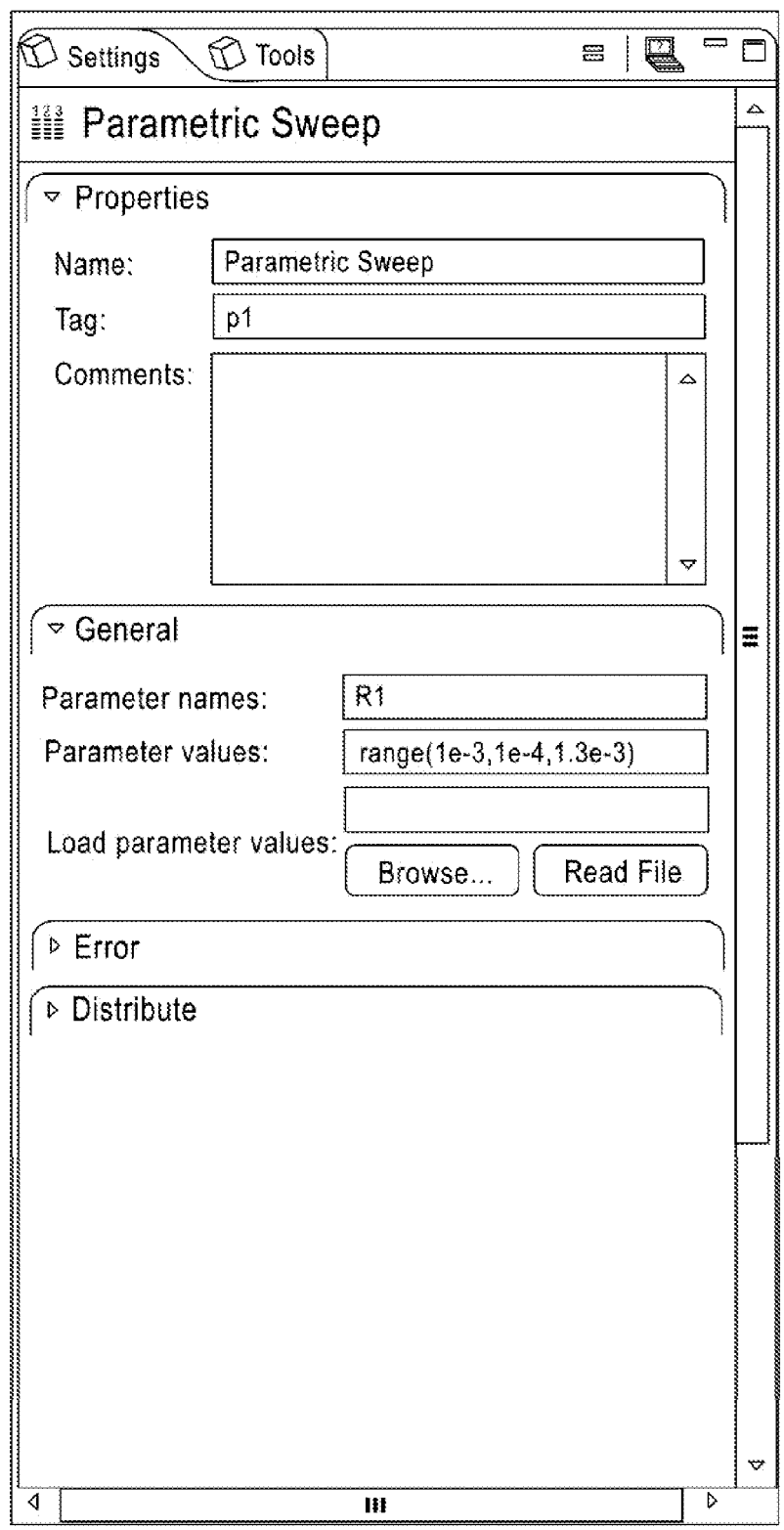
FIG. 27 illustrates an exemplary graphical user interface for defining parameter variations.

Referring now to FIG. 27, an exemplary GUI is illustrated for defining variations of parameter(s) that control the geometric features in a design system, from a multiphysics modeling system, using a bidirectional link. In certain embodiments, the parameter names in the multiphysics modeling system may also refer to names of parameters that control the geometric features in the design system. The parameter values may be varied according to an interval having certain boundaries, such as a minimum value and a maximum value, plus an increment for values in between. Each parameter value may be contained in a separate parameter list in the multiphysics modeling system that is then sent to the design system for automatic synchronization and generation of the files that contain the design system's geometric representation for each variation.

One exemplary aspect of the present disclosure includes a method for accessing settings for forming and solving multiphysics problems in a multiphysics modeling system from a design system user interface. The solution of a multiphysics problem is displayed in the design system user interface.

Another exemplary aspect of the present disclosure includes a method for establishing and maintaining a bidirectional link between a CAD system and a multiphysics modeling system for communicating commands involving geometric features.

Yet another exemplary aspect of the present disclosure includes a method for establishing a bridge connection between a CAD system and a multiphysics modeling system for communicating commands involving settings in a multiphysics problem.

A further exemplary aspect of the present disclosure includes a multiphysics modeling system (e.g., algorithms or instructions configured to be executed on a processor) that is able to run parts of its GUI inside a CAD system user interface using a bridge connection. The settings for a multiphysics problem, such as physical properties and boundary conditions, can be accessed from a representation of the multiphysics problem in the form of a model tree in the CAD system user interface.

Another exemplary aspect of the present disclosure includes a method for dynamically controlling the parametric and geometric features in a CAD system from parts of a multiphysics modeling system's GUI that is displayed and/or executed in the CAD system user interface via a bidirectional link and a bridge connection. The parametric and geometric features of the CAD system are expressed in terms of parameters in the parts of the multiphysics modeling system that are accessed in the CAD system's user interface. The CAD system dynamically returns a geometric representation, which is automatically loaded by the multiphysics modeling system and a geometrical domain is changed accordingly. The multiphysics modeling system can be configured to define and solve the multiphysics problem for the geometrical domain. For example, a dynamic-link library (DLL) file may be used, which is an executable file that allows programs to share code and other resources necessary to perform particular tasks.

Yet another exemplary aspect of the present disclosure includes a method that defines a variation of a geometrical domain using sets of parameters that control the geometric features in a CAD system from parts of a multiphysics modeling system GUI displayed and/or executed in the CAD system user interface via a bidirectional link and a bridge connection. The CAD system can return a modified geometric representation of the variations, which can be automatically loaded in the multiphysics modeling system. Each geometric representation corresponds to a variation and one geometrical domain is defined for each set of parameters. The multiphysics modeling system can then define and solve a multiphysics problem for each geometrical domain.

Another exemplary aspect of the present disclosure includes a method executed on a computer system for establishing a bidirectional link between a CAD system and a multiphysics modeling system. The method includes detecting one or more installed CAD systems, communicating commands between the multiphysics modeling system and the one or more CAD systems, and representing the bidirectional link as a geometric operation in a geometry sequence in the multiphysics modeling system.

In further exemplary aspects of the present disclosure, the method for establishing the bidirectional link includes loading dynamic link libraries for each of the detected one or more CAD systems. The dynamic link libraries can be used for communicating the commands. The method may further include using the commands to generate files containing a geometric representation in the CAD system. The method can additional include generating a geometrical domain in the multiphysics modeling system using the files containing the geometric representation and the geometry sequence. The method may further include defining a multiphysics problem using the geometrical domain.

In yet further exemplary embodiments of the present disclosure, the method for establishing bidirectional links can also include sending via the bidirectional link the parameters from the multiphysics modeling system describing geometric features in the CAD system. The method can also include sending via the bidirectional link the parameter lists representing variations in the geometric features. The method may further include specifying physical properties and boundary conditions in the multiphysics modeling system for each of the variations using associativity.

In certain aspects of the present disclosure a method for controlling settings of a design system is executable on one or more processors associated with the design system. The method includes the acts of receiving via a communications interface identifying data associated with a multiphysics modeling system. Instructions are transmitted via the communication interface or another interface and include model settings related to a multiphysics model at least partially residing in the multiphysics modeling system. Model results are received that are at least partially derived from the transmitted model settings. At least a portion of the received model results are displayed in a graphical user interface associated with the design system.

It is further contemplated that the transmitting and receiving acts of the above method are implemented via a bridge connection established between the multiphysics modeling system and the design system. The method may also further comprise at least partially representing the multiphysics model in the graphical user interface via a model tree, and/or generating a window in the graphical user interface associated with the design system. The window may be at least partially linked with the multiphysics modeling system. The method may also include generating a window in the graphical user interface associated with the design system, where the window is configured to display model settings via a model tree and the model setting includes at least a portion of the transmitted instructions. The transmitting instructions by the method can also include transmitting geometric features, with the method further comprising generating a geometric representation of the multiphysics model at least partially based on the transmitted geometric features. The geometric representation may be generated in the design system.

In certain aspects of the present disclosure, a method for dynamically controlling a multiphysics modeling system is executable on one or more processors associated with the multiphysics modeling system. The method includes the acts of detecting, via a first interface, input data associate with a design system. Instructions are received via the first interface or a second interface, and the instructions include settings related to a multiphysics model associated with the multiphysics modeling system. A solution is determined for the multiphysics model that is at least partially based on the received instructions. The solution is transmitted to the first interface or the second interface, and the solution is configured for display within a design system user interface associated with the design system.

It is further contemplated that the receiving and transmitting acts of the above method can be implemented via a bridge connection between the multiphysics modeling system and the design system. The method may also include that in response to receiving an instruction associated with a geometric representation, a geometric domain is generated in the multiphysics modeling system, or the method may include the act of defining a multiphysics problem using the generated geometrical domain. The method may further include transmitting parameters describing geometric features associated with the generated geometrical domain to the design system, or transmitting parameter lists representing variations in the geometric features. In addition, the method may include determining, via associativity, physical properties and boundary conditions for each variation to a defined multiphysics problem.

In certain aspects of the present disclosure, one or more non-transitory computer readable storage media are encoded with instructions that are executable on one or more processors associated with a design system. The instruction may include acts as described in methods described elsewhere herein for other aspects of the present disclosure.

It is also contemplated that the instructions may include, the instructions including the acts of: receiving a signal via a communications interface where the signal is associated with a multiphysics modeling system. Instructions may be sent to the communications interface or another interface. The instructions include settings related to a multiphysics model associated with the multiphysics modeling system. Multiphysics model results may be received that are derived from the settings. The multiphysics model results can then be displayed in a design system user interface.

In certain aspects of the present disclosure, a method for controlling settings of a design system is executable on one or more processors associated with the design system. The method includes the acts of establishing a communications link between the design system and an associated multiphysics modeling system. Instructions are transmitted via the communications link or another link, and the instructions include settings related to a multiphysics model associated with the multiphysics modeling system. Multiphysics model results derived from the settings are received, and the multiphysics model result is displayed in a design system user interface.

In certain aspects of the present disclosure, a method for dynamically controlling a multiphysics modeling system is executable on one or more processors associated with the multiphysics modeling system. The method includes the acts of establishing one or more communications channels between the multiphysics modeling system and an associated design system. Instructions are received via the one or more communications channels, and the instructions include settings related to a multiphysics model associated with the multiphysics modeling system. An outcome for the multiphysics model is determined based on the received instructions. The outcome is transmitted to at least one of the one or more communication channels. The outcome is configured for display in a design system user interface.

FIGS. 28-38 illustrate various exemplary aspects of a model tree including logical relationships between various exemplary nodes that may be included in a method for forming and solving a multiphysics problem in a multiphysics modeling system. It is contemplated that in certain aspects the model tree is presented in a GUI of a multiphysics modeling system, or in a window associated with the modeling system where the window is display in the GUI of a design system (see, for example, FIG. 16 or 21), such as a CAD system. A model tree can include selectable nodes, which when selected, display or allow input of different operations or parameters for the multiphysics modeling system. It is also contemplated that the results of different modeling operations can also be represented in nodes of the model tree.

It is contemplated that a model tree, such as in the exemplary aspects disclosed herein, can be desirable because it provides a graphical representation(s) of logical relationships and a graphical programming environment for developing multiphysics problems in a multiphysics modeling system. As discussed above and elsewhere herein, a model tree includes nodes and branches. The nodes represent various modeling operations and the branches represent the logical relationship between the operations represented by the nodes.

It is contemplated that it may be desirable to represent sequence(s) of modeling operations as nodes in a model tree. The model tree nodes may then be used to generate the constituents of a multiphysics problem that a user desires to model. The constituents of the problem being modeled can include, among other things, a geometrical domain, physical quantities, physical properties (e.g., mechanical, electrical, magnetic, thermal), boundary conditions, mesh, solver configurations, and results or solutions of the multiphysics model. In certain embodiments, a sequence of modeling operations may be structured to include one or more child nodes (e.g., secondary nodes, subnodes) that branch from a parent node (e.g., primary node) representing a constituent of a multiphysics problem. The branches in the model tree can be used to represent the logical relationship between the parent and child nodes. For example, a system to be modeled may include one or more model nodes (e.g., a parent node, primary node) and under each of those model nodes there may be a geometry node, material node(s), physics node(s), and a mesh node (e.g., child nodes, secondary nodes, subnodes). Furthermore, one or more of the child nodes may also have their own grandchild nodes for adding contributions to the physical quantities associated with the associated child node.

It may also be desirable in a multiphysics modeling system to generate partial differential equations that describe certain physical quantities in a multiphysics problem. For example, in certain embodiments, a partial differential equation for a multiphysics problem may be generated by adding contributions to a system of partial differential equations rather than changing an existing set of generic system(s) of partial differential equations. Such a process can provide efficiencies to the generation of partial differential equations. In one exemplary aspect, operations may be included as nodes in the model tree for adding the contributions to the partial differential equations. The model tree may include a parent node for physics elements, and the parent node may include a child node or branch for adding contributions to the partial differential equations associated with the problem being modeled. A model tree and node approach can be desirable because it provides clarity to the user of the multiphysics modeling system during the set up and modification of the various constituents of the problem being modeled.

In a multiphysics modeling system it may further be desirable to add contributions to a multiphysics problem by attributing the added contributions to a geometrical domain. One of the benefits is that contributions are only defined when needed rather than having to edit a set of generic equations.

In a multiphysics modeling system it may further be desirable to have a model tree that has nodes for more than one model (see, e.g., FIG. 38) such that several components and/or processes can be simultaneously modeled together. The individual models can share certain model inputs or parameters when the models are simulated simultaneously in a multiphysics problem.

Numerous exemplary and non-limiting aspects of a model tree for a multiphysics modeling system are discussed in more detail below. Furthermore, an exemplary multiphysics modeling system includes the COMSOL® 4.0 or COMSOL Multiphysics® simulation software operating on a computer system, as such software is available from COMSOL, Inc. of Burlington, Mass. Additional exemplary aspects of multiphysics modeling systems are described in U.S. patent application Ser. No. 10/042,936, filed on Jan. 9, 2002, now issued as U.S. Pat. No. 7,596,474, U.S. patent application Ser. No. 09/995,222, filed on Nov. 27, 2001, now issued as U.S. Pat. No. 7,519,518, and U.S. patent application Ser. No. 09/675,778, filed on Sep. 29, 2000, now issued as U.S. Pat. No. 7,623,991, each of which are hereby incorporated by reference herein in their entireties.

A model tree for a multiphysics modeling system can include a global definitions node for creating or inputting model parameters, variables, and function that have a global scope, and thus, are not specific to a particular model branch. The model tree can further include one or more model nodes, a study node, and a results node. The model node(s) can be used to set up a component(s) or process(es) to be modeled, and the input or set up can be done, for example, as a two-dimensional simplification of the component(s) or process(es). Other exemplary model node(s) can be input or set up with a full three-dimensional description. The study node can be used to set up the simulation(s) of the whole multiphysics model or portions thereof, and can be applied for one or more models as set up using the model node(s). The results node can then be used to further investigate and review the solution received from the study node.

Figure 28:
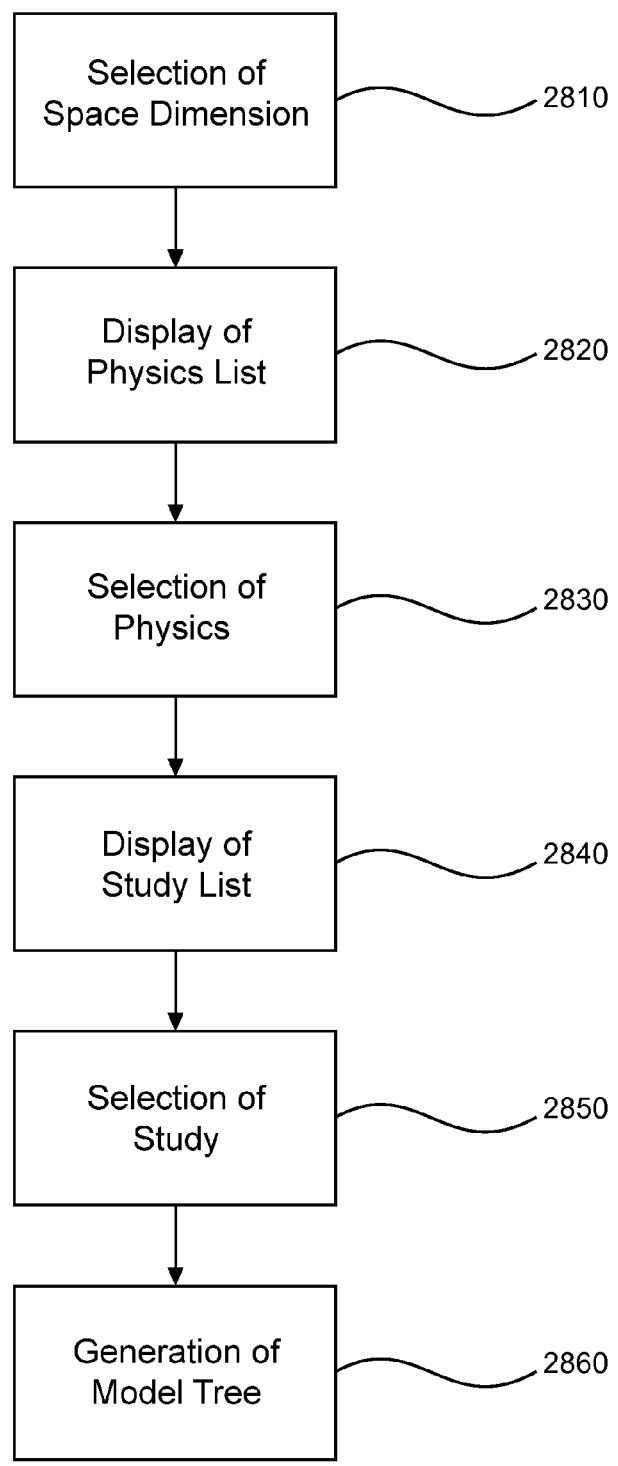
FIG. 28 illustrates an exemplary process for generating a model tree within a multiphysics modeling system.

FIG. 28 illustrates an exemplary aspect of a process for generating a model tree within a multiphysics modeling system. At step 2810, a window displayed on a GUI (e.g., a monitor) can be configured to allow the system user to select a space dimension for a model. For example, the user can choose from several selectable options or be allowed to provide inputs for the space dimensions of a model, including dimensions for three-dimensional, two-dimensional, two-dimensional axisymmetric, one-dimensional, one-dimensional axisymmetric, or zero-dimensional model(s). The selection or receipt of space dimension input(s) can then be used to determine and display a physics list at step 2820. The choices or options available on a physics list can vary depending on the space dimension input(s) selected in step 2810. The physics list that is displayed in step 2820 can be displayed in a window of the GUI associated with the multiphysics modeling system. Each of the physics choice(s) or option(s) can include descriptions and equations for a variety of engineering or scientific disciplines, such as those described elsewhere herein (e.g., joule heating and thermal expansion, solid mechanics, electrical circuits), which can be modeled in the multiphysics modeling system. It is further contemplated that a user can input or define a customized physics for use in determining the solution to the model. At step 2830, a user may then select the desired one or more physics to be applied and simulated for the model(s). The selection of the physics at step 2830 determines a set of physical quantities associated with the received selection that are available for further manipulation in a multiphysics problem. The selection of the physics at step 2830 can also implement the selection of predefined studies and/or numerical preferences associated with a given physics. At step 2840, the system displays a study list in a window of the GUI. At step 2850, the user can select a study from the list displayed in step 2840. The various selections available in the study list can include, for example, stationary, time dependent, eigenvalue, eigenfrequency, or some other study type that would be known in the field of the component or process being simulated in the multiphysics modeling system. Finally, at step 2860, the multiphysics modeling system can generate a model tree based on the input received from the system user via the model tree.

In certain embodiments, the selection of a space dimension in step 2810 can be used to determine the name(s) and icon(s) of model node(s) available in a model tree. The selection of the space dimension can further determine the content in the setting(s) that may be accessed in the model tree by a system user. In certain embodiments, the selection of physics at step 2830 can also determine certain default content of a physics branch in a model tree and the available setting in the different nodes. Further, it is also contemplated that the selection of the study at step 2850 may determine the content of one or several study steps that may be included in the study node.

Figure 29:
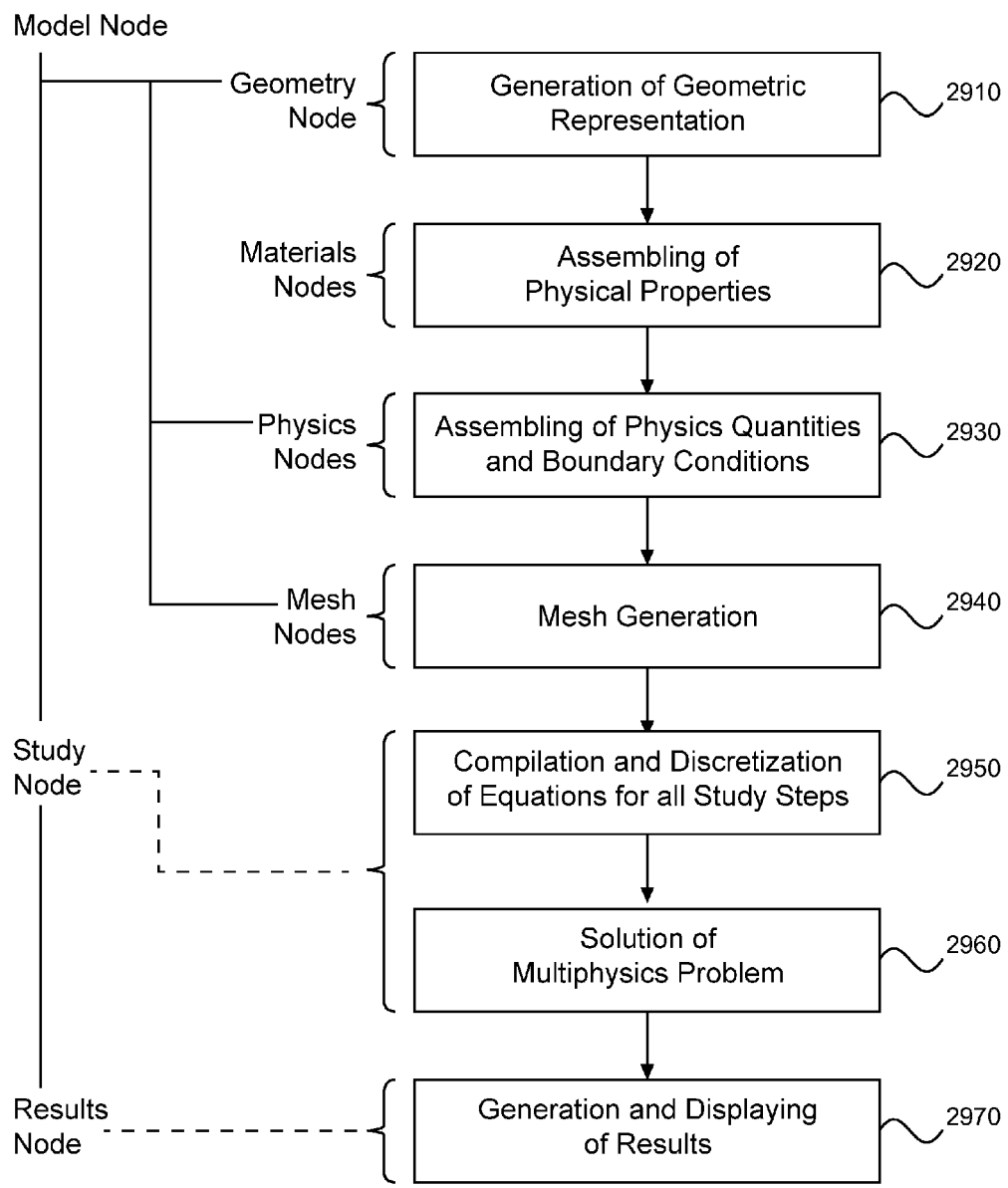
FIG. 29 illustrates an exemplary process for forming and solving a system of partial differential equations in a multiphysics modeling system based on operations represented in a model tree.

Turning now to FIG. 29, an exemplary aspect of a process is illustrated for forming and solving a system of partial differential equations in a multiphysics modeling system based on operations represented in a model tree. The model tree for the multiphysics model that is generated, such as for the exemplary process illustrated in FIG. 28, can include a model node, a study node, and a results node. The model node may include a plurality of child nodes, such as a geometry node, material node(s), physics node(s), and mesh node(s). The study node can also include child nodes associated with solving the multiphysics problem.

At step 2910, a geometric representation is generated by the multiphysics modeling system based on operations associated with child nodes to the geometry node. For example, selection of the geometry node may display various child nodes that allow a user to execute additional operations associated with the geometry node and the generation of the geometric representation in step 2910. It is also contemplated that the geometry of the model or problem to be solved may be imported into the geometry node, such as from a computer-aided design file or through associations between a computer-aided design system and a multiphysics modeling system, as described elsewhere herein (see, e.g., FIGS. 16-27).

At step 2920, physical properties are assembled by the multiphysics modeling system for the domains contained in the geometric representation generated in step 2910. These physical properties are associated with the materials node(s) in the model tree, which include the material properties for all the physics and all the domains in one or more model node(s). In certain embodiments, the materials node can include specific material(s) (e.g., cast iron, concrete, titanium) that are selectable by a user for the component(s) or process(es) being modeled. Depending on the complexity of the system being modeled, the system may have multiple components or processes each having different material properties that can be assembled in step 2920.

At step 2930, the multiphysics modeling system assembles the physics quantities and boundary conditions based on the representations of operations associated with one or more physics nodes of the multiphysics model. The assembled physics quantities and boundary conditions may be defined in the domains contained in the geometric representation using the physics properties determined from the operations represented in the materials node.

At step 2940, a mesh is generated by the multiphysics modeling system for the geometric representation and is based on the representations of the operations in the mesh node. For example, a system user may select to execute the mesh operations in a menu displayed by clicking or selecting the mesh node. In one exemplary and non-limiting embodiment, the system user may select to create an unstructured tetrahedral mesh for a component being modeled. Other non-limiting examples of mesh types may include prism, pyramids, swept, boundary layer, hexahedral, surface (e.g. for shells), and edge meshes (e.g., for beams). Other mesh geometries known in the field of the present disclosure are also contemplated.

Next, at step 2950, the multiphysics modeling system may proceed with the compilation and discretization of equations for all the study steps selected in the study node for each of the model(s). As discuss above, a study node may contain a representation of study steps for a solution to a set of partial differential equations. The study node can include child nodes for compiling the partial differential equations for each study step. Furthermore, the study node may include child nodes representing the discretization and solution sequence for the equations for each study step.

A system user may select to execute the operations represented by the child nodes in the study step from a menu (e.g., a drop-down menu) displayed after selecting the study node. The menu may be displayed by clicking on or selecting the study node as it is displayed in a GUI. The execution of the study steps may involve compiling a set of partial differential equations based on the physics quantities and boundary conditions generated by the physics, and based on the analysis selected for the study step, such as whether to implement a transient (e.g., dynamic) or stationary (e.g., static) analysis. The equations are discretized based on the meshed geometric representation. Then, at step 2960, discretized equations from step 2950 may be solved using a solver represented by child node(s) of the study node.

In certain embodiments, the multiphysics modeling system may be solving a multiphysics problem including a plurality of model nodes with corresponding geometr(ies), material(s), physics, and mesh child or secondary node(s). Furthermore, each of the plurality of model nodes may be used to generate a corresponding part of the set of partial differential equations in the multiphysics problem. It is contemplated that the complete set of partial differential equations may be compiled, discretized, and solved in steps 2950 and 2960, for different study steps, by solvers represented by child nodes to the study node. It is also contemplated that the compiling, discretization, and solving aspects can be completed automatically, without or substantially without the need for any further user inputs.

At step 2970, the results of the solution to the multiphysics problem may be generated and displayed or otherwise output for later display or use. For example, the solution to a multiphysics problem may be visualized or prepared for display according to the operations represented by one or more child nodes associated with the results node. Such an operation may include the generation of one or more graphs of a set of results, which may be generated by clicking on or selecting a results node that implemented a predetermined or customized set of operations for preparing the display of the results.

Figure 30:
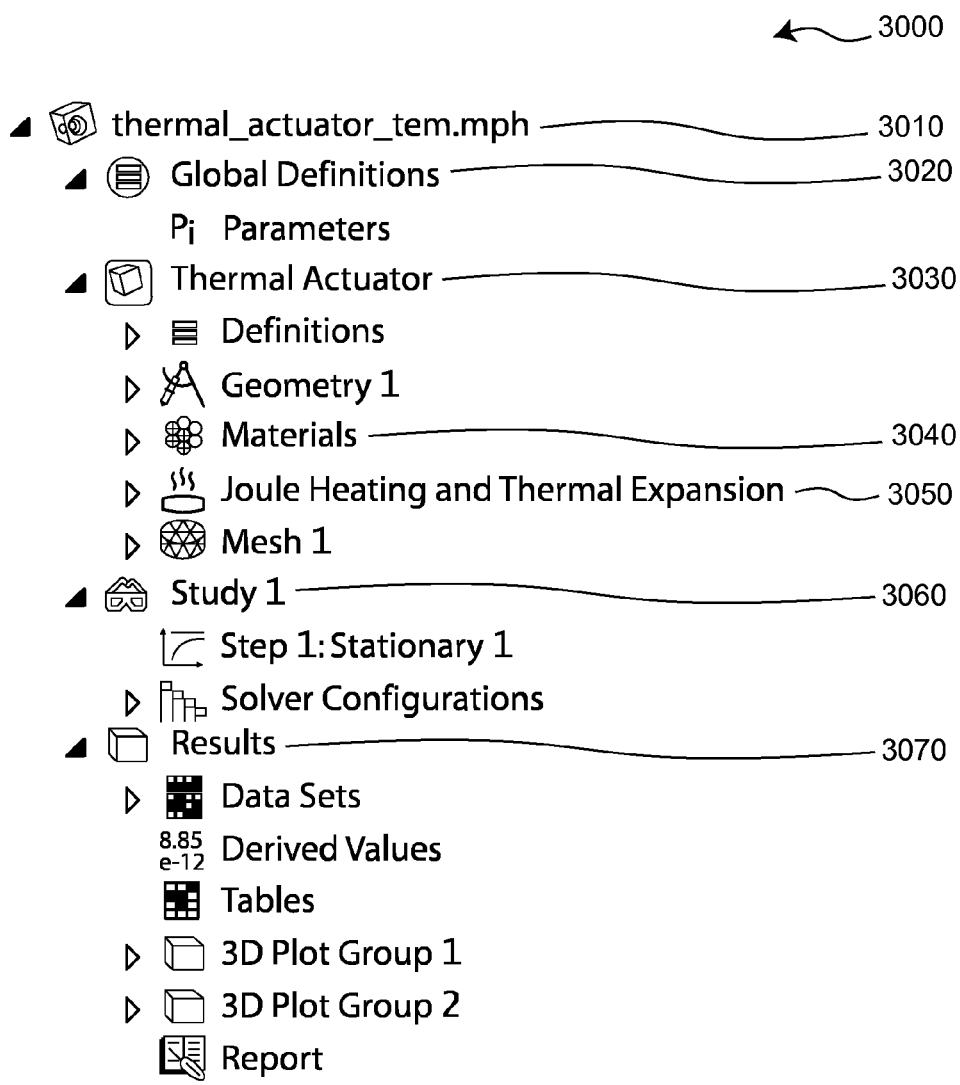
FIG. 30 illustrates an exemplary aspect of a model tree for forming and solving multiphysics problems in a multiphysics modeling system.

Turning now to FIG. 30, an exemplary aspect of a model tree 3000 is illustrated for forming and solving multiphysics problems in a multiphysics modeling system. In certain embodiments, the model tree 3000, or variations thereof based on different modeling features, is presented on a GUI associated with a processor configured to execute the multiphysics modeling system. It is also contemplated that model tree 3000 may be presented in a window on a GUI for a design system, where the window is associated with the multiphysics modeling system operating on the same or a different processor implementing routines associated with the design system.

Model tree 3000 may include different configurations and different features represented as logically arranged nodes associated with simulating a multiphysics problem. For example, a primary node 3010 (e.g., thermal_actuator_tem-.mph) may represent the multiphysics problem for which a solution and results are desired. Node 3010 is exemplified to include four child nodes including global definitions node 3020 (e.g., Global Definitions), model node 3030 (e.g., Thermal Actuator), study node 3060 (e.g., Study 1), and results node 3070 (e.g., Results). Each of nodes 3020, 3030, 3060, 3070 may have their own additional child nodes, which in turn may also have their own respective child nodes, such that a branch of various logically associated nodes are built from the primary node 3010 for model tree 3000.

The exemplary child node (e.g., Parameters) branching from the global definitions node 3020 may represent operations that generate parameters, variables, and/or functions that apply to the entire multiphysics problem being solved, and thus, operations that are not generally attributable to specific geometric entities, domains, boundaries, edges, or vertices. The operations represented by the child nodes (e.g., Parameters) can be considered global to multiphysics problem represented in model tree 3000. For example, a parameter from the child node illustrated for node 3020 may be used to define a general physical constant and may be utilized in a plurality or even all the nodes in a model tree.

The exemplary child nodes (e.g., Definitions, Geometry 1, Materials, Joule Heating and Thermal Expansion, Mesh 1) branching from the model node 3030 (e.g., Thermal Actuator) may represent operations that generate a geometrical domain node (e.g., Geometry 1), physical properties node 3040 (e.g., Materials), physics node 3050 (e.g., Joule Heating and Thermal Expansion), and/or a mesh node (e.g., Mesh 1). In certain embodiments, the exemplary model node 3030 may generate partial differential equations for the mesh and/or the geometrical domain, or partial differential equations associated with the geometrical domain. The partial differential equations can be formed using the physical properties node 3040 and/or physics node 3050, which may include additional child nodes for physical quantities and boundary conditions. In the exemplary aspect illustrated in FIG. 30, the physics node 3050 is described as Joule Heating and Thermal Expansion, though it would be understood that other engineering and scientific phenomena could be simulated, as well (e.g., acoustics, chemical reactions, diffusion, electromagnetism, fluid dynamics, geophysics, heat transfer, porous media flow, quantum mechanics, structural mechanics, wave propagation, microelectromechanical systems, semiconductor systems, plasmas).

Operations for solving the partial differential equations, such as those associated with the model node 3030, can be selected from child nodes branching from the study node 3060 (e.g., Study 1). The study node 3060 can include one or more study steps. For example, in a first study step (e.g., Step 1: Stationary 1), partial differential equations may be solved at stationary or static conditions while a second step may follow where these partial differential equations may be solved for time-dependent or dynamic conditions. The study node 3060 may therefore contain operations that add or remove terms in partial differential equations, according to how each step may be defined. It is also contemplated that a study node may include child nodes representing operations for solving partial differential equations using a finite element solver (e.g., Solver Configurations).

A branch from the primary node for a multiphysics problem can also include a results node 3070, which may further include additional child nodes representing operations for generating simulation results for solution(s) to the multiphysics problem that are transformable to a predetermined or customized format presentable to the user of a multiphysics modeling system. For example, the child nodes may include results presented in table formats, as derived values, as various multi-dimensional plots, or as reports including combinations of result formats such as graphics, numbers, and text.

Figure 31:
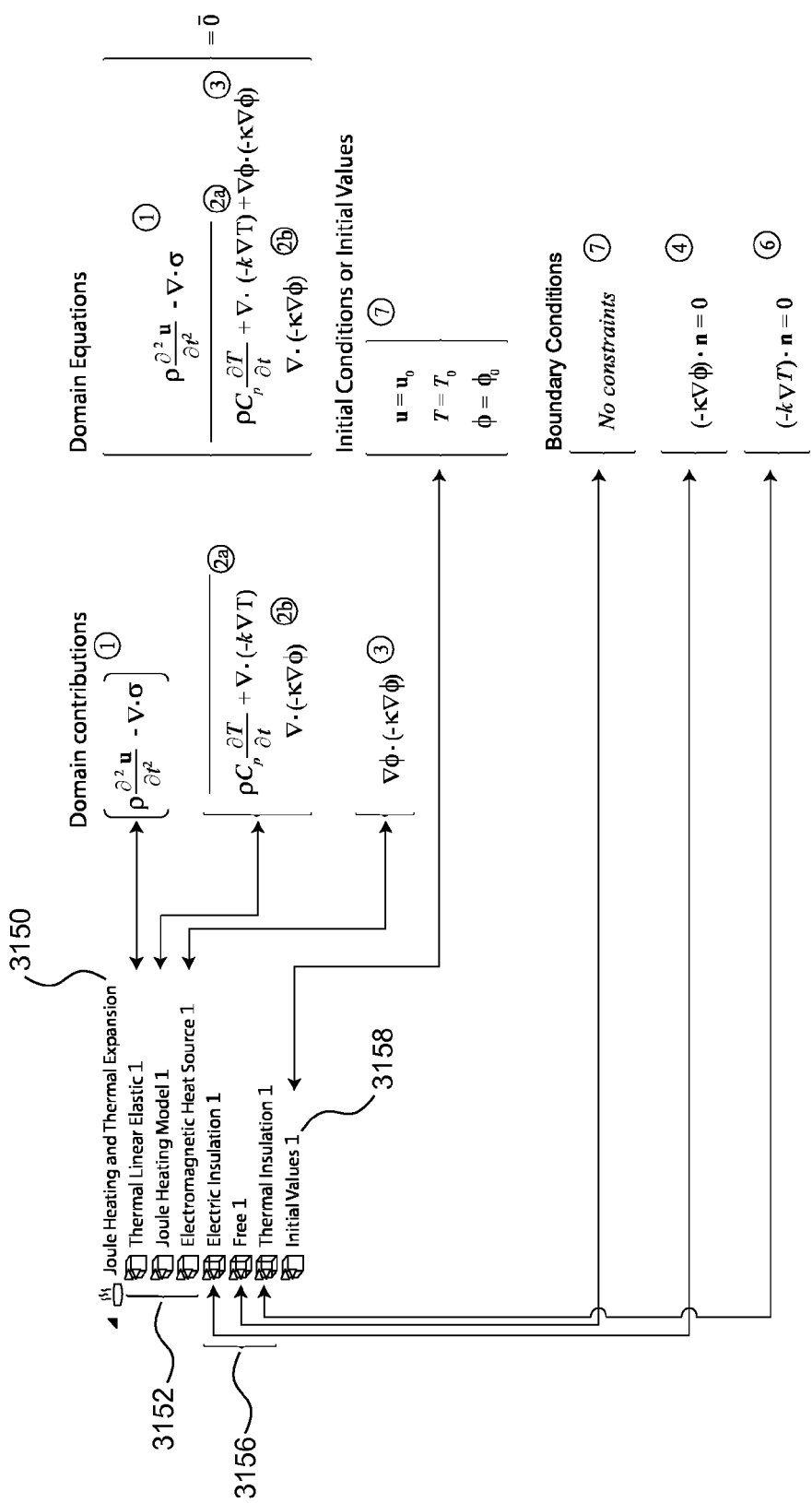
FIG. 31 illustrates an exemplary aspect of a physics node of a model node for a model tree that includes operations for generating physical quantities and boundary conditions for a multiphysics problem.

Referring now to FIG. 31, an exemplary aspect of a child node (e.g., Joule Heating and Thermal Expansion) is illustrated that branches from an exemplary model node of a model tree. The physics node 3150 includes operations for generating physical quantities 3158 and boundary conditions 3156 for a multiphysics problem, and can be associated with operations for modeling various physics phenomena, such as those described elsewhere herein. Settings for the various illustrated nodes can be accessed and modified by selecting the desired node. For example, the first three child nodes 3152 of the physics node 3150 may represent a sequence of modeling operations that generates default physical quantities for structural displacements, electric potential, and temperature in a geometrical domain. The physical quantities are generated by operations that define thermal expansion (e.g., Thermal Linear Elastic 1 node), conduction of electric current and transport of heat (e.g., Joule Heating Model 1 node), and resistive heating caused by the electric current (e.g., Electromagnetic Heat Source 1 node). The operations generate the default partial differential equations shown for the respective nodes in a selected geometrical domain. The partial differential equations illustrated in FIG. 31 provide exemplary parameters that may be associated with the system being modeled, such as density, $\rho$, a displacement vector, u, and a stress tensor, $\sigma$. The exemplary components of the stress tensor, $\sigma$, are functions of the derivatives of the displacement vector. Other exemplary material parameters can include specific heat capacity, $C_p$, temperature, T, thermal conductivity, k, electric potential, $\phi$, and electrical conductivity, $\kappa$. These physical quantities may be set to an initial value, as illustrated in the exemplary mathematical relationships of FIG. 31. For different model(s), different parameter(s) may be used depending on the engineering or physics phenomenon(a) being simulated—the illustrated physical properties are provided by way of example only, and thus, are non-limiting.

The fourth, fifth, and sixth child nodes 3156 of the physics node 3150 may represent a sequence of modeling operations that generate the default boundary conditions for the multiphysics problem. For example, default boundary conditions may be generated by the operations that define the gradient in the electric potential by setting electric current to zero in the "Electrical Insulation 1" node, the gradient of the temperature by setting the heat flux to zero in the "Thermal Insulation 1" node, and the structural constraints by setting no constraints on the structural displacement at the boundaries in the "Free 1" node. The modeling operations can include generating default equations for the physical quantities interactions at the selected boundaries.

The last exemplary child node 3158 (e.g., Initial Values 1) represents an operation that sets the initial values for all physics quantities, which in the exemplary illustration of FIG. 31 includes temperature, electric potential, and structural displacements. In certain embodiments, the operation may be required as an initial condition for a time-dependent simulation or as an initial guess in a stationary nonlinear simulation. The operation can generate equations for the physical quantities at an initial stage in a selected geometrical domain and may be required by methods that solve partial differential equations.

Figure 32:
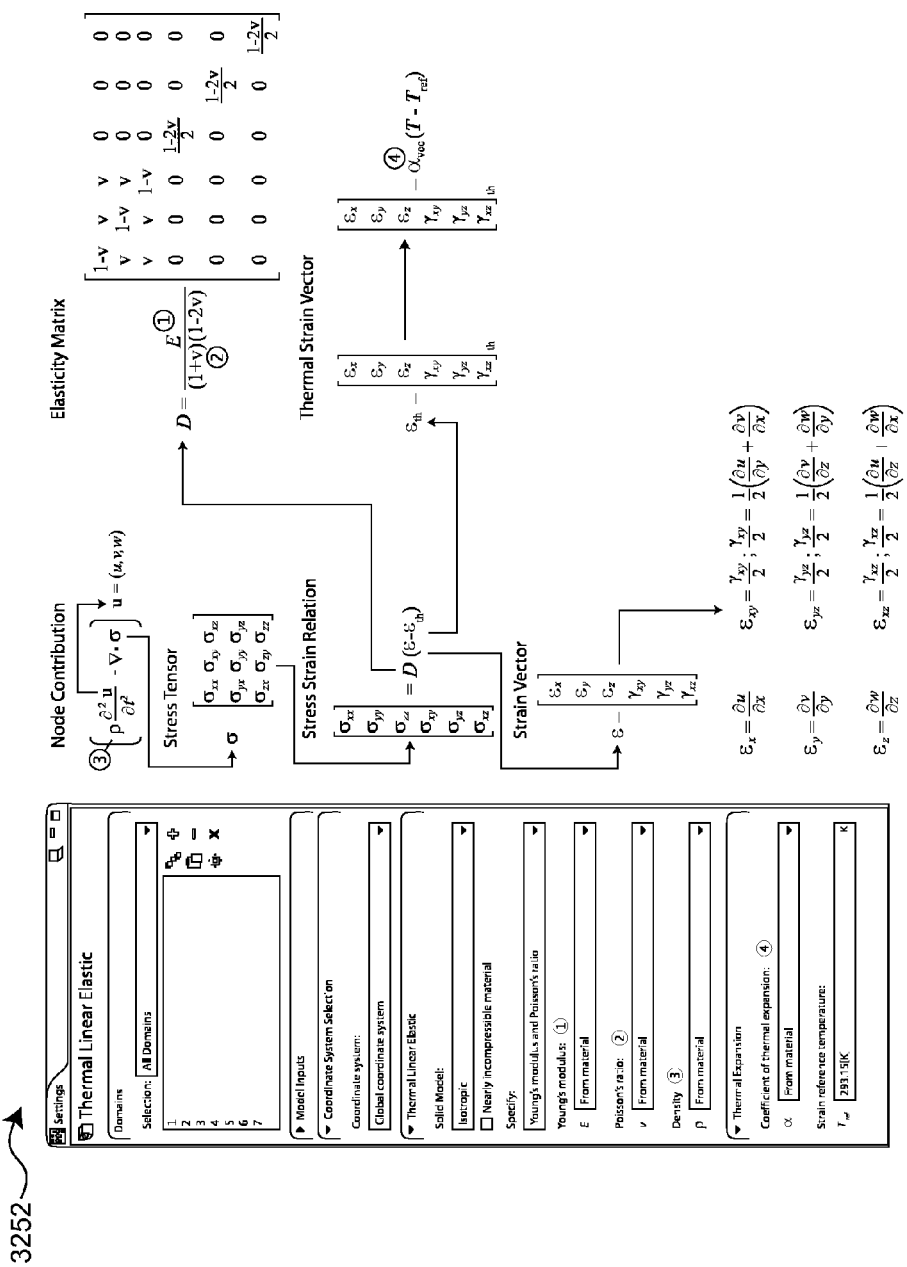
FIG. 32 illustrates an exemplary aspect of a window for a node of a model tree for entering settings that define model operations for a multiphysics problem.

Referring now to FIG. 32, an exemplary aspect of a window 3252 is illustrated for a model node of a model tree for entering settings that define model operations for a multiphysics problem. More specifically, an exemplary window is illustrated for entering accessed settings for the exemplary Thermal Linear Elastic child node (see, e.g., element 3152 in FIG. 31). Again, the illustration is non-limiting and demonstrates the flexibility of the model tree for accessing and setting features of the multiphysics modeling system. FIG. 32 includes an exemplary settings window 3252 that is associated with physical quantities for structural displacements that may occur in the modeling of thermal expansion in a selected geometrical domain of a multiphysics problem. In certain embodiments, default physical properties, such as material properties, may be linked to a materials node (see, e.g., material node 3040 in FIG. 30) or a user may manually enter the physical properties. For example, settings window 3252 includes different fields for parameters that can be applicable for generating a contribution to a set of partial differential equations from the Thermal Linear Elastic 1 child node. It is contemplated that the settings window 3252 may define material properties that are then used in generating a node contribution to the partial differential equations for a selected geometrical domain in a multiphysics problem. In the example of FIG. 32, the material properties may include Young's modulus, E, Poisson's ratio, v, density, p, and/or the coefficient of thermal expansion, a, of a material. Applying the exemplary material properties, a node contribution can then be generated as a function of the physical quantities, which for the exemplary embodiment, may be expressed as displacement vector, u. Again, as discussed elsewhere, for different models, different parameters may be used depending on the physics phenomena being simulated—the illustrated material or physical properties are provided by way of example only, and thus, are non-limiting.

In certain embodiments, it is also contemplated that the setting window also displays informational aspects about certain operations in the model tree. For example, information about the author or the source of the operation represented by a particular node in the model tree may be presented or be selectable in the setting window. The setting window may also present information about the date and time (e.g., entry of certain information, running a certain model) or comments regarding the operations about the selected node.

Figure 33:
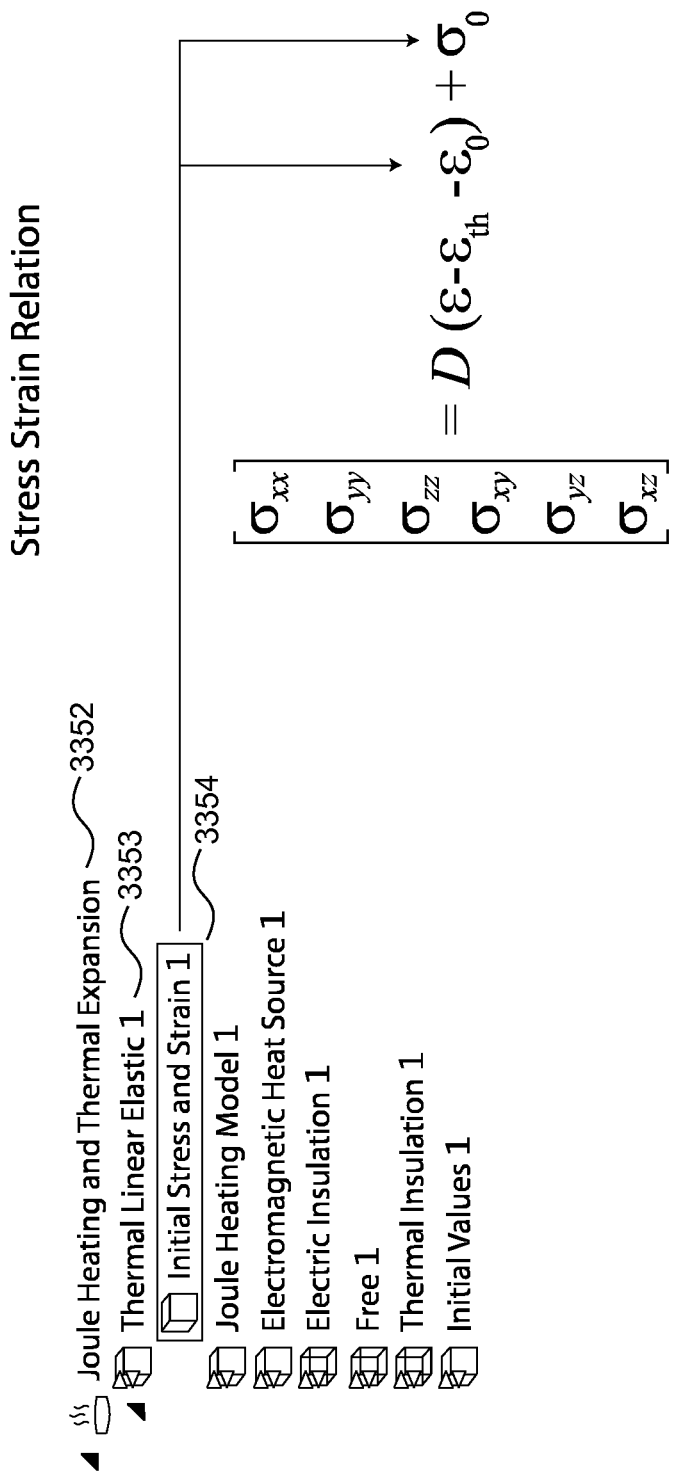
FIG. 33 illustrates an exemplary aspect of a physics node of a model node that has an additional node for describing selected physical quantities for a multiphysics problem.

Referring now to FIG. 33, an exemplary aspect of a physics node 3352 associated with a model node is illustrated. The exemplary physics node 3352 has additional nodes 3353, 3354 for describing selected physical quantities for a multiphysics problem. For example, a stress-strain relationship, similar to the one illustrated in FIG. 32, may be altered through the addition of stress tensor, a. The node denoted "Initial Stress and Strain 1" may change an operation that sets the contribution of the "Thermal Linear Elastic 1", by changing the stress-strain relationship in a selected geometrical domain. More generally, the sequence of operations can be altered in a multiphysics problem by adding a node further describing certain physical quantities. In certain embodiments, the operation at node 3354 may also change the equations of the physical quantities, such as for the structural displacements, while keeping other equations unchanged. A sequence of operations may be updated by a user by selection of a node, such as node 3354, which may then generate corresponding change(s) in partial differential equation(s) that solve the multiphysics problem. Again, as discussed elsewhere, for different models, different parameters may be used depending on the physics phenomena being simulated—the illustrated nodes are provided by way of example only, and thus, are non-limiting.

Figure 34:
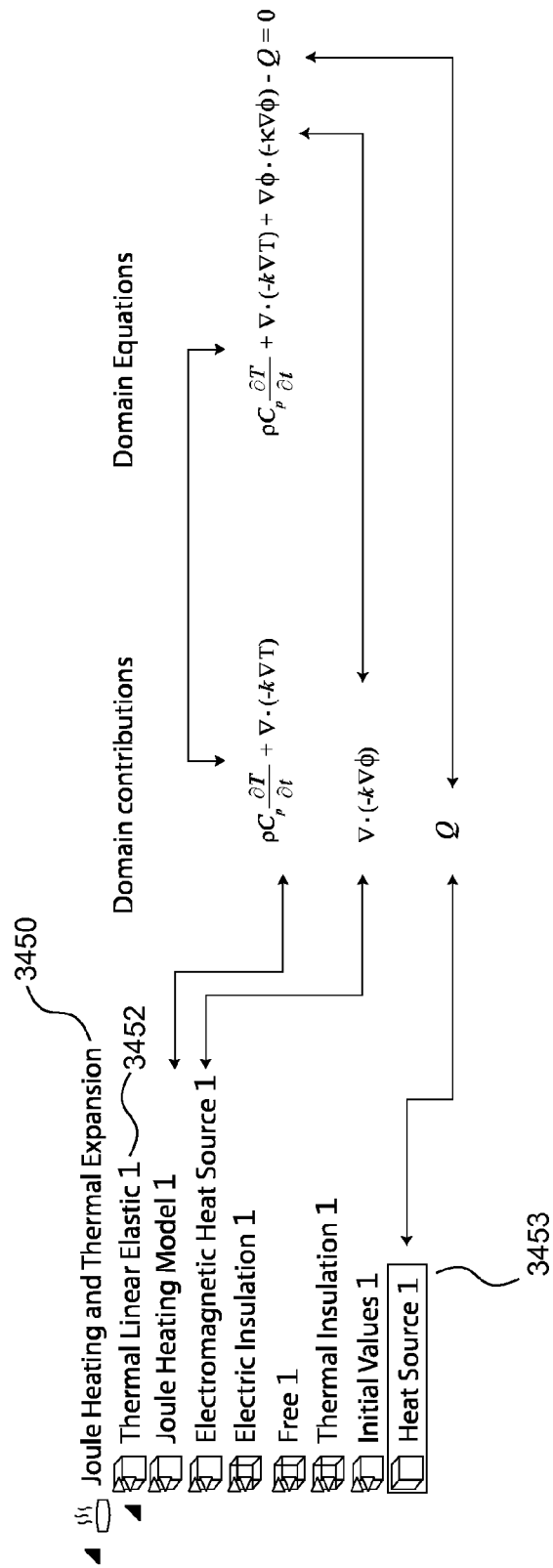
FIG. 34 illustrates an exemplary aspect of a physics node of a model node describing operations representing contributions to the physical quantities of a multiphysics problem.

Referring now to FIG. 34, another exemplary aspect of a physics node 3450 in a model tree is illustrated. In this aspect, an operation representing contributions to physical quantities is illustrated. For example, child node 3453 (e.g., Heat Source 1) may represent an operation that adds a contribution to a partial differential equation for a physical quantity, such as temperature, in a selected geometrical domain. As FIG. 34 illustrates, the exemplary partial differential equation also includes the temperature contributions represented by the equations from Joule Heating Model 1 and Electromagnetic Heat Source 1. In certain embodiments, child nodes, such as node 3453, may be added by a user to generate contributions for all or some of the physical quantities, such as structural displacements and electric potential, as illustrated in the exemplary physics node 3450 (e.g., Joule Heating and Thermal Expansion). Again, as discussed elsewhere, for different models, different parameters may be used depending on the physics phenomena being simulated—the illustrated nodes are provided by way of example only, and thus, are non-limiting.

Figure 35:
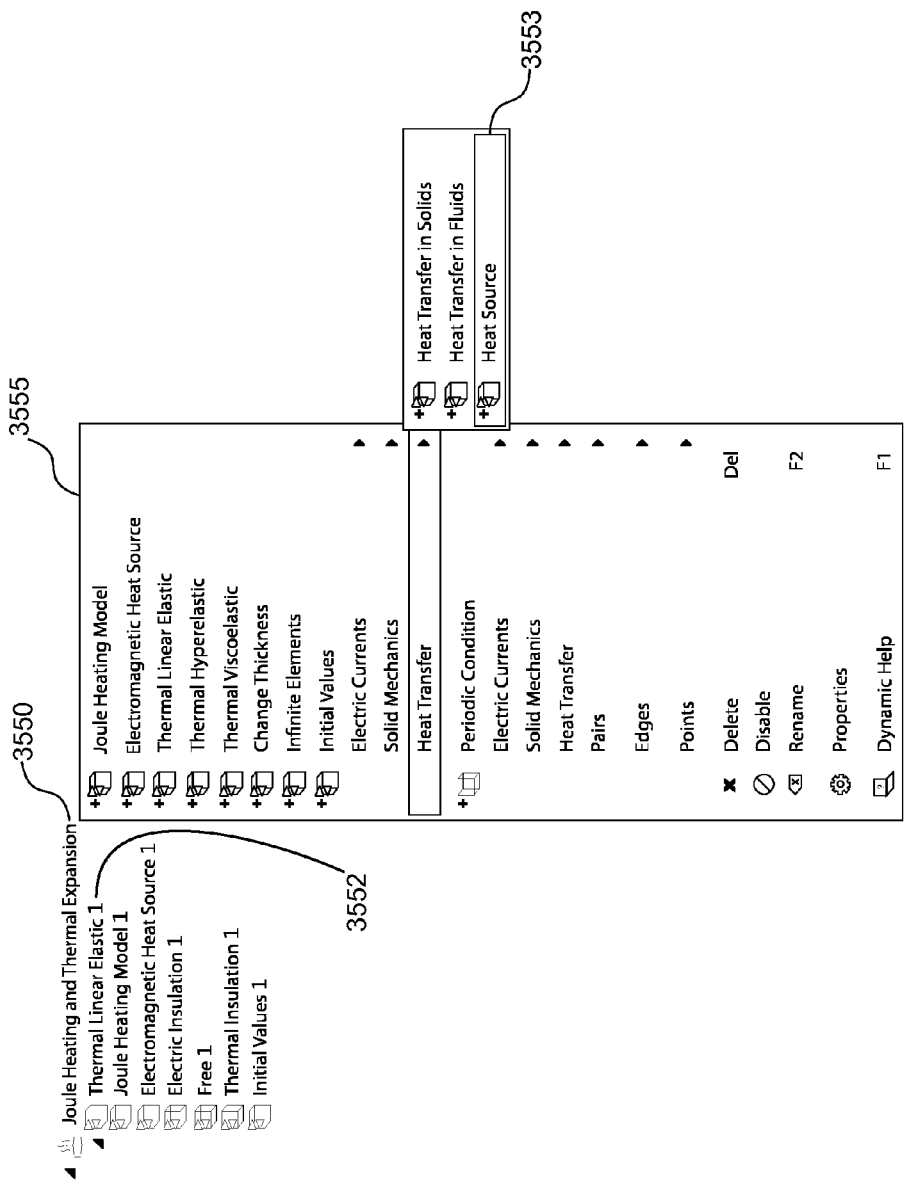
FIG. 35 illustrates an exemplary window for adding contributions to the physical quantities associated with a physics node.

Referring now to FIG. 35, an exemplary aspect of a window for adding contributions to the physical quantities associated with a physics node of a model tree is illustrated. A menu box 3555 can be displayed next to a physics node 3550 (e.g., Joule Heating and Thermal Expansion) in response to a system user providing a predetermined input, such as a right-click via a mouse. The menu box 3555 may contain menu items that allow contributions to be added to equations in geometric entities, such as domains, boundaries, edges, and points. In the exemplary aspect, a Heat Source node 3553 contribution may be associated with a heat transfer option in the menu box 3555. For example, by selecting Heat Source node 3553, a contribution may be added to a partial differential equation for temperature in a selected geometrical domain, as illustrated, for example, in FIG. 34. It is contemplated that other selected contributions may be added to other geometric entities depending on the selections made by the multiphysics modeling user. The addition of contributions may also be predetermined as part of a sequence of operations indirectly associated with other model selections.

It is contemplated that in certain aspects of the present disclosure it may be desirable for a multiphysics modeling system to label or otherwise identify nodes of a model tree that represent certain operations that generate contributions to equations associated with a geometrical domain. For example, selecting a node that represents a load may label or highlight other nodes in the model tree that coexist with that load on any of the load's geometric selections (e.g., domain, boundary, edge, point). In this example, the label may include an arrow or some other identifying aspect for a non-exclusive node. If a node represents contributions that cannot coexist with other nodes on a geometric selection, it is understood to be an exclusive node. In certain aspects where nodes overlap, a last node in a sequence may overwrite the previous node on the geometric selections.

Figure 36:
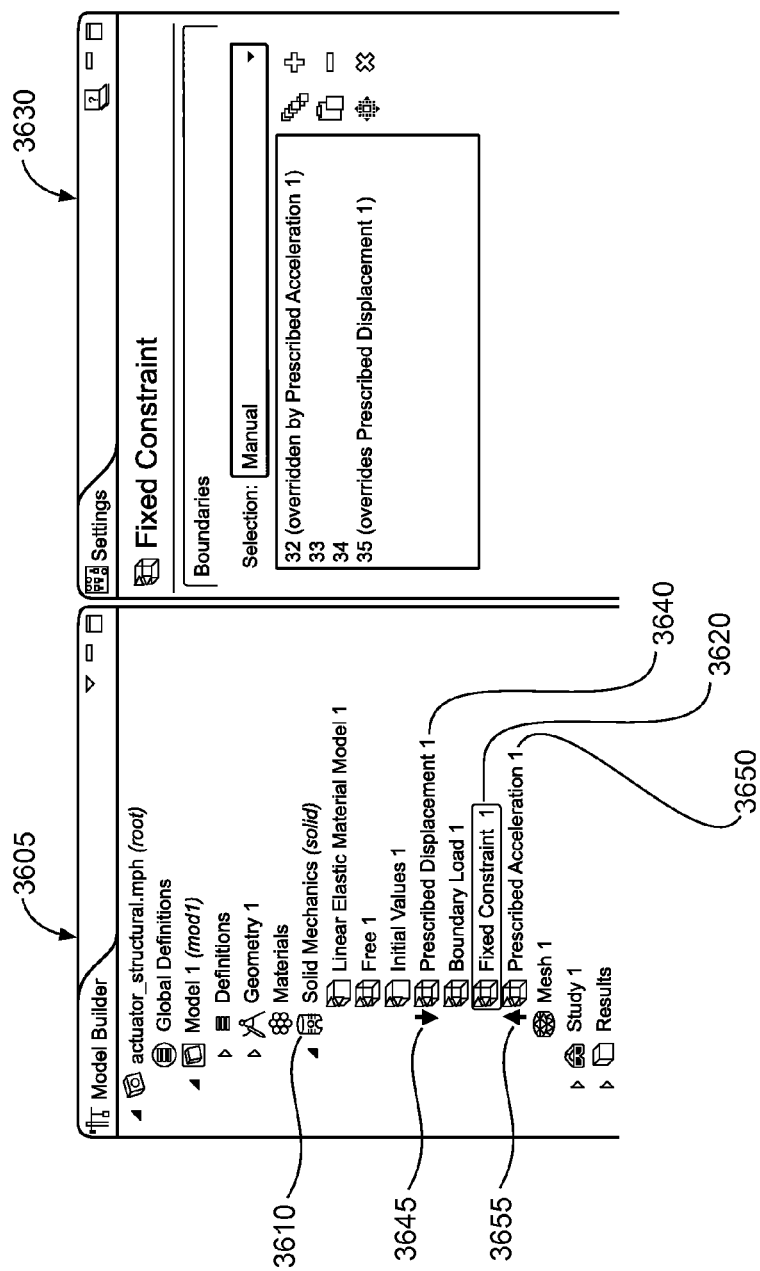
FIG. 36 illustrates an exemplary model tree having a plurality of nodes including the identification of exclusive operation(s) associated with a selected node.

Turning now to FIG. 36, an exemplary model tree is illustrated having a plurality of model nodes that include the identification of exclusive operation(s) associated with a selected node. The exemplary multiphysics model is based on simulating the structural aspects of a structure, such as an actuator, but can be readily applied to any of numerous physics phenomena. Exemplary Model 1 node includes a physics node 3610 that includes physics quantities and boundary conditions associated with solid mechanics aspects of the virtual structure. In certain exemplary modeling scenarios, it may be desirable to constrain the displacement of a particular structure in one or more directions at a boundary of the solid mechanics physics. To simulate this scenario, the physics quantities and boundaries of the physics node 3610 may include, for example, a fixed boundary condition node 3620 (e.g., Fixed Constraint 1). In certain embodiments, selection of node 3620 may reveal various exclusive associations or relationships with other physics quantity and/or boundary child nodes of the parent physics node 3610. For example, selection of the fixed boundary condition node 3620 can reveal a settings window 3630 that includes exemplary settings for fixed constraints associated with the physics node 3610. Selection of node 3620 may also reveal that the fixed boundary condition associated with node 3620 overrides certain functions associated with the Prescribed Displacement 1 node 3640.

To highlight or identify that node 3640 is overridden by another operation along at least one of its boundaries, a first graphical marker 3645, such as a solid downward facing arrow, may be situated next to the graphical display of node 3640. The settings window 3630 for node 3620 may also display information about the node and the geometric entity that the node 3620 may be acting on. For example, node 3620 is illustrated and described in the settings window 3630 as overriding the Prescribed Displacement 1 node 3640 along boundary number 35.

Selection of fixed boundary condition node 3620 can also reveal an association or relationship with another node, such as Prescribed Acceleration 1 node 3650. The association can be highlighted by a second graphical marker 3655, such as a solid upward facing arrow situated next to the graphical display of node 3650. In certain embodiments, the first and second graphical markers 3645, 3655 may be dynamically displayed in response to a user selecting a particular node, such as node 3620. While both nodes 3640 and 3650 are both associated with node 3620, the association between nodes can be different. For example, the Prescribed Acceleration 1 node 3650 overrides the fixed boundary condition node 3620. This override may be graphically illustrated to the system user by display of an upwardly pointing arrow for second marker 3655 when node 3620 is selected. Furthermore, the settings window 3630 that is displayed upon selection of node 3620 can also display information about the geometric entity that overrides node 3620. For example, node 3620 is illustrated and described in the settings window 3630 as being overridden by the Prescribed Acceleration 1 node 3650 along boundary number 32.

It is contemplated that in certain aspects of the present disclosure, setting up a model, where certain nodes override other nodes for certain domains, can be done graphically based on an ordering of the nodes. Changes to how the nodes override one another (e.g., which node overrides which)_can be made by, for example, reordering the nodes. Take for example FIG. 36, which illustrates node 3640 being overridden by node 3620 based on node 3620 being later on the list of child nodes below physics node 3610. Similarly, node 3650 overrides node 3620 based on node 3650 being later or the lowest on the list of child nodes below physics node 3610. By allowing the reordering of nodes, the model can be adjusted in how one node may or may not override another node.

Based on the exemplary aspects described and illustrated for FIG. 36, it is contemplated that a model tree can include one or more exclusive nodes that override other nodes or operations for one or more domains of a multiphysics problem. For contributions added to an equation that are considered exclusive, the contributions cannot coexist on a geometric domain or boundary with other generated contributions. It is contemplated that it may be desirable for exclusive contributions in the relationships or associations between the various nodes to be graphically presented to a system user. Then, by selecting a particular node (e.g., node 3620), a system user is quickly presented with information in a model tree window 3605 of other nodes (e.g., nodes 3640 and 3650) that are overridden by, or that override, the selected node (e.g., node 3620). These relationships can be illustrated using graphical highlights, markers, or other identifiers. Furthermore, it is contemplated that selection of nodes can also, or alternatively, include the presentation of a setting windows (e.g., setting window 3630) that identifies domains (e.g., geometric entities 32 and 35) to which the exclusive nature of the various relationships or associations between nodes and/or domains may apply.

Figure 37:
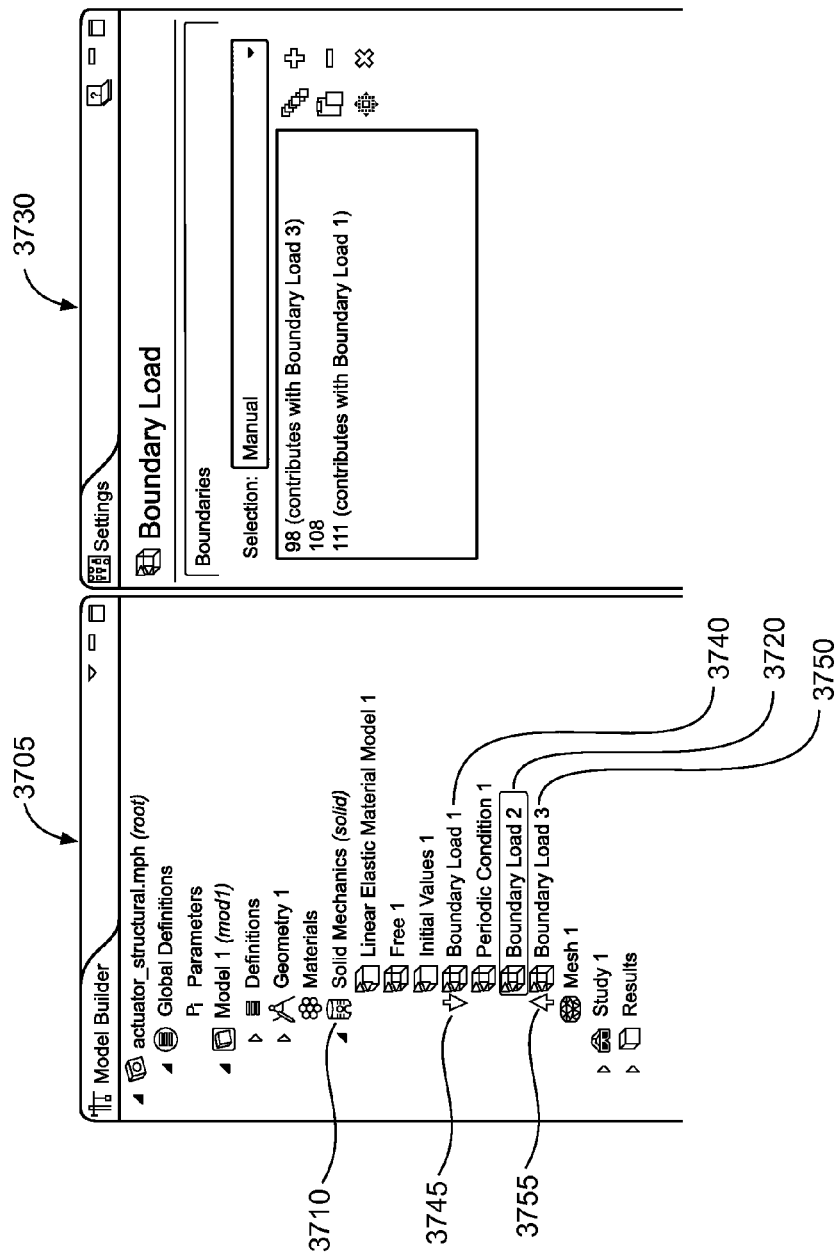
FIG. 37 illustrates an exemplary model tree having a plurality of nodes including the identification of non-exclusive operation(s) associated with a selected node.

Referring now to FIG. 37, an exemplary model tree is illustrated having a plurality of model nodes that include the identification of non-exclusive operation(s) associated with a selected node. Similar to FIG. 36, an exemplary multiphysics model based on simulating the structural aspects of a structure, such as an actuator, is illustrated, but the application can be readily applied to any of numerous physics phenomena. Exemplary Model 1 node includes a physics node 3710 that includes physics quantities and boundary conditions associated with solid mechanics aspects for the virtual structure. In the illustrated, non-limiting example, a load can be applied to a boundary, such as the boundary represented by Boundary Load 2 node 3720. Selection of node 3720 may reveal various non-exclusive relationships or associations between node 3720 and other nodes, such as Boundary Load 1 node 3740 and Boundary Load 3 node 3750. The non-exclusive relationship may be that Boundary Load 2 contributes a load, together with Boundary Load 1 and Boundary Load 3, on a particular boundary of the structure being simulated. To highlight the non-exclusive relationship or association between node 3720 and node 3740, a first graphical marker 3745, such as an outline of a downward facing arrow, may be situated next to the graphical display of node 3740 to symbolize that node 3740 contributes together with node 3720 on at least one of the boundaries of the model. The arrow can be directed downward to identify that node 3720 is below node 3740 and that in the sequence of operations, the operation for node 3720 is after the operation for node 3740. To highlight the non-exclusive relationship or association between node 3720 and node 3750, a second graphical marker 3755, such as an outline of an upward facing arrow, may be situated next to the graphical display of node 3750 to symbolize that node 3750 contributes together with node 3720 on at least one of the boundaries of the model. The arrow can be directed upward to identify that node 3720 is above node 3750 and that in the sequence of operations, the operation for node 3720 is before the operation for node 3750. The settings window 3730 for selected node 3720 may also display information about the node(s) and the related non-exclusive operation(s). For example, node 3720 is illustrated and described in the settings window 3730 as contributing with Boundary Load 1 node 3740 along boundary number 111 and as contributing with Boundary Load 3 node 3750 along boundary number 98.

Based on the exemplary aspects described and illustrated for FIG. 37, it is contemplated that a model tree can include one or more non-exclusive nodes or operations that contribute to the same domain or geometric entity of the multiphysics model. It is contemplated that it may be desirable for the non-exclusive contributions in the relationships or associations between the various nodes to be graphically presented to a system user via a GUI. By selecting a particular node (e.g., node 3720), a system user can be quickly presented with information in the model tree window 3705 of other nodes (e.g., nodes 3740 and 3750) that having a contributory affect on the same model domain as the selected node (e.g., node 3720). These relationships can be illustrated using graphical highlights, markers, or other identifiers. Furthermore, it is contemplated that selection of nodes can also, or alternatively, include the presentation of a setting windows (e.g., setting window 3730) that identifies domains (e.g., geometric entities 98 and 111) to which the contributory nature of the various relationships or associations between nodes may apply.

It is contemplated that in certain aspects of the present disclosure, the exemplary model tree window 3705 illustrated in FIG. 37 may include situations in which a node or operation cannot be changed or altered. It is also contemplated that a system user may be able to select a particular node or operation and have information associated with the selection displayed, such as in the settings window 3730. Similarly, the model tree window 3705 can allow a system user the ability to review the settings of a multiphysics problem by selecting one geometrical entity at a time, which may allow information about all the nodes or operations that contribute to the equations associated with the selected geometric entity to be obtained. In one non-limiting example, a user may select Boundary Load 2 node 3720, and then select Boundary 98 from the boundary selection list in settings window 3730. Upon selecting Boundary 98, nodes 3720 and 3740 may be highlighted or otherwise identified as contributing to the boundary conditions on Boundary 98. In certain embodiments, a window (not shown) may also be displayed graphically displaying boundary 98 of multiphysics problem with the boundary being highlighted.

Figure 38:
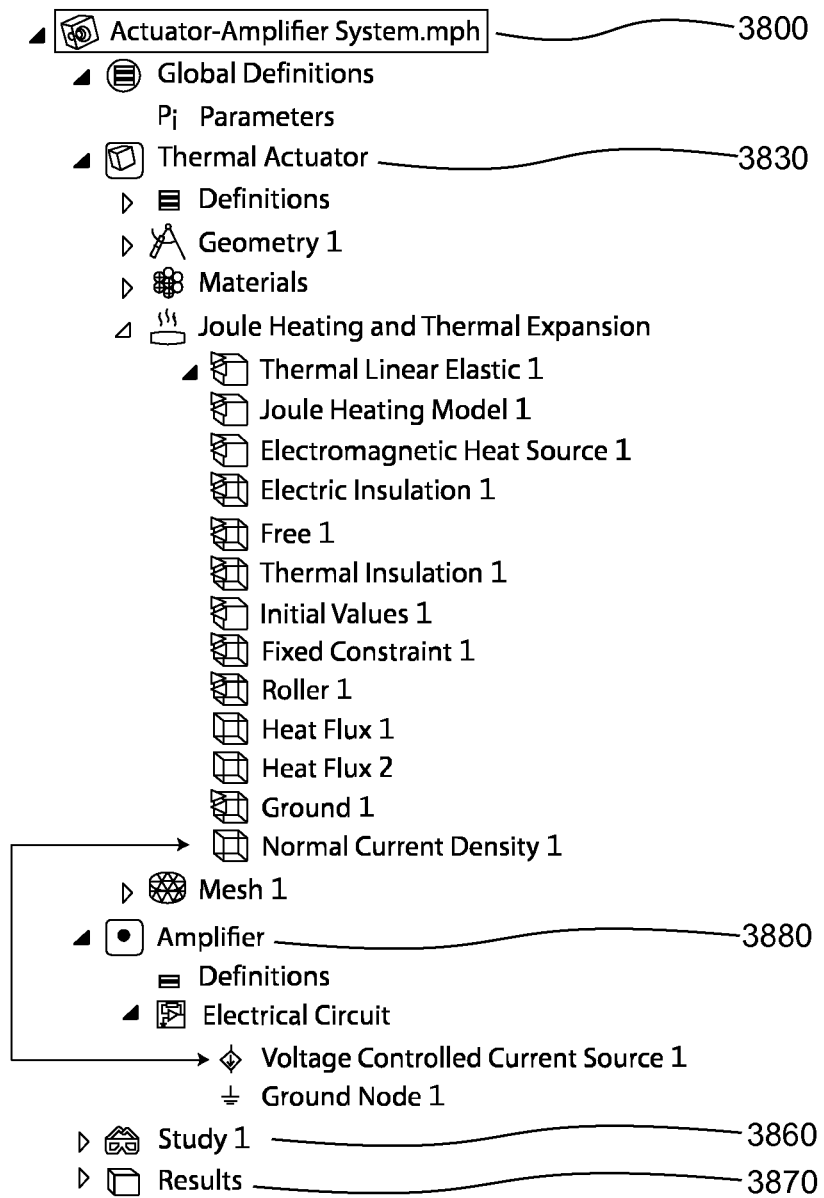
FIG. 38 illustrates an exemplary aspect of a model tree including a plurality of model nodes for which settings of each of the model nodes can be accessed to allow the formation and solving of a multiphysics problem on a multiphysics modeling system.

Referring now to FIG. 38, an exemplary aspect of a model tree is illustrated comprising a plurality of model nodes 3830, 3880 for which the settings of each of the model nodes can be accessed to allow the formation and solving of a multiphysics problem on a multiphysics modeling system. The model nodes 3830, 3880 may generally represent components of a system being modeled in which the components are simulated simultaneously. In certain embodiments, each of the plurality of models may share some constituents of the multiphysics problem, such as the ones represented by a study node 3860 and a results node 3870. For example, a first model node 3830 (e.g., Thermal Actuator) may represent a thermal actuator activated by an electric current. The electric current may heat a part of the actuator causing thermal expansion, which then yields a desired structural displacement. The electric current may be generated by an amplifier that is also being simulated in the multiphysics problem. The amplifier may be represented in a model tree as a second model node 3880 (e.g., Amplifier). The physical connection between the thermal actuator and the amplifier may be described by an equation that sets a current output from the model of the amplifier equal to the current that drives the thermal actuator. It may also be represented by using a coupling operator, such as an operator that determines the total value of the current at a boundary by integrating the current density over this boundary. The value of this integral, representing the total current, may then be defined in an equation to be equal to the current output from the amplifier. It is contemplated that in certain embodiments more than two model nodes may be simulated by the multiphysics modeling system. As described multiple times elsewhere herein, these exemplary embodiment provide an example only of the model tree features in the multiphysics modeling system and are therefore non-limiting.

An exemplary aspect of the present disclosure includes a method for accessing settings for forming and solving multiphysics problems in a multiphysics modeling system using a model tree. Nodes in the model tree may be used to represent the constituents of a multiphysics problem, such as the geometrical domain, the physical quantities, the physical properties, the boundary conditions, the mesh, the solver, and the simulation results.

In another exemplary aspect of the present disclosure, the model tree may include one or more parent nodes having one or more child nodes. The nodes may represent constituents of the problem to be solved by the modeling. In addition, nodes may further represent sequences of modeling operations that generate constituents when the sequences are performed. Branches in the model tree may represent logical relations between operations represented by parent nodes and child nodes.

In another aspect exemplary aspect of the present disclosure, a method for generating a model tree is based on input(s) entered by a user in a GUI associated with the multiphysics modeling system.

In yet another exemplary aspect of the present disclosure, a method alters operations in a sequence of modeling operations while keeping other operations unchanged. The sequence of modeling operations may then be performed in order to update a multiphysics problem to reflect the altered operations.

In a further exemplary aspect of the present disclosure, a physics node in a model tree may represent a physical quantity and child nodes branching from the physics node may represent operations that add contributions to the physical quantities. The contributions may describe physical properties and boundary conditions.

In another exemplary aspect of the present disclosure, the contributions may be added to a multiphysics problem when they are attributed to a geometrical domain.

In yet a further exemplary aspect of the present disclosure, method includes several models represented by model nodes in a model tree. The model nodes may represent components that are connected in a system where the several models may be simulated simultaneously. The different models represented in the model tree may share constituents of a multiphysics problem, such as a solver and the simulation results.

As discussed elsewhere herein, the windows, menus, engineering and scientific phenomena, equations, parameters, and nodes illustrated in FIGS. 4, 5, 7, 10, 12, and 28-38 are non-limiting examples of model trees contemplated by the present disclosure. It would also be understood that processes and/or other physics phenomena having different exemplary windows, menus, equations, parameters, and nodes, are contemplated by the present disclosure, as well. The windows, menus, equations, parameters, and nodes depend on the processes, components, and/or physics phenomena being modeled. Therefore, it would be understood that FIGS. 4, 5, 7, 10, 12, and 28-38 provide non-limiting exemplary relationships for a model tree structure contemplated for a multiphysics modeling system that is capable of simultaneous modeling one or more components and/or processes having different properties.

According to one exemplary aspect of the present disclosure, a method for controlling settings of a design system is executable on one or more processors associated with the design system. The method includes the acts of detecting via a communications interface a multiphysics modeling system. Instructions are transmitted via the communication interface or another interface. The instructions include model settings related to a multiphysics model at least partially residing in the multiphysics modeling system. Model results are received that are at least partially derived from the transmitted model settings. At least a portion of the received model results are displayed in a graphical user interface associated with the design system.

It is contemplated that in certain aspects, the transmitting and receiving acts are implemented via a bridge connection established between the multiphysics modeling system and the design system. In certain aspects, the multiphysics model is at least partially represented in the graphical user interface via a model tree.

It is further contemplated that in certain aspects, a window is generated in the graphical user interface associated with the design system. The window may be least partially linked with the multiphysics modeling system. A window may also be generated in the graphical user interface associated with the design system. The window may be configured to display model settings via a model tree. The model setting can include at least a portion of the transmitted instructions.

It is also contemplated that in certain aspects, transmitting instructions can include transmitting geometric features. A geometric representation of the multiphysics model may be generated that is at least partially based on the transmitted geometric features. The geometric representation may be generated in the design system.

According to another exemplary aspect of the present disclosure, a method executable on one or more processors associated with a multiphysics modeling system dynamically controls the multiphysics modeling system. The method includes the acts of detecting a design system via a first interface. Instructions are received via one or more interfaces. The instructions include settings related to a multiphysics model associated with the multiphysics modeling system. A solution is determined for the multiphysics model at least partially based on the received instructions. The solution is transmitted to at least one of the one or more interfaces. The solution is configured for display within a design system user interface that is associated with the design system.

It is contemplated that in certain aspects, the receiving and transmitting acts are implemented via a bridge connection between the multiphysics modeling system and the design system.

It is further contemplated that in certain aspects, in response to receiving an instruction associated with a geometric representation, a geometric domain is generated in the multiphysics modeling system. In certain aspects, the act of defining a multiphysics problem may include using the generated geometrical domain.

It is also contemplated that in certain aspects, parameters are transmitted describing geometric features associated with the generated geometrical domain to the design system. In certain aspects, parameter lists are transmitted representing variations in the geometric features.

It is additionally contemplated that in certain aspects, physical properties and boundary conditions are determined, via associativity, for each variation to a defined multiphysics problem.

According to another exemplary aspect of the present disclosure, one or more non-transitory computer readable storage media are encoded with instructions executable on one or more processors associated with a design system. The instructions include the acts of receiving a signal via a communications interface. The signal is associated with a multiphysics modeling system. Instructions are sent to the communications interface or another interface. The instructions include settings related to a multiphysics model associated with the multiphysics modeling system. Multiphysics model results derived from the settings are received. The multiphysics model result are displayed in a design system user interface.

According to a further exemplary aspect of the present disclosure, a method for controlling settings of a design system is executable on one or more processors associated with the design system. The method includes the acts of establishing a communications link between the design system and an associated multiphysics modeling system. Instructions are transmitted via the communications link or another link. The instructions include settings related to a multiphysics model associated with the multiphysics modeling system. Multiphysics model results derived from the settings are received. The multiphysics model results are displayed in a design system user interface.

It is contemplated that in certain aspects, the transmitting and receiving acts are executed via a bridge connection.

It is further contemplated that in certain aspects, the multiphysics model in the design system user interface is represented using a model tree. In certain aspects, a window is generated in the design system user interface that is related to the multiphysics modeling system. The window is associated with the settings and the model tree includes at least a portion of the instructions for the settings.

It is also contemplated that in certain aspects, transmitting instructions includes sending geometric features. In certain aspects, a geometric representation is generated in the design system.

According to another exemplary aspect of the present disclosure, a method for dynamically controlling a multiphysics modeling system is executable on one or more processors associated with the multiphysics modeling system. The method includes the acts of establishing one or more communications channels between the multiphysics modeling system and an associated design system. Instructions are received via the one or more communications channels. The instructions include settings related to a multiphysics model associated with the multiphysics modeling system. An outcome is determined for the multiphysics model based on the received instructions. The outcome is sent to at least one of the one or more communication channels. The outcome is configured for display in a design system user interface.

According to one exemplary aspect of the present disclosure, a method executable on one or more processors associated with a multiphysics modeling system generates a model tree structure for the multiphysics modeling system. The multiphysics modeling system is configured to model combined systems having physical quantities represented in terms of partial differential equations. The method includes the acts of receiving an input associated with a selection of space dimensions for at least one of the combined systems. A plurality of selectable physics options for association with at least one of the combined systems are transmitted for display on a user interface. An input associated with a selection of at least one of the plurality of selectable physics options is received. One or more selectable study options for association with the combined systems are transmitted for display on the user interface. An input associated with a selection of at least one of the one or more selectable study options is received. In response to receiving the input associated with the selection at least one of the one or more selectable study options, a model tree structure is generated. The model tree structure includes a plurality of selectable nodes and subnodes. The selectable nodes and subnodes include fields for storing physical quantities and operations for modeling the combined systems.

It is contemplated that in certain aspects, the selectable nodes and subnodes are configured for display on a user interface associated with the multiphysics modeling system. In certain aspects, the model tree structure includes exclusive and non-exclusive subnodes. The exclusive and non-exclusive subnodes may be labeled with symbols distinguishing the exclusive subnodes from the non-exclusive subnodes and distinguishing the exclusive and non-exclusive subnodes from other subnodes in the model tree.

It is also contemplated that in certain aspects, in response to receiving an input associated with the selection of a node or subnode, an identifying setting of a geometric entity associated with the selected node or subnode is displayed. Information about exclusive or non-exclusive subnodes related to the selected node or subnode may be further displayed.

According to another exemplary aspect of the present disclosure, a method for solving a multiphysics model in a multiphysics modeling system is executed on one or more processor associated with the multiphysics modeling system. a multiphysics modeling system generates a model tree structure for the multiphysics modeling system. The multiphysics model includes combined systems having physical quantities represented in terms of partial differential equations. The multiphysics modeling system is configured to receive model inputs via a model tree. The method includes generating a geometric representation of the combined systems. The geometric representation is at least partially based on data received via a geometry node. Physical properties for the geometric representation of the combined systems are assembled. The physical properties are at least partially based on data received via a materials node. Physics quantities and boundary conditions are assembled for one or both of the geometric representation and the physical properties of the combined systems. The assembling of the physics quantities and boundary conditions are at least partially based on selected physics options received via a physics node. A solution for the multiphysics model of the combined systems is generated. The solution is based on partial differential equations for one or more study steps associated with a set of partial differential equations for the assembled physics quantities and boundary conditions. The study steps are received via a study node. The geometry node, materials node, physics node, and study node are logically associated branches of a model tree for the multiphysics model.

It is contemplated that in certain aspects, exclusive and non-exclusive contributions to the partial differential equations are generated using operations represented by exclusive and non-exclusive child nodes to one or more of the geometry node, the materials node, or the physics node of the model tree. In certain aspects, the exclusive and non-exclusive subnodes are labeled with symbols distinguishing the exclusive subnodes from the non-exclusive child nodes and distinguishing the exclusive and non-exclusive child nodes from other nodes in the model tree.

It is also contemplated that in certain aspects, in response to selecting a node, an identifying setting of a geometric entity associated with the selected node is displayed and information about exclusive or non-exclusive child nodes related to the selected node are further displayed.

It is further contemplated that in certain aspects, the solution is displayed on a user interface and is configured to be displayed in a 2-D graphical form. In certain aspects, the solution is configured to be displayed in a 3-D graphical form or tabular form. In certain aspects, the geometry node, the materials node, the physics node, and the study node are each selectable via a user interface and include fields for storing physical quantities and operations for modeling the combined systems.

According to a further exemplary aspect of the present disclosure, one or more non-transitory computer readable storage media are encoded with instructions executable on one or more processors associated with a multiphysics modeling system. The instructions include the acts of generating a geometric representation of the combined systems. The geometric representation is at least partially based on data received via a geometry node. Physical properties are assembled for the geometric representation of the combined systems. The physical properties are at least partially based on data received via a materials node. Physics quantities and boundary conditions are assembled for one or both of the geometric representation and the physical properties of the combined systems. The assembling of the physics quantities and boundary conditions are at least partially based on selected physics options received via a physics node. A solution is generated for the multiphysics model of the combined systems. The solution is based on partial differential equations for one or more study steps associated with a set of partial differential equations for the assembled physics quantities and boundary conditions. The study steps are received via a study node. The geometry node, materials node, physics node, and study node are logically associated branches of a model tree for the multiphysics model.

According to another aspect of the present disclosure, a method for generating model constituents associated with a multiphysics model via a multiphysics modeling system is executed on one or more processors. The method includes representing a plurality of model constituents as one or more selectable primary nodes of a model tree. Operations that generate the model constituents are represented as one or more selectable secondary nodes to the primary nodes. Physical quantities associated with said model constituents are represented via at least one of the selectable primary nodes of the model tree. Contributions to partial differential equations are generated in the multiphysics modeling system via operations represented as at least one of the selectable secondary nodes to the at least one of the selectable primary nodes.

It is contemplated that in certain aspects, the multiphysics model includes a geometrical domain. The partial differential equations are generated only if attributable to the geometrical domain.

It is also contemplated that in certain aspects the method also includes representing combined systems as a plurality of model nodes in the model tree. Equations operable to couple the plurality of model nodes may be generated via operations represented as secondary nodes to the model nodes.

It is further contemplated that in certain aspects contributions to the partial differential equations are generated for each of the model nodes. The partial differential equations may be solved simultaneously by the multiphysics modeling system.

It is also contemplated that in certain aspects the method also includes generating exclusive and non-exclusive contributions to the partial differential equations using operations represented by exclusive and non-exclusive secondary nodes of the model tree. In certain aspects, the exclusive and non-exclusive subnodes may be labeled with symbols distinguishing the exclusive subnodes from the non-exclusive subnodes and distinguishing the exclusive and non-exclusive secondary nodes from other nodes in the model tree. In certain aspects, in response to selecting a primary node or secondary node, an identifying setting is displayed of a geometric entity associated with the selected node and information about exclusive or non-exclusive secondary nodes related to the selected node may further be displayed.

It is additionally contemplated that the informational aspects about certain operations in the model tree may be displayed for the nodes of the model tree. Information about the author or the source of the operation represented by a particular node in the model tree may be presented or be selectable in the setting window.

According to certain aspects of the present disclosure, a method for generating a model tree structure for a multiphysics modeling system configured to model combined systems having physical quantities represented in terms of partial differential equations is executable on one or more processors associated with the multiphysics modeling system. The method comprises the acts of transmitting a plurality of selectable physics options for association with at least one of the combined systems. An input can be associated with a selection of at least one of the plurality of selectable physics options is received via the one or more processors. One or more selectable study options can be transmitted for association with the combined systems. An input associated with a selection of at least one of the one or more selectable study options can be received via the one or more processors. In response to receiving the input associated with the selection at least one of the one or more selectable study options, a model tree structure can be generated using the one or more processors. The model tree structure can include a plurality of selectable nodes including parent nodes and child nodes, wherein the selectable nodes may include fields storing physical quantities and operations for modeling the combined systems.

According to certain aspects of the present disclosure, a method for solving a multiphysics model in a multiphysics modeling system comprises the multiphysics model including combined systems having physical quantities represented in terms of partial differential equations. The multiphysics modeling system can be configured to receive model inputs via a model tree. The method can be executable on one or more processors associated with the multiphysics modeling system and can comprise the acts of generating a geometric representation of the combined systems. The geometric representation can be at least partially based on data received via a geometry node. Physical properties for the geometric representation of the combined systems can be assembled. The physical properties can be at least partially based on data received via a materials node. Physics quantities and boundary conditions can be assembled for one or both of the geometric representation and the physical properties of the combined systems. The assembling of the physics quantities and boundary conditions can be at least partially based on selected physics options received via a physics node. A solution for the multiphysics model of the combined systems can be generated. The solution may be based on partial differential equations for one or more study steps associated with the assembled physics quantities and boundary conditions. The study steps can be received via a study node. The geometry node, materials node, physics node, and study node can be logically associated branches of a model tree for the multiphysics model.

According to certain aspects of the present disclosure, a method for generating model constituents associated with a multiphysics model in a multiphysics modeling system is executed on one or more processors. The method comprises representing, via one or more user interfaces, a plurality of model constituents as one or more selectable primary nodes of a model tree. Operations can be represented that generate the model constituents as one or more selectable secondary nodes to the primary nodes. Physical quantities associated with the model constituents can be represented via at least one of the selectable primary nodes of the model tree. Contributions to partial differential equations in the multiphysics modeling system can be generated via the one or more processors, via operations represented as at least one of the selectable secondary nodes to the at least one of the selectable primary nodes.

According to another aspect of the present disclosure, one or more physical products (e.g., mechanical devices, electrical devices, electromechanical devices, structures, electromagnetic devices, semiconductor systems, wave propagation systems, chemical compounds, combinations of one or more of the foregoing) are designed and/or produced using the design system and/or multiphysics modeling system processes and/or methods described herein.

According to yet another aspect of the present disclosure, one or more non-transitory computer readable media are encoded with instructions, which when executed by at least one processor associated with a design system or a multiphysics modeling system, causes the at least one processor to perform the methods described herein.

Each of these embodiments and obvious variations thereof is contemplated as falling within the spirit and scope of the claimed invention, which is set forth in the following claims.

What is claimed is:

1. A method for generating a model tree structure for a multiphysics modeling system configured to model combined physical systems having physical quantities represented in terms of partial differential equations, the method being executable on one or more processing units associated with the multiphysics modeling system, the method comprising the acts of:
    transmitting, for display on one or more display devices, a plurality of selectable physics options for association with at least one of the combined physical systems;
    receiving, via the one or more processing units, a first input associated with a selection of at least one of the plurality of selectable physics options;
    transmitting, for display on the one or more display devices, one or more selectable study options for association with the combined physical systems, each transmitted study option corresponding to at least one of the plurality of selectable physics options;
    receiving, via the one or more processing units, a second input associated with a selection of at least one of the one or more selectable study options; and
    in response to receiving the second input, generating a model tree structure using the one or more processing units to graphically represent a multiphysics model data structure, the model tree structure including a plurality of user-selectable nodes generated from one or more selected physics options and one or more selected study options, the generated user-selectable nodes including one or more geometry nodes, one or more physics nodes, and one or more study nodes as logically associated branches of the same generated model tree structure such that the plurality of user-selectable nodes include one or more parent nodes and one or more child nodes to the one or more parent nodes, the geometry nodes including user-editable fields for receiving and storing user inputs defining a geometry of the combined physical systems, the user-selectable nodes including fields storing physical quantities for modeling the combined physical systems, at least one of the one or more child nodes including a field storing a modeling operation corresponding to at least one of the selected physics options and at least one of the one or more child nodes including another field storing a modeling operation corresponding to at least one of the selected study options for modeling the combined physical systems, wherein the one or more child nodes include exclusive and non-exclusive child nodes representing modeling operations to generate contributions to equations associated with one or more geometric entities, the exclusive child nodes overriding other nodes and representing contributions that do not coexist with contributions from other nodes on one or more of the geometric entities, the non-exclusive child nodes representing contributions that coexist with other contributions from other non-exclusive nodes.

2. The method of claim 1, further comprising receiving, via the one or more processing units, a third input associated with a selection of space dimensions for at least one of the combined physical systems.

3. The method of claim 1, wherein the user-selectable nodes are configured for display on a user interface associated with the multiphysics modeling system.

4. The method of claim 1, wherein the exclusive and non-exclusive nodes are labeled with dynamic symbols distinguishing the exclusive nodes from the non-exclusive nodes and distinguishing the exclusive and non-exclusive nodes from other nodes in the generated model tree structure.

5. The method of claim 1, further comprising in response to receiving an input associated with the selection of a node, displaying an identifying setting of a geometric entity associated with the selected node and further displaying information about exclusive or non-exclusive nodes related to the selected node.

6. The method of claim 1, wherein the fields storing the operations corresponding to the at least one of the selected physics options and the at least one of the selected study options are display fields that display the stored operations for modeling the combined physical system.

7. A method for solving a multiphysics model in a multiphysics modeling system, the multiphysics model representing combined physical systems having physical quantities represented in terms of partial differential equations, the multiphysics modeling system being configured to receive model inputs via a model tree, the method being executable on one or more processing units associated with the multiphysics modeling system, the method comprising the acts of:
    generating, via the one or more processing units, a geometric representation of the combined physical systems, the geometric representation at least partially corresponding to data received via a first geometry node and one or more secondary geometry nodes, the one or more secondary geometry nodes being geometry child nodes to the first geometry node such that the first geometry node is a geometry parent node to the geometry child nodes, the geometry child nodes representing geometry operations corresponding to the combined physical systems;
    assembling physical properties for the geometric representation of the combined physical systems, the physical properties at least partially corresponding to data received via a first materials node and one or more secondary materials nodes, the one or more secondary materials nodes being materials child nodes to the first materials node such that the first materials node is a materials parent node to the materials child nodes, the materials child nodes representing modeling operations for evaluating material properties;
    assembling physics quantities and boundary conditions for one or both of the geometric representation and the physical properties of the combined physical systems, the assembling of the physics quantities and boundary conditions being at least partially based on selected physics options received via a physics node;

generating exclusive and non-exclusive contributions to partial differential equations using operations represented by exclusive and non-exclusive child nodes to one or both of the first materials node or the physics node, the exclusive and non-exclusive child nodes representing modeling operations to generate contributions to equations associated with one or more geometric entities, the exclusive child nodes overriding other nodes and representing contributions that do not coexist with contributions from other nodes on one or more of the geometric entities, the non-exclusive child nodes representing contributions that coexist with other contributions from other non-exclusive nodes; and generating, via the one or more processing units, a solution for the multiphysics model of the combined physical systems, the solution being based on partial differential equations for one or more study steps represented in one or more study child nodes to a study parent node, the study steps corresponding to the assembled physics quantities and boundary conditions, wherein the geometry nodes, materials nodes, physics node, and study nodes are graphically represented in a display associated with the multiphysics modeling system as logically associated branches of a model tree for the multiphysics model.

8. The method of claim 7, wherein the acts of generating a geometric representation, assembling physical properties, assembling physics quantities and boundary conditions, and generating a solution are executed sequentially.

9. The method of claim 7, further comprising labeling the exclusive and non-exclusive child nodes with dynamic symbols distinguishing the exclusive child nodes from the non-exclusive child nodes and distinguishing the exclusive and non-exclusive child nodes from other nodes in the model tree.

10. The method of claim 7, further comprising in response to selecting a node, displaying an identifying setting of a geometric entity associated with the selected node and further displaying information about exclusive or non-exclusive child nodes related to the selected node.

11. The method of claim 7, further comprising displaying the solution on a user interface, wherein the solution is configured to be displayed in a 2-D graphical form.

12. The method of claim 7, further comprising displaying the solution on a user interface, wherein the solution is configured to be displayed in a 3-D graphical form.

13. The method of claim 7, further comprising displaying the solution on a user interface, wherein the solution is configured to be displayed in a tabular form.

14. The method of claim 7, wherein the geometry nodes, the materials nodes, the physics node, and the study nodes are each selectable via a user interface and include fields for storing physical quantities and operations for modeling the combined physical systems.

15. One or more non-transitory computer readable storage media encoded with instructions executable on one or more physical processors associated with a multiphysics modeling system, the instructions comprising the acts of:

generating a geometric representation of combined physical systems, the geometric representation being at least partially based on data received via a first geometry node and one or more secondary geometry nodes, the one or more secondary geometry nodes being geometry child nodes to the first geometry node such that the first geometry node is a geometry parent node to the geometry child nodes, the geometry child nodes representing geometry operations corresponding to the combined physical systems;

assembling physical properties for the geometric representation of the combined physical systems, the physical properties being at least partially based on data received via a first materials node and one or more secondary materials nodes, the one or more secondary materials nodes being materials child nodes to the first materials node such that the first materials node is a materials parent node to the materials child nodes, the materials child nodes representing operations for evaluating material properties;

assembling physics quantities and boundary conditions for one or both of the geometric representation and the physical properties of the combined physical systems, the assembling of the physics quantities and boundary conditions being at least partially based on user-selected physics options received via a physics node;

generating exclusive and non-exclusive contributions to partial differential equations using operations represented by exclusive and non-exclusive child nodes to one or both of the first materials node or the physics node, the exclusive and non-exclusive child nodes representing modeling operations to generate contributions to equations associated with one or more geometric entities, the exclusive child nodes overriding other nodes and representing contributions that do not coexist with contributions from other nodes on one or more of the geometric entities, the non-exclusive child nodes representing contributions that coexist with other contributions from other non-exclusive nodes;

generating a solution for the multiphysics model of the combined physical systems, the solution being based on partial differential equations for one or more study steps represented in one or more study child nodes to a study parent node, the study steps associated with the assembled physics quantities and boundary conditions, wherein the geometry nodes, materials nodes, physics node, and study nodes are logically associated branches of a model tree for the multiphysics model; and storing the solution in one or more memory devices, the solution and the logically associated branches of the model tree for the multiphysics model being configured for display on one or more user interfaces associated with the multiphysics modeling system.

16. The non-transitory computer readable media of claim 15, wherein the acts of generating a geometric representation, assembling physical properties, assembling physics quantities and boundary conditions, and generating a solution are executed sequentially.

17. A method for generating model constituents associated with a multiphysics model representing combined physical systems having physical quantities represented in terms of partial differential equations, the method for generating the model constituents occurring in a multiphysics modeling system executed on one or more physical processors, the method comprising:

representing, in one or more graphical user interfaces, a plurality of model constituents as one or more user-selectable primary nodes of a model tree, the primary nodes being graphically represented as logically associated branches of the model tree;

representing, in the one or more graphical user interfaces, modeling operations that generate the model constituents as one or more user-selectable secondary nodes to the primary nodes;

representing, in the one or more graphical user interfaces, physical quantities associated with the model constituents via at least one of the user-selectable primary nodes of the model tree;

generating exclusive and non-exclusive contributions to partial differential equations using operations represented by exclusive and non-exclusive secondary nodes of the model tree, the exclusive and non-exclusive secondary nodes representing modeling operations to generate contributions to equations associated with one or more geometric entities, the exclusive secondary nodes overriding other nodes and representing contributions that do not coexist with contributions from other nodes on one or more of the geometric entities, the non-exclusive secondary nodes representing contributions that coexist with other contributions from other non-exclusive nodes; and generating, via at least one of the one or more physical processors, contributions to the partial differential equations for one or more of the physical quantities in the multiphysics modeling system by implementing one or more of the modeling operations represented as at least one of the user-selectable secondary nodes to the at least one of the user-selectable primary nodes.

18. The method of claim 17, wherein the multiphysics model includes a geometrical domain, the partial differential equations being generated only if attributable to the geometrical domain.

19. The method of claim 17, further comprising:

representing, in at least one of the one or more graphical user interfaces, combined physical systems as a plurality of model nodes in the model tree; and generating, via at least one of the one or more processors, equations operable to couple the plurality of model nodes by implementing modeling operations represented as secondary nodes to the model nodes.

20. The method of claim 19, wherein contributions to the partial differential equations are generated for each of the model nodes, the partial differential equations being solved simultaneously by the multiphysics modeling system.

21. The method of claim 17, further comprising labeling the exclusive and non-exclusive secondary nodes with dynamic symbols distinguishing the exclusive secondary nodes from the non-exclusive secondary nodes and distinguishing the exclusive and non-exclusive secondary nodes from other nodes in the model tree.

22. The method of claim 21, further comprising in response to receiving a user-selection of a primary node or secondary node, displaying an identifying setting of a geometric entity associated with the user-selected node and further displaying information about exclusive or non-exclusive secondary nodes related to the user-selected node.

* * * * *